US010580587B2

(12) United States Patent
Okada et al.

(10) Patent No.: US 10,580,587 B2
(45) Date of Patent: Mar. 3, 2020

(54) PHOTOELECTRIC CONVERSION ELEMENT

(71) Applicant: FUJIKURA, LTD., Tokyo (JP)

(72) Inventors: Kenichi Okada, Chiba (JP);
Katsuyoshi Endoh, Chiba (JP)

(73) Assignee: FUJIKURA LTD., Tokyo (JP)

(*) Notice: Subject to any disclaimer, the term of this patent is extended or adjusted under 35 U.S.C. 154(b) by 625 days.

(21) Appl. No.: 15/108,161

(22) PCT Filed: Dec. 24, 2014

(86) PCT No.: PCT/JP2014/084048
§ 371 (c)(1),
(2) Date: Jun. 24, 2016

(87) PCT Pub. No.: WO2015/098914
PCT Pub. Date: Jul. 2, 2015

(65) Prior Publication Data
US 2016/0322173 A1 Nov. 3, 2016

(30) Foreign Application Priority Data

Dec. 24, 2013 (JP) .................................. 2013-264908
Nov. 17, 2014 (JP) .................................. 2014-232629
Nov. 17, 2014 (JP) .................................. 2014-232630

(51) Int. Cl.
H01G 9/20 (2006.01)

(52) U.S. Cl.
CPC ......... *H01G 9/2077* (2013.01); *H01G 9/2027* (2013.01); *H01G 9/2059* (2013.01)

(58) Field of Classification Search
CPC ... H01G 9/2077; H01G 9/2068; H01L 51/448
See application file for complete search history.

(56) References Cited

U.S. PATENT DOCUMENTS 6,268,558 B1 * 7/2001 Kubota ................. H01L 31/046
136/244
2011/0073177 A1 * 3/2011 Osawa ................ H01G 9/2027
136/256
(Continued)

FOREIGN PATENT DOCUMENTS

CN 101926042 A 12/2010
CN 102737848 A 10/2012
(Continued)

OTHER PUBLICATIONS

English machine translation of WO 2012/118028 A1 provided by WIPO. (Year: 2018).*
(Continued)

Primary Examiner — Daniel P Malley, Jr.
(74) Attorney, Agent, or Firm — Sughrue Mion, PLLC

(57) ABSTRACT

Disclosed is a photoelectric conversion element including at least one photoelectric conversion cell. The photoelectric conversion cell includes a conductive substrate having a transparent substrate and a transparent conductive layer provided on the transparent substrate, a counter substrate facing the conductive substrate, an oxide semiconductor layer provided on the conductive substrate or the counter substrate, and an annular sealing portion adhering the conductive substrate and the counter substrate. An insulating material is provided at least between the conductive substrate and the sealing portion, and the insulating material is colored.

14 Claims, 24 Drawing Sheets

(56) References Cited

U.S. PATENT DOCUMENTS

| | | | |
|---|---|---|---|
| 2011/0088778 A1* | 4/2011 | Lin | H01L 31/1884 136/257 |
| 2011/0155223 A1* | 6/2011 | Morooka | H01G 9/2031 136/252 |
| 2014/0000678 A1 | 1/2014 | Shimohira et al. | |
| 2015/0056736 A1* | 2/2015 | Beck | H01L 31/18 438/64 |

FOREIGN PATENT DOCUMENTS

| | | | |
|---|---|---|---|
| CN | 103262337 A | 8/2013 | |
| EP | 2 249 429 A1 | 11/2010 | |
| EP | 2 287 962 A1 | 2/2011 | |
| EP | 2511925 A2 | 10/2012 | |
| EP | 2 683 020 A1 | 1/2014 | |
| JP | 2005-158709 A | 6/2005 | |
| JP | 2006-339086 A | 12/2006 | |
| JP | 2006339086 A * | 12/2006 | |
| JP | 2010-3468 A | 1/2010 | |
| JP | 2010-153073 A | 7/2010 | |
| JP | 2011-48974 A | 3/2011 | |
| JP | 2012-182040 A | 9/2012 | |
| JP | 2015-46223 A | 3/2015 | |
| WO | WO-2009144898 A1 * | 12/2009 | H01G 9/2077 |
| WO | WO-2012118028 A1 * | 9/2012 | H01G 9/2077 |
| WO | 2013/094653 A1 | 6/2013 | |
| WO | 2012/118028 A1 | 3/2015 | |

OTHER PUBLICATIONS

English machine translation of JP 2006-339086 A provided by the EPO. (Year: 2018).*

English machine translation of WO 2009/144898 A1 provided by WIPO. (Year: 2018).*

English machine translation of Okada (WO 2012/118028 A1) provided via WIPO. 2018. (Year: 2018).*

International Search Report of PCT/JP2014/084048, dated Apr. 7, 2015. [PCT/ISA/210].

Written Opinion of PCT/JP2014/084048, dated Apr. 7, 2015. [PCT/ISA/237].

Communication dated Sep. 20, 2017 from the State Intellectual Property Office of the P.R.C. in counterpart application No. 201480065981.6.

Communication dated Jul. 27, 2017 issued by the European Patent Office in counterpart application No. 14874545.8.

* cited by examiner

PHOTOELECTRIC CONVERSION ELEMENT

CROSS REFERENCE TO RELATED APPLICATIONS

This application is a National Stage of International Application No. PCT/JP2014/084048 filed Dec. 24, 2014, claiming priority based on Japanese Patent Application Nos. 2013-264908, filed Dec. 24, 2013, 2014-232630, filed Nov. 17, 2014 and 2014-232629, filed Nov. 17, 2014, the contents of all of which are incorporated herein by reference in their entirety.

TECHNICAL FIELD

The present invention relates to a photoelectric conversion element.

BACKGROUND ART

As a photoelectric conversion element, due to a capability of obtaining a high photoelectric conversion efficiency with a low cost, a photoelectric conversion element using a dye such as a dye-sensitized solar cell element has drawn attention, and such a photoelectric conversion element has been developed in various manners.

A photoelectric conversion element using a dye generally comprises at least one photoelectric conversion cell, and the photoelectric conversion cell comprises a conductive substrate, a counter substrate such as an counter electrode, and an annular sealing portion connecting the conductive substrate and the counter substrate. The conductive substrate has a transparent substrate and a transparent conductive layer formed on the transparent substrate, and an oxide semiconductor layer is provided between the conductive substrate and the counter substrate.

Such a photoelectric conversion element is disclosed in Patent Document 1 as follows. Patent Document 1 mentioned below discloses a photoelectric conversion element configured by a photoelectric conversion cell including a transparent conductive substrate, a counter electrode facing the transparent conductive substrate, a porous titanium oxide layer provided on the transparent conductive substrate to exhibit a predetermined color, and a sealing material provided between the transparent conductive substrate and the counter electrode.

CITATION LIST

Patent Document

Patent Document 1: JP 2010-3468 A

SUMMARY OF THE INVENTION

Problem to be Solved by the Invention

However, the photoelectric conversion element disclosed in Patent Document 1 mentioned above has the following problems.

Namely, in the photoelectric conversion element disclosed in Patent Document 1 mentioned above, in a case where the photoelectric conversion element is seen from a light incident surface side of the substrate, there is a case where undesired color, shape, or the like is seen around the oxide semiconductor layer through a sealing portion. Namely, there is a case where the outer appearance is not good.

Herein, it is also considered to make the sealing portion contain a colorant. However, in this case, since the colorant does not contribute to sealing performance, the sealing performance of the sealing portion is deteriorated, and thus, durability is considered to be deteriorated.

The invention has been made in view of the above circumstances and an object thereof is to provide a photoelectric conversion element capable of realizing a good outer appearance and having an excellent durability.

Means for Solving Problem

The inventors studied hard in order to solve the problems. For example, in order to obtain a good outer appearance in the photoelectric conversion element disclosed in Patent Document 1, the inventors considered changing the color of the counter electrode seen through the sealing portion. However, since the color of the counter electrode can be obtained as a result of using a material suitable for exhibiting performance of the photoelectric conversion element, if the color of the counter electrode intends to be changed considering the outer appearance as important, there is a possibility that the durability of the photoelectric conversion element is deteriorated. Therefore, as a result of extensive studies, the inventors found out that the aforementioned problems can be solved by the following inventions.

Namely, the invention is a photoelectric conversion element including at least one photoelectric conversion cell, wherein the photoelectric conversion cell includes a conductive substrate having a transparent substrate and a transparent conductive layer provided on the transparent substrate, a counter substrate facing the conductive substrate, an oxide semiconductor layer provided on the conductive substrate or the counter substrate, and an annular sealing portion adhering the conductive substrate and the counter substrate, and wherein an insulating material is provided at least between the conductive substrate and the sealing portion, and the insulating material is colored.

According to the photoelectric conversion element, since the insulating material is colored, it is possible to conceal the color or shape of the sealing portion or the counter substrate existing in the back side of the insulating material in a case where the photoelectric conversion element is seen from the conductive substrate side. Moreover, by coloring the insulating material, it is possible to freely display desired characters or designs on the conductive substrate of the photoelectric conversion element. Therefore, it is possible to realize a good outer appearance. In addition, although the color of the counter substrate can be concealed by coloring the sealing portion through the introduction of a colorant to the sealing portion, in comparison with this case, it is possible to improve durability of the photoelectric conversion element.

In the photoelectric conversion element, preferably, the insulating material is provided in the entire circumference along an outer shape of the sealing portion.

In this case, since the infiltration passage of moisture from the outside can be blocked in the entire circumference, it is possible to obtain more excellent durability.

In addition, preferably, the photoelectric conversion element further includes a coating layer on a surface of the side of the transparent substrate opposite to the transparent conductive layer, the coating layer covers the oxide semiconductor layer in a case where the coating layer is seen in a thickness direction of the transparent substrate, and a maximum absorption peak wavelength of the coating layer in the wavelength range of visible light and a maximum absorption peak wavelength of the oxide semiconductor layer in the wavelength range of visible light are different from.

In this case, the maximum absorption peak wavelength of the coating layer in the wavelength range of visible light is different from the maximum absorption peak wavelength of the oxide semiconductor layer in the wavelength range of visible light. Therefore, it is possible to suppress the phenomenon that light which is to be sufficiently absorbed by the oxide semiconductor layer is sufficiently absorbed by the coating layer. Therefore, it is possible to suppress a deterioration in photoelectric conversion characteristic of the photoelectric conversion element. In addition, it is possible to adjust the color of the oxide semiconductor layer of the photoelectric conversion element.

In the photoelectric conversion element, preferably, the transparent conductive layer includes a main body portion arranged inside the sealing portion, a groove is formed in the transparent conductive layer, at least a portion of the groove includes a first groove formed along an outer shape of the sealing portion, and the insulating material enters into the first groove and continuously covers an edge portion of the main body portion.

According to the photoelectric conversion element, the grooves are formed in the transparent conductive layer, and the grooves include a first groove formed along the outer shape of the annular sealing portion. In addition, the insulating material enters into the first groove, and the insulating material continuously covers the edge portion of the main body portion. Therefore, even if a crack is formed along the groove inside the transparent substrate at a position under the groove and the crack is connected up to the edge portion of the main body portion, infiltration of moisture through the crack from an outside of the sealing portion is sufficiently suppressed by the insulating material. Therefore, according to the photoelectric conversion element of the invention, it is possible to obtain an excellent durability.

Preferably, in a case where the photoelectric conversion element further includes a back sheet which is on the conductive substrate and covers the photoelectric conversion cell in a surface side of the transparent substrate where the transparent conductive layer is provided, the groove includes the first groove and a second groove which is formed along the edge portion of the portion of the transparent conductive layer excluding the main body portion and intersects a peripheral edge portion of the back sheet, and the insulating material enters into the second groove and covers the edge portion of the portion of the transparent conductive layer excluding the main body portion.

If the second groove intersects the peripheral edge portion of the back sheet, moisture can be infiltrated through the second groove into a space between the back sheet and the transparent conductive substrate. In this case, since the insulating material enters into the second groove, and also covers an edge portion of the portion of the transparent conductive layer excluding the main body portion, infiltration of moisture from an outside of the back sheet into an inside of the back sheet is sufficiently suppressed. Therefore, entrance of moisture infiltrated into a space between the back sheet and the transparent conductive substrate through the sealing portion into an inside of the sealing portion is sufficiently suppressed. Therefore, it is possible to sufficiently suppress a deterioration in durability of the photoelectric conversion element.

In the photoelectric conversion element, preferably, the insulating material is provided on the conductive substrate and continuously along the entire circumference of the peripheral edge portion of the back sheet.

In this case, it is possible to sufficiently suppress infiltration of moisture from the outside of the back sheet into the inside of the back sheet. In addition, since the insulating material is colored, it is possible to conceal the color or surface shape of the back sheet by the insulating material. In addition, by coloring the insulating material, it is possible to freely display desired characters or designs on the conductive substrate of the photoelectric conversion element. Therefore, even in a case where the photoelectric conversion element includes the back sheet, it is possible to realize a good outer appearance.

Preferably, the photoelectric conversion element includes a plurality of the photoelectric conversion cells, and the conductive substrate is configured to be a common conductive substrate of the plurality of photoelectric conversion cells, and the plurality of photoelectric conversion cells are insulated from each other by the grooves including the first groove.

Among the plurality of photoelectric conversion cells, even if the grooves are provided between the transparent conductive layers of the two cells adjacent to each other to insulate the transparent conductive layers, a weak current flows between the transparent conductive layers due to contamination or the like, so that there is a possibility that insulating is insufficient. In this case, since the insulating material enters into at least the first groove, it is possible to suppress a leakage current flowing between the transparent conductive layers and sufficiently secure an insulating property. Therefore, it is possible to improve a photoelectric conversion characteristic.

Preferably, the photoelectric conversion element further includes a conductive portion including at least one terminal portion provided so as to be in contact with the transparent conductive layer in a region where the insulating material is not provided among regions between the sealing portions and the edge portion of the conductive substrate on the conductive substrate and a light transmission preventing layer which is provided so as to be adjacent to at least the terminal portion and prevents light transmission in a region where the insulating material is not provided among the regions between the sealing portion and the edge portion of the conductive substrate on the conductive substrate, and at least a portion of the terminal portion and the light transmission preventing layer are colored, respectively.

In the photoelectric conversion element, since at least a portion of the terminal portion is colored and the light transmission preventing layer adjacent to at least a portion of the terminal portion is colored, it is possible to sufficiently suppress the phenomenon that the terminal portion is conspicuous in a case where the photoelectric conversion element is seen in the thickness direction of the conductive substrate. Therefore, it is possible to realize a good outer appearance. In addition, according to the photoelectric conversion element of the invention, since the transparent conductive layer is not required to be colored, it is possible to sufficiently suppress a deterioration in photoelectric conversion characteristic of the photoelectric conversion element.

In the photoelectric conversion element, preferably, a difference in L* of an L*a*b* color space between the oxide semiconductor layer and the light transmission preventing layer is 5 or less, and the difference in L* of the L*a*b* color space between the oxide semiconductor layer and the colored terminal portion is 5 or less.

In this case, it is possible to allow the respective colors of the terminal portion and the light transmission preventing layer to be close to the color of the oxide semiconductor layer. In other words, it is possible to allow the colors of the terminal portion, the light transmission preventing layer and the oxide semiconductor layer to be close to a single color. Therefore, the phenomenon that the terminal portion and the light transmission preventing layer are conspicuous in comparison with the oxide semiconductor layer is sufficiently suppressed. Therefore, it is possible to realize better outer appearance.

In the photoelectric conversion element, the conductive portion includes at least one wiring material provided in the sealing portion side of the conductive substrate, a first connecting portion which is connected to one end of the wiring material and is arranged outside the sealing portion in a case where the photoelectric conversion element is seen from the transparent substrate side in the thickness direction of the conductive substrate, and a second connecting portion which is connected to the other end of the wiring material, and the light transmission preventing layer is provided so as to overlap with the wiring material in the thickness direction of the conductive substrate between the wiring material and the conductive substrate.

In this case, since the wiring material and the light transmission preventing layer are provided so as to overlap with each other between the conductive substrate and the wiring material, in a case where the photoelectric conversion element is seen in the thickness direction of the conductive substrate, it is possible to conceal the wiring material existing in the back side of the light transmission preventing layer. Therefore, it is possible to realize a good outer appearance.

In the photoelectric conversion element, preferably, the counter substrate is configured by an electrode including a metal substrate, and at least one of the second connecting portions is configured by the metal substrate.

In the photoelectric conversion element, at least one of the second connecting portions may be arranged outside the sealing portion, and the first connecting portion and the second connecting portion may be provided directly on the common transparent conductive layer.

In the photoelectric conversion element, preferably, the light transmission preventing layer is provided so as to cover all regions excluding the insulating material and the conductive portion in a case where the photoelectric conversion element is seen in the thickness direction of the conductive substrate among regions between the sealing portions and the edge portion of the conductive substrate on a surface of the sealing portion side of the conductive substrate.

In this case, in a case where the photoelectric conversion element is seen from the transparent substrate side in the thickness direction of the conductive substrate, since the regions excluding at least the insulating material and the conductive portion among the regions between the sealing portions and the edge portion of the conductive substrate are concealed by the light transmission preventing layer, it is possible to realize better outer appearance.

In the photoelectric conversion element, preferably, in a case where the photoelectric conversion element is seen from the transparent substrate side in the thickness direction of the conductive substrate, a different color portion having a color different from that of the light transmission preventing layer is provided on the conductive substrate.

In this case, since the different color portion has a color different from that of the light transmission preventing layer, in a case where the photoelectric conversion element is seen from the transparent substrate side in the thickness direction of the conductive substrate, it is possible to allow the different color portion to display desired characters or designs.

In the photoelectric conversion element, preferably, the light transmission preventing layer is provided so as to cover all the regions excluding at least the insulating material, the conductive portion, and the different color portion in a case where the photoelectric conversion element is seen in the thickness direction of the conductive substrate among the regions between the sealing portions and the edge portion of the conductive substrate on the surface of the sealing portion side of the conductive substrate.

In this case, in a case where the photoelectric conversion element is seen from the transparent substrate side in the thickness direction of the conductive substrate, since the regions excluding at least the insulating material, the conductive portion, and the different color portions among the regions between the sealing portions and the edge portion of the conductive substrate are concealed by the light transmission preventing layer, it is possible to realize better outer appearance.

In addition, in the invention, "to be colored" denotes that the $L^*$ of the $L^*a^*b^*$ color space is less than 35. Herein, the $L^*$ is defined by the following equation when spectral reflectance of 700 nm with respect to D65 standard light of CIE is denoted by x, spectral reflectance of 546.1 nm is denoted by y, and spectral reflectance of 435.8 nm is denoted by z.

$$L^*=116\times(0.2126z+0.7152y+0.0722x)^{1/3}-16$$

In addition, the "light transmission preventing layer" denotes a layer of which average light transmittance in the visible light wavelength range is 50% or less. In addition, the visible light wavelength range denotes a wavelength range of 380 to 800 nm.

Furthermore, in the invention, the "photoelectric conversion element" includes a dye-sensitized photoelectric conversion element generating electricity using a photosensitizing dye. In addition, the "dye-sensitized photoelectric conversion element" includes a dye-sensitized photoelectric conversion element generating electricity by using sunlight and a dye-sensitized photoelectric conversion element generating electricity by using light such as indoor lamp other than sunlight.

In addition, in the invention, the "photoelectric conversion cell" includes a dye-sensitized photoelectric conversion cell generating electricity by using a photosensitizing dye. In addition, the "dye-sensitized photoelectric conversion cell" includes a dye-sensitized photoelectric conversion cell generating electricity by using sunlight and a dye-sensitized photoelectric conversion cell generating electricity by using light such as indoor lamp other than sunlight.

Effect of the Invention

According to the invention, it is possible to provide a photoelectric conversion element capable of realizing a good outer appearance and having an excellent durability.

MODE(S) FOR CARRYING OUT THE INVENTION

<First Embodiment>

Figure 1:
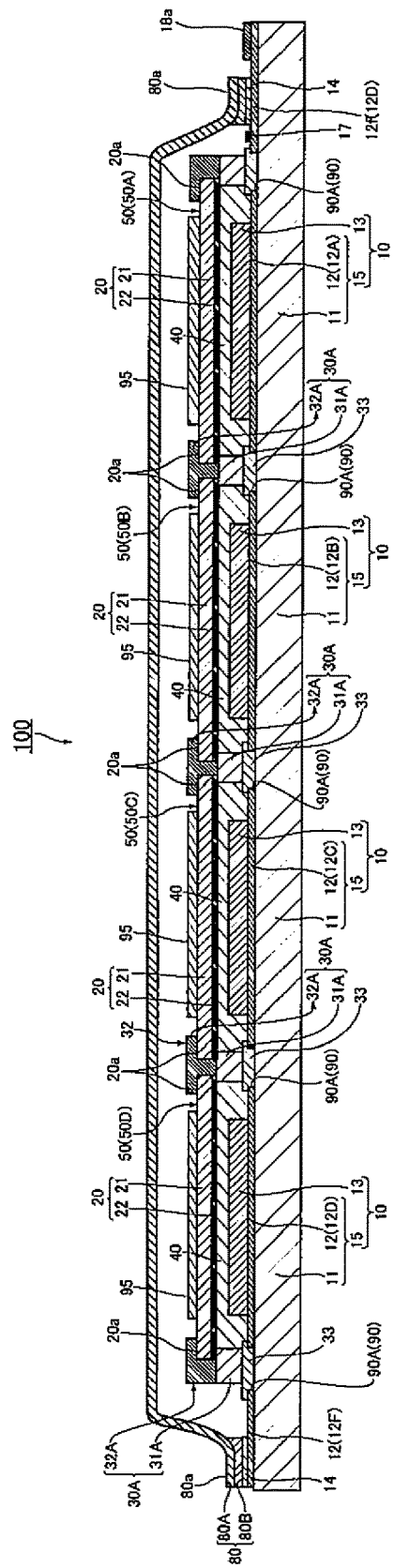
FIG. 1 is an end view of the cut section illustrating a first embodiment of a photoelectric conversion element according to the invention.
Figure 2:
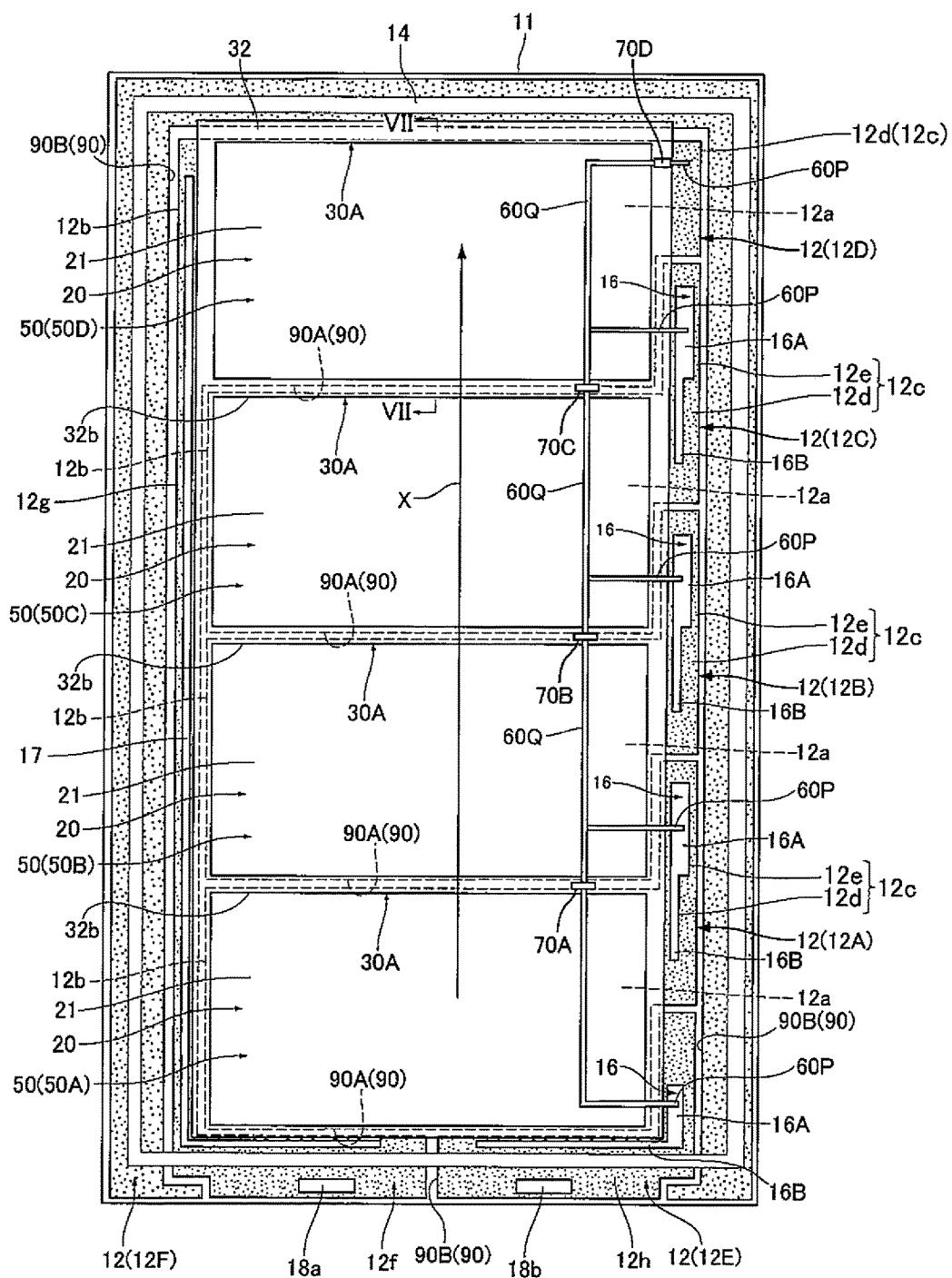
FIG. 2 is a plan view illustrating a portion of the first embodiment of the photoelectric conversion element according to the invention.
Figure 3:
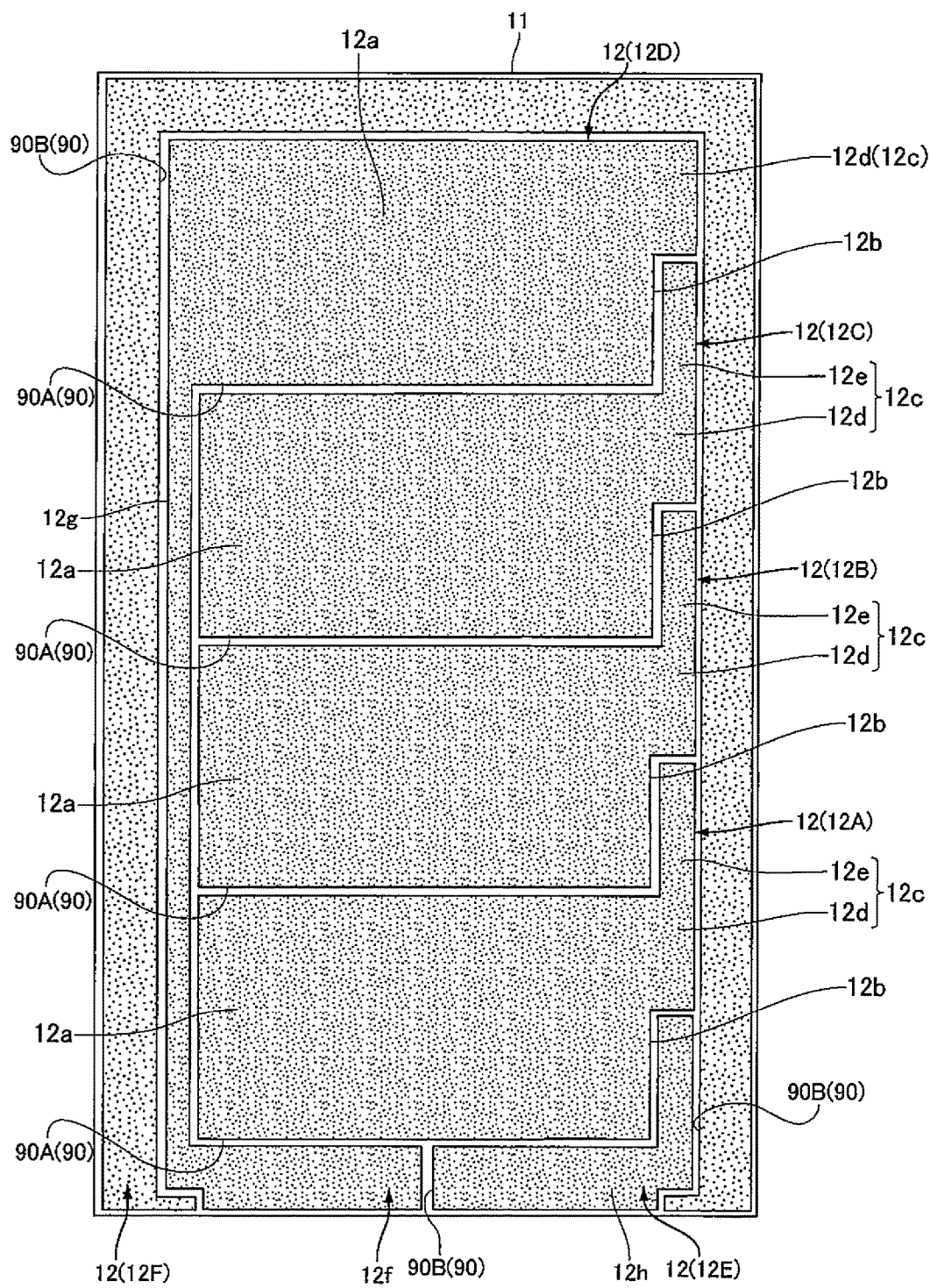
FIG. 3 is a plan view illustrating a pattern of a transparent conductive layer in the photoelectric conversion element of FIG. 1.
Figure 4:
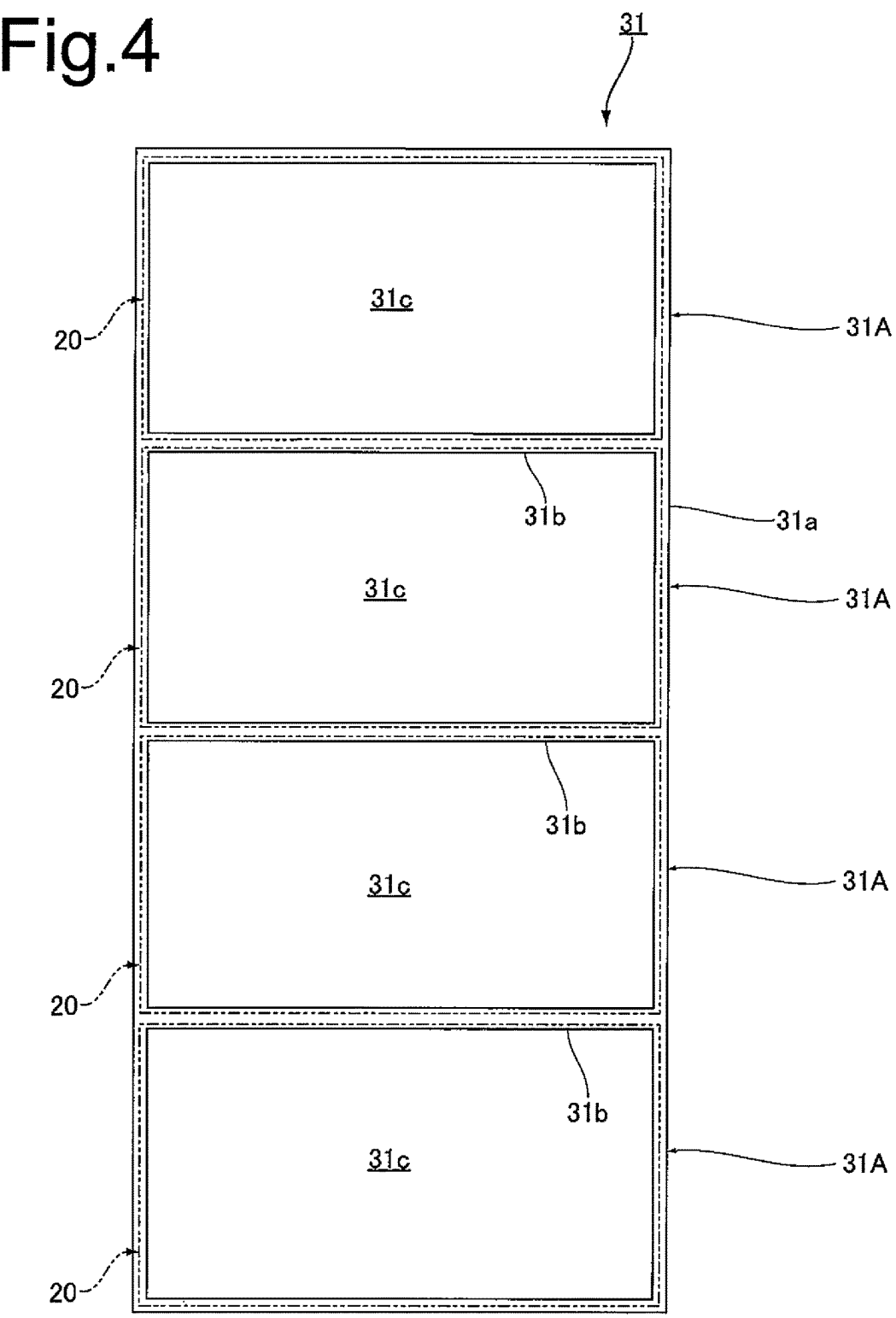
FIG. 4 is a plan view illustrating a first integrated sealing portion of FIG. 1.
Figure 5:
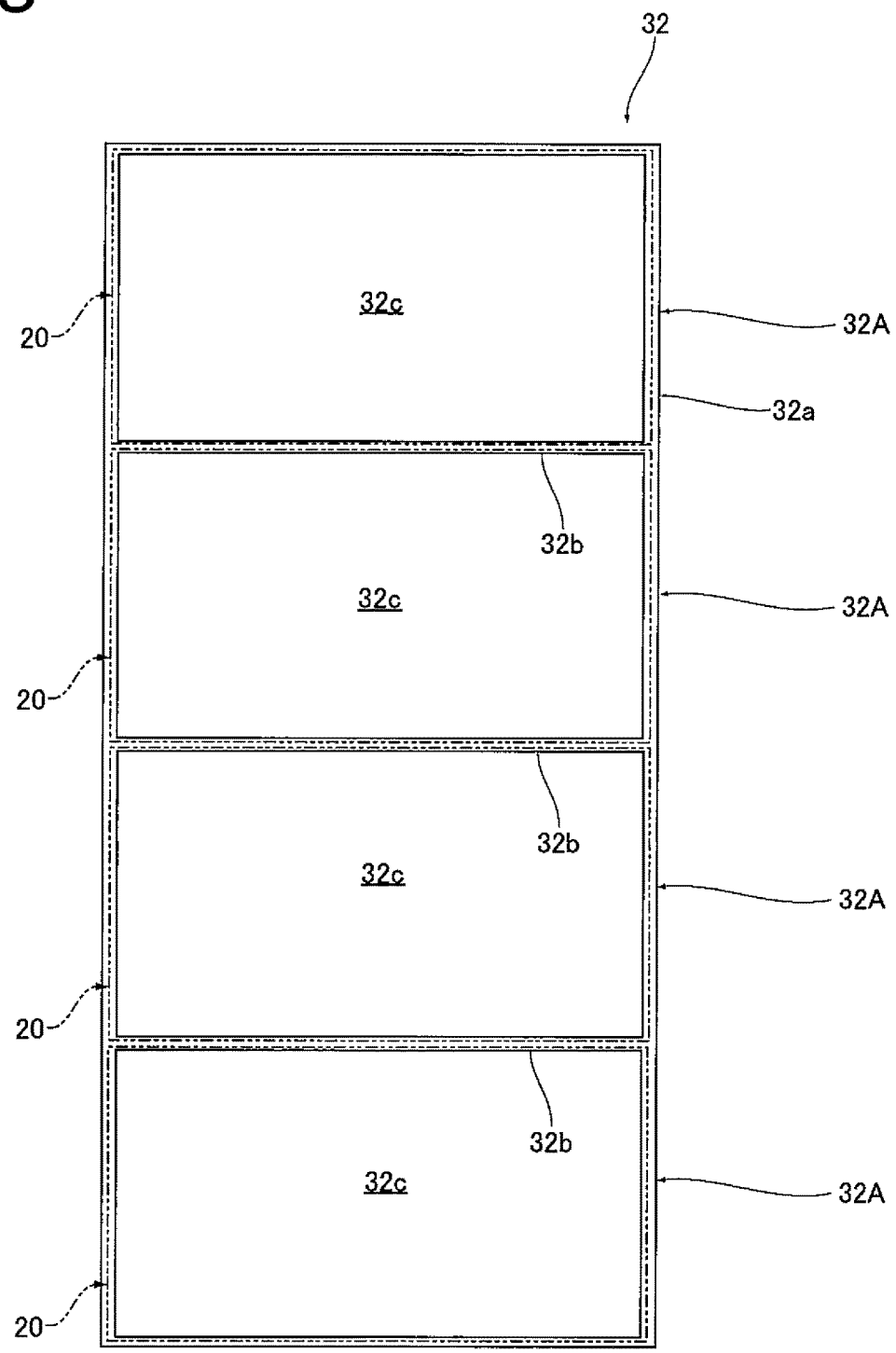
FIG. 5 is a plan view illustrating a second integrated sealing portion of FIG. 1.
Figure 6:
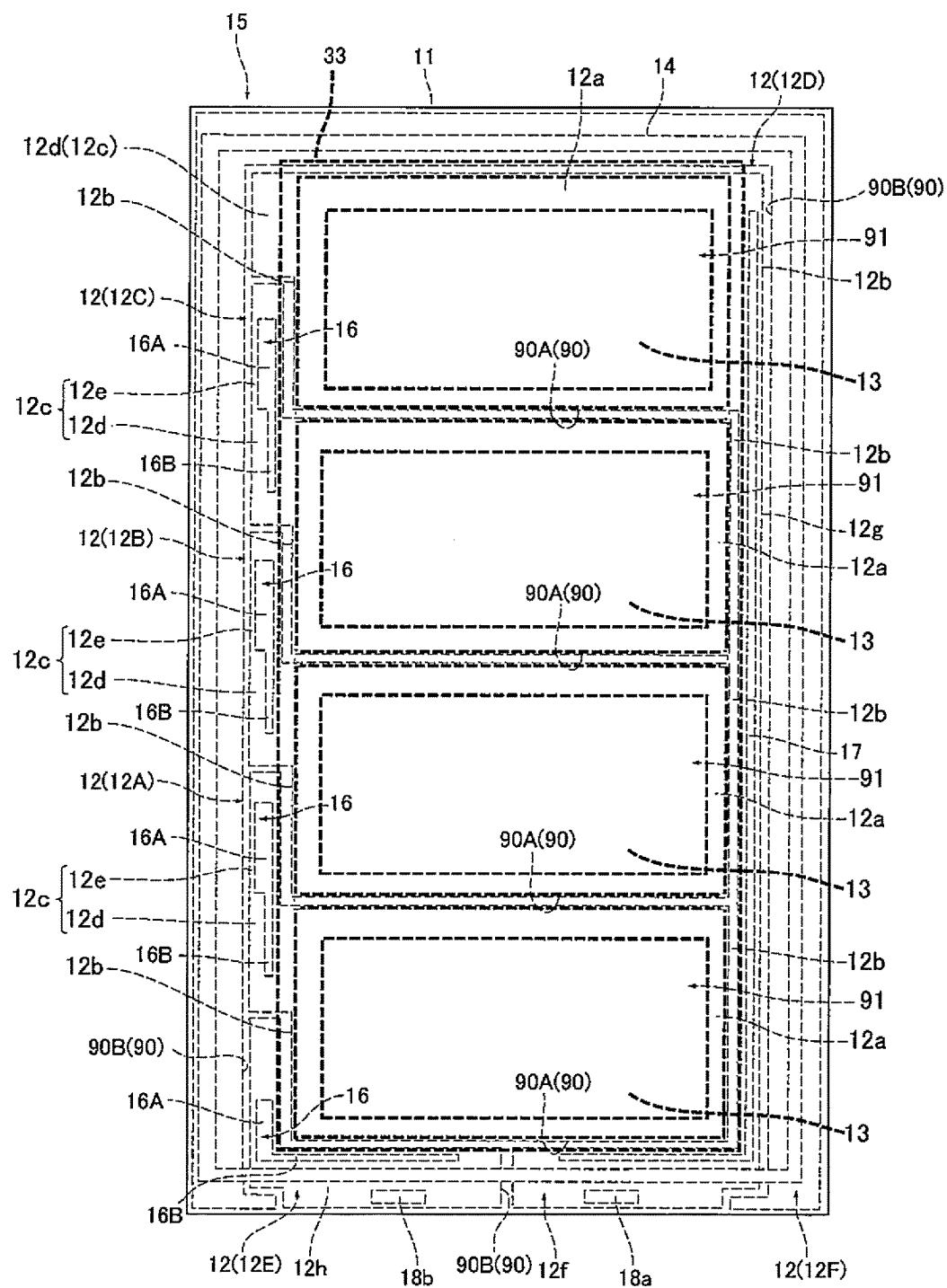
FIG. 6 is a plan view illustrating the photoelectric conversion element of FIG. 1 as seen from a conductive substrate side.
Figure 7:
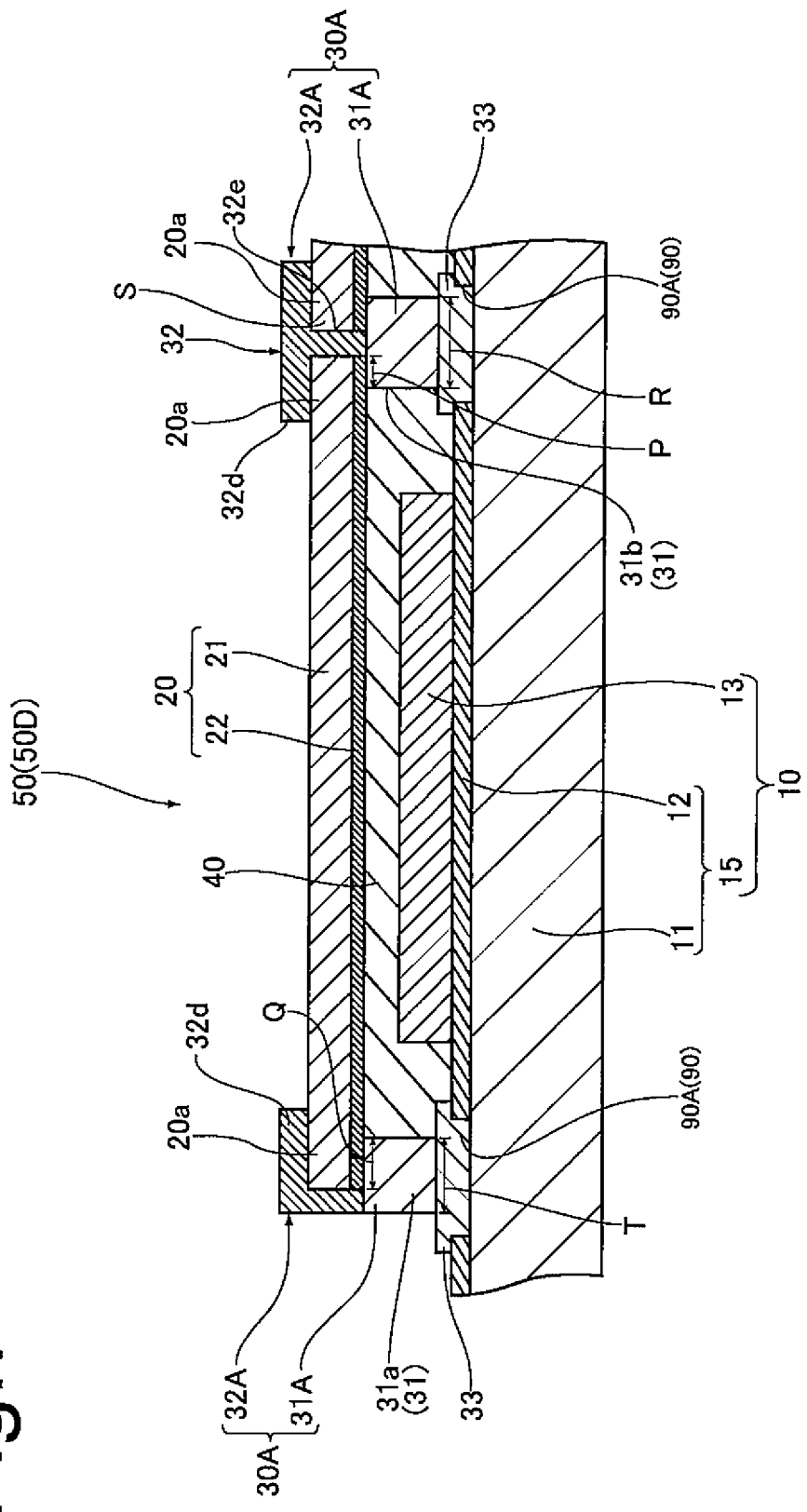
FIG. 7 is an end view of the cut section taken along line VII-VII of FIG. 2.

Hereinafter, a preferred first embodiment of a photoelectric conversion element according to the invention will be described in detail with reference to FIGS. 1 to 7. FIG. 1 is an end view of the cut section illustrating the first embodiment of the photoelectric conversion element according to the invention. FIG. 2 is a plan view illustrating a portion of the first embodiment of the photoelectric conversion element according to the invention. FIG. 3 is a plan view illustrating a pattern of a transparent conductive layer in the photoelectric conversion element of FIG. 1. FIG. 4 is a plan view illustrating a first integrated sealing portion of FIG. 1. FIG. 5 is a plan view illustrating a second integrated sealing portion of FIG. 1. FIG. 6 is a plan view illustrating the photoelectric conversion element of FIG. 1 as seen from a conductive substrate side. FIG. 7 is an end view of the cut section taken along line VII-VII of FIG. 2.

As illustrated in FIG. 1, a photoelectric conversion element 100 has a plurality (four in FIG. 1) of photoelectric conversion cells (hereinafter, simply referred to as "cells") 50 and a back sheet 80 provided to cover the cells 50. As illustrated in FIG. 2, a plurality of the cells 50 are connected in series by a wiring material 60P as a conductive material. Hereinafter, for the convenience of description, four cells 50 in the photoelectric conversion element 100 may be referred to as cells 50A to 50D.

As illustrated in FIG. 1, each of the cells 50 comprised a conductive substrate 15, a counter substrate 20 facing the conductive substrate 15, an annular sealing portion 30A adhering the conductive substrate 15 and the counter substrate 20, and an oxide semiconductor layer 13 provided between the conductive substrate 15 and the counter substrate 20. A cell space formed by the conductive substrate 15, the counter substrate 20, and the annular sealing portion 30A is filled with electrolyte 40. In addition, a dye is supported on the oxide semiconductor layer 13.

The counter substrate 20 is configured by a counter electrode and comprises a metal substrate 21 having functions as a substrate and an electrode and a catalyst layer 22 provided on a conductive substrate 15 side of the metal substrate 21 to facilitate catalytic reaction. In addition, in the two cells 50 adjacent to each other, the counter substrates 20 are separated from each other.

As illustrated in FIGS. 1 and 2, the conductive substrate 15 includes a transparent substrate 11 and a transparent conductive layer 12 as an electrode provided on the transparent substrate 11. The transparent substrate 11 is used as a common transparent substrate of the cells 50A to 50D. At least one oxide semiconductor layer 13 is provided on the transparent conductive layer 12 of the conductive substrate 15. The oxide semiconductor layer 13 is arranged inside the annular sealing portion 30A. In addition, a connecting terminal 16 is provided on the transparent conductive layer 12 of the conductive substrate 15. In addition, a colored insulating material 33 is provided between the conductive substrate 15 and the sealing portion 30A. In the embodiment, the conductive substrate 15 and the oxide semiconductor layer 13 constitute a working electrode 10.

As illustrated in FIGS. 2 and 3, the transparent conductive layer 12 is configured by transparent conductive layers 12A to 12F which are provided in an insulated state. Namely, the transparent conductive layers 12A to 12F are arranged to interpose grooves 90. Herein, the transparent conductive layers 12A to 12D constitutes the respective transparent conductive layers 12 of the plurality of cells 50A to 50D. In addition, the transparent conductive layer 12E is arranged so as to bend along the sealing portion 30A. The transparent conductive layer 12F is an annular transparent electrode layer 12 for fixing a peripheral edge portion 80a of the back sheet 80 (refer to FIG. 1).

As illustrated in FIG. 3, all of the transparent conductive layers 12A to 12D have a quadrangular-shaped main body portion 12a having a side edge portion 12b and a protruding portion 12c which laterally protrudes from the side edge portion 12b of the main body portion 12a.

As illustrated in FIG. 2, the protruding portion 12c of the transparent conductive layer 12C among the transparent conductive layers 12A to 12D has a projecting portion 12d which laterally projects with respect to the arrangement direction X of the cells 50A to 50D and a facing portion 12e which extends along the arrangement direction X of the cells 50A to 50D from the projecting portion 12d and faces the main body portion 12a of the adjacent cell 500 via the groove 90.

In the cell 50B as well, the protruding portion 12c of the transparent conductive layer 12B has the projecting portion 12d and the facing portion 12e. In addition, in the cell 50A as well, the protruding portion 12c of the transparent conductive layer 12A has the projecting portion 12d and the facing portion 12e.

Meanwhile, the cell 50D is connected with the cell 50C already and there is no other cell 50 to be connected. For this reason, in the cell 50D, the protruding portion 12c of the transparent conductive layer 12D does not have a facing portion 12e. In other words, the protruding portion 12c of the transparent conductive layer 12D is constituted by only the projecting portion 12d.

However, the transparent conductive layer 12D further has a first current extracting portion 12f for extracting the current generated in the photoelectric conversion element 100 to the outside and a connecting portion 12g which connects the first current extracting portion 12f and the main body portion 12a and extends along the side edge portion 12b of the transparent conductive layers 12A to 12C. The first current extracting portion 12f is disposed in the vicinity of the cell 50A and on the side opposite to the transparent conductive layer 12B with respect to the transparent conductive layer 12A.

On the other hand, the transparent conductive layer 12E also includes a second current extracting portion 12h for extracting the current generated by the photoelectric conversion element 100 to the outside, and the second current extracting portion 12h is arranged in the vicinity of the cell 50A and on the side opposite to the transparent conductive layer 12B with respect to the transparent conductive layer 12A. The first current extracting portion 12f and the second current extracting portion 12h are arranged to be adjacent to each other via the groove 90B (90) in the periphery of the cell 50A. Herein, the groove 90 is configured by a first groove 90A which is formed along an outer shape of the annular sealing portion 30A and a second groove 90B which is formed along an edge portion of a portion of the transparent conductive layer 12 excluding the main body portion 12a and intersects the peripheral edge portion 80a of the back sheet 80. Specifically, the first grove 90A is formed along the edge portion of the main body portion 12a of the transparent conductive layer 12.

In addition, the connecting terminals 16 are provided on protrusion portions 12c of the transparent conductive layers 12A to 12C and the transparent conductive layer 12E. Specifically, the connecting terminals 16 are provided outside the sealing portions 30A in a case where the photoelectric conversion element 100 is seen from the transparent substrate 11 side in the thickness direction of the conductive substrate 15. Each connecting terminal 16 has a wiring material connecting portion 16A as a conductive material connecting portion which is connected to the wiring material 60P and extends along the sealing portion 30A outside the sealing portion 30A and a wiring material non-connecting portion 16B as a conductive material non-connecting portion which extends from the wiring material connecting portion 16A along the sealing portion 30A outside the sealing portion 30A. In the embodiment, with respect to the transparent conductive layers 12A to 12C, at least the wiring material connecting portion 16A of the connecting terminals 16 is provided on the counter portion 12e of the protrusion portion 12c and faces the main body portion 12a of the connected adjacent cell 50. With respect to the transparent conductive layer 12E, the wiring material connecting portion 16A of the connecting terminal 16 faces the main body portion 12a of the connected adjacent cell 50A. In addition, a width of the wiring material non-connecting portion 16B is narrower than that of the wiring material connecting portion 16A. Herein, the widths of the wiring material connecting portion 16A and the wiring material non-connecting portion 16B are configured to be constant, respectively. Meanwhile, the width of the wiring material connecting portion 16A denotes a length in the direction perpendicular to the direction where the wiring material connecting portion 16A extends and the smallest width among the widths of the wiring material connecting portion 16A, and the width of the wiring material non-connecting portion 16B denotes a length in the direction perpendicular to the direction where the wiring material non-connecting portion 16B extends and the smallest width among the widths of the wiring material non-connecting portion 16B.

The wiring material connecting portion 16A of the connecting terminal 16 provided on the protrusion portion 12c of the transparent conductive layer 12C in the cell 50C is connected to the metal substrate 21 of the counter substrate 20 in the adjacent cell 50D via the wiring material 602. The wiring material 602 is arranged so as to pass on the sealing portion 30A. Similarly, the wiring material connecting portion 16A of the connecting terminal 16 in the cell 50B is connected to the metal substrate 21 of the counter substrate 20 in the adjacent cell 50C via the wiring material 60P, the wiring material connecting portion 16A of the connecting terminal 16 in the cell 50A is connected to the metal substrate 21 of the counter substrate 20 in the adjacent cell 50B via the wiring material 60P, and the wiring material connecting portion 16A of the connecting terminal 16 on the transparent conductive layer 12E is connected to the metal substrate 21 of the counter substrate 20 in the adjacent cell 50A via the wiring material 602. In other words, the one end of the wiring material 602 is connected to the connecting terminal 16 in the cell 50C, and the other end of the wiring material 60P is connected to the metal substrate 21 of the counter substrate 20 in the cell 50D. Herein, the metal substrate 21 constitutes a second connecting portion, and the connecting terminal 16 constitutes a first connecting portion. Namely, the connecting terminal 16 as a terminal portion also has a function as a first connecting portion. Similarly, the one end of the wiring material 602 is connected to the connecting terminal 16 in the cell 50B, and the other end of the wiring material 60P is connected to the metal substrate 21 of the counter substrate 20 in the cell 50C. In addition, the one end of the wiring material 60P is connected to the connecting terminal 16 in the cell 50A, and the other end of the wiring material 60P is connected to the metal substrate 21 of the counter substrate 20 in the cell 50B. In addition, the one end of the wiring material 60P is connected to the connecting terminal 16 on the transparent conductive layer 12E, and the other end of the wiring material 60P is connected to the metal substrate 21 of the counter substrate 20 in the cell 50A.

In addition, external connecting terminals 18*a* and 18*b* are provided on first and second current extracting portions 12*f* and 12*h*, respectively.

As illustrated in FIG. 1, the sealing portion 30A includes an annular first sealing portion 31A provided between the conductive substrate 15 and the counter substrate 20 and a second sealing portion 32A provided so as to overlap with the first sealing portion 31A to interpose an edge portion 20*a* of the counter substrate 20, together with the first sealing portion 31A. As illustrated in FIG. 4, the first sealing portions 31A adjacent to each other are integrated to constitute a first integrated sealing portion 31. In other words, the first integrated sealing portion 31 is configured by an annular portion (hereinafter, referred to as an "annular portion") 31*a* which is not provided between the two counter substrates 20 adjacent to each other and a portion (hereinafter, referred to as a "partitioning portion") 31*b* which is provided between the two counter substrates 20 adjacent to each other and partitions an inner opening 31*c* of the annular portion 31*a*. In addition, as illustrated in FIG. 5, the second sealing portions 32A are integrated between the counter substrates 20 adjacent to each other to constitute a second integrated sealing portion 32. The second integrated sealing portion 32 is configured by an annular portion (hereinafter, referred to as a "annular portion") 32*a* which is not provided between the two counter substrates 20 adjacent to each other and a portion (hereinafter, referred to as a "partitioning portion") 32*b* which is provided between the two counter substrates 20 adjacent to each other and partitions an inner opening 32*c* of the annular portion 32*a*. In addition, in the embodiment, a gap is provided between an inner wall surface of the first sealing portion 31A and the oxide semiconductor layer 13. In other words, the inner wall surface of the first sealing portion 31A and the oxide semiconductor layer 13 are separated from each other.

In addition, as illustrated in FIG. 1, the insulating material 33 is provided between the first sealing portion 31A and the conductive substrate 15 in the entire circumference along the outer shape of the annular sealing portion 30A so as to enter into the groove 90 between the transparent conductive layers 12A to 12F adjacent to each other and to span over the transparent conductive layers 12 adjacent to each other. More specifically, in the portion where the first groove 90A formed along the edge portion of the main body portion 12*a* of the transparent conductive layer 12 is formed among the grooves 90, the insulating material 33 enters into the first groove 90A and also continuously covers the edge portion of the main body portion 12*a* forming the first groove 90A. On the other hand, between the main body portion 12*a* where the first groove 90A is not formed and the protrusion portion 12*c* as well, the insulating material 33 is also formed on the transparent conductive layer 12, and the insulating material 33 is formed in the entire circumference along the outer shape of the sealing portion 30A. In addition, the insulating material 33 also continuously covers the edge portion of the transparent conductive layer 12 in the side opposite to the main body portion 12*a* while interposing the first groove 90A and is provided up to the outside of the sealing portion 30A. In addition, in the embodiment, among the grooves 90, the second groove 90B and the groove connecting the first groove 90A and the second groove 908 is not covered with the insulating material 33.

As illustrated in FIG. 1, a back sheet 80 is provided on the conductive substrate 15. The back sheet 80 is provided so as to cover the cells 50 in the side of the surface of the transparent substrate 11 where the transparent conductive layers 12 are provided. The back sheet 80 includes a stacked structure 80A including a weather resistant layer and a metal layer and an adhesive portion 80B provided in the side opposite to the metal layer with respect to the stacked structure 80A and adhered to the conductive substrate 15 via a colored insulating connection portion 14 (hereinafter, referred to as an "insulating material 14"). Herein, the adhesive portion 80B is used so as to adhere the back sheet 80 to the conductive substrate 15, and as illustrated in FIG. 1, the adhesive portion may be formed in the peripheral edge portion of the stacked structure 80A. However, the adhesive portion 80B may be provided over the entire surface of the cell 50 side of the stacked structure 80A. The peripheral edge portion 80*a* of the back sheet 80 is connected to the transparent conductive layers 12D, 12E, and 12F of the transparent conductive layers 12 via the insulating material 14 by the adhesive portion 80B. Herein, the adhesive portion 80B is separated from the sealing portion 30A of the cell 50. In addition, the insulating material 14 is also separated from the sealing portion 30A. In addition, the electrolyte 40 in the space which is inside the back sheet 80 and outside the sealing portion 30A is not filled.

In addition, as illustrated in FIG. 2, in the transparent conductive layer 12D, a wiring material 17 extends so as to pass through the main body portion 12*a*, the connecting portion 12*g*, and the current extracting portion 12*f*. Herein, the wiring material 17 is a current collecting wiring and has a lower resistance than the transparent conductive layer 12D and a current function. This wiring material 17 is disposed so as not to intersect with the insulating material 14 between the back sheet 80 and the conductive substrate 15. That is to say, the wiring material 17 is disposed on the inner side than the insulating material 14.

Meanwhile, as illustrated in FIG. 2, bypass diodes 70A to 70D are connected in parallel with the cells 50A to 50D, respectively. Specifically, the bypass diode 70A is fixed on the partitioning portion 32*b* of the second integrated sealing portion 32 between the cell 50A and the cell 50B, the bypass diode 70B is fixed on the partitioning portion 32*b* of the second integrated sealing portion 32 between the cell 50B and the cell 50C, and the bypass diode 70C is fixed on the partitioning portion 32*b* of the second integrated sealing portion 32 between the cell 50C and the cell 50D. The bypass diode 70D is fixed on the sealing portion 30A of the cell 50D. In addition, the wiring material 60Q is fixed to the metal substrate 21 of the counter substrate 20 so as to pass through the bypass diodes 70A to 70D. Moreover, the wiring material 609 branches out from the conductive materials 60Q between the bypass diodes 70A and 70B, between the bypass diodes 70B and 70C, and between the bypass diodes 70C and 70D, respectively, and is connected with the wiring material connecting portion 16A on the transparent conductive layer 12A, the wiring material connecting portion 16A on the transparent conductive layer 12B, and the wiring material connecting portion 16A on the transparent conductive layer 12C, respectively. In addition, the wiring material 60P is also fixed to the metal substrate 21 of the counter substrate 20 of the cell 50A, and this wiring material 60P connects the bypass diode 70A with the wiring material connecting portion 16A of the connecting terminal 16 on the transparent conductive layer 12E. Moreover, the bypass diode 70D is connected with the transparent conductive layer 12D via the wiring material 60P.

In addition, a desiccant 95 is provided on the counter substrate 20 of each cell 50.

In the photoelectric conversion element 100, the groove 90 is provided, and the groove 90 includes the first groove 90A formed along the outer shape of the annular sealing portion 30A. The insulating material 33 enters into the first groove 90A, and the insulating material 33 also continuously covers the edge portion of the main body portion 12a. Therefore, even if a crack occurs along the groove 90 inside the transparent substrate 11 at the position under the groove 90 and the crack is connected up to the edge portion of the main body portion 12a, infiltration of moisture through the crack from an outside of the sealing portion 30A is sufficiently suppressed by the insulating material 33. Therefore, according to the photoelectric conversion element 100, it is possible to obtain an excellent durability. In addition, according to the photoelectric conversion element 100, since the insulating material 33 is colored, as illustrated in FIG. 6, in a case where the photoelectric conversion element 100 is seen from the conductive substrate 15, it is possible to conceal the color or shape of the first sealing portion 31A and the counter substrate 20 existing in the back side of the insulating material 33. Moreover, by coloring the insulating material 33, it is possible to freely display desired characters or designs on the conductive substrate 15 of the photoelectric conversion element 100. Therefore, it is possible to realize a good outer appearance. In addition, although the color of the counter substrate 20 can be concealed by coloring the sealing portion 30A through the introduction of a colorant to the sealing portion 30A, in comparison with this case, it is possible to improve durability of the photoelectric conversion element 100.

In addition, in the photoelectric conversion element 100, since the insulating material 33 is provided in the entire circumference along the outer shape of the sealing portion 30A, infiltration passage of moisture from the outside can be blocked in the entire circumference, so that it is possible to obtain more excellent durability.

Furthermore, in the photoelectric conversion element 100, the first groove 90A is provided along the edge portion of the main body portion 12a. Therefore, in comparison with a case where the first groove 90A is formed outside the edge portion of the main body portion 12a, it is possible to make the region surrounded by the first groove 90A small, and, to miniaturize the photoelectric conversion element 100.

In addition, in the photoelectric conversion element 100, since the insulating material 14 is provided in the entire circumference of the peripheral edge portion 80a of the back sheet 80, it is possible to sufficiently suppress infiltration of moisture from an outside of the back sheet 80 into the inside of the back sheet 80.

Furthermore, in the photoelectric conversion element 100, since the insulating material 33 also enters into the first groove 90A between the transparent conductive layers 12 of the cells 50 adjacent to each other, it is possible to suppress a current flowing between the transparent conductive layers 12 and to sufficiently secure insulation. Therefore, it is possible to improve a photoelectric conversion characteristic.

In addition, in the photoelectric conversion element 100, the sealing portion 30A and the insulating material 33 are arranged so as to overlap with each other. Therefore, in comparison with a case where the insulating material 33 is arranged so as not to overlap with the sealing portion 30A, it is possible to further increase the surface area of the portion which contributes to the electricity generation as seen from the light receiving surface side of the photoelectric conversion element 100. Therefore, it is possible to further improve the aperture ratio.

In addition, in the photoelectric conversion element 100, the first current extracting portion 12f and the second current extracting portion 12h are disposed in the vicinity of the cell 50A and on the side opposite to the transparent conductive layer 12B with respect to the transparent conductive layer 12A, and the first current extracting portion 12f of the transparent conductive layer 12A and the second current extracting portion 12h of the transparent conductive layer 12F are disposed so as to be adjacent to each other via the groove 90. For this reason, in the photoelectric conversion element 100, it is possible to dispose the external connecting terminals 18a and 18b to the first current extracting portion 12f and the second current extracting portion 12h, respectively, so as to be adjacent to each other. Hence, it is possible to set the number of connectors for extracting the current from the external connecting terminals 18a and 18b to the outside to one. In other words, since the first current extracting portion 12f and the second current extracting portion 12h are disposed to be greatly spaced apart from each other, for example, in a case in which the first current extracting portion 12f is disposed on the side opposite to the transparent conductive layer 12C with respect to the transparent conductive layer 12D, the external connecting terminals 18a and 18b are disposed to be greatly spaced apart from each other as well. In this case, two connectors of a connector to be connected with the external connecting terminal 18a and a connector to be connected with the external connecting terminal 18b are required in order to extract the current from the photoelectric conversion element 100. However, according to the photoelectric conversion element 100, since it is possible to dispose the external connecting terminals 18a and 18b so as to be adjacent to each other, only one connector is required. For this reason, according to the photoelectric conversion element 100, it is possible to achieve space saving. In addition, the generated current is low in the photoelectric conversion element 100 when the photoelectric conversion element 100 is used under a low illuminance. Specifically, the generated current is 2 mA or lower. For this reason, it is possible to sufficiently suppress the deterioration of the photoelectric conversion performance of the photoelectric conversion element 100 even if a part of the transparent conductive layer 12D of the cell 50D on one end side of the cell 50A and cell 50D at both ends of the cells 50A to 50D is disposed next to the second current extracting portion 12h which is electrically connected with the metal substrate 21 of the counter substrate 20 of the cell 50A on the other end side via the groove 90 as the first current extracting portion 12f.

In addition, in the photoelectric conversion element 100, the cells 50A to 50D are arranged in a line along the X direction, the transparent conductive layer 12D of the cell 50D on one end side of the cell 50A and cell 50D at both ends of the cells 50A to 50D has the main body portion 12a provided on the inner side of the sealing portion 30A, the first current extracting portion 12f, and the connecting portion 12g which connects the main body portion 12a and the first current extracting portion 12f. For this reason, it is possible to more shorten the installation region of the connecting terminal 16 provided along the arrangement direction (X direction in FIG. 2) of the cells 50A to 50D in order to connect two adjacent cells 50 compared to a case in which the cells 50C and 50D of a part of the cells 50A to 50D are folded back in the middle and the cell 50A and the cell 50D are disposed so as to be adjacent to each other, and thus it is possible to achieve space saving to a greater extent. Furthermore, according to the photoelectric conversion element 100, since the generated current is typically low in a case in which the photoelectric conversion element 100 is used in a low illuminance environment, it is possible to sufficiently suppress the deterioration of the photoelectric conversion characteristics even if the photoelectric conversion element 100 further has the connecting portion 12g which connects the main body portion 12a and the first current extracting portion 12f.

In addition, in the photoelectric conversion element 100, a wiring material 17 is arranged so as not to intersect the insulating material 14 between the back sheet 80 and the conductive substrate 15. Since the wiring material 17 is generally porous, the wiring material has gas permeability, and thus, gases such as water vapor are permeable. For this reason, if the wiring material 17 is arranged so as not to intersect the insulating material 14 between the back sheet 80 and the conductive substrate 15, the infiltration of water vapor or the like from the outside through the wiring material 17 into the space between the back sheet 80 and the conductive substrate 15 can be prevented. As a result, the photoelectric conversion element 100 can have excellent durability. In addition, since the wiring material 17 has a lower resistance than that of the transparent conductive layer 12D, even when a generating current becomes large, a deterioration in photoelectric conversion characteristics can be sufficiently suppressed.

Furthermore, the connecting terminal 16 is less likely to peel off from the protruding portion 12c of the transparent conductive layer 12 as the width of the connecting terminal 16 is narrower in a case in which the photoelectric conversion element 100 is placed in an environment in which the temperature change is great. With regard to that point, in the photoelectric conversion element 100, the wiring material non-connecting portion 16B of the connecting terminal 16 has a narrower width than the wiring material connecting portion 16A connected with the wiring material 60P. For this reason, the wiring material non-connecting portion 16B of the connecting terminals 16 is less likely to peel off from the protruding portion 12c of the transparent conductive layer 12. Hence, the wiring material non-connecting portion 16B does not peel off from the transparent conductive layer 12 and thus it is possible to maintain the connection with the transparent conductive layer 12 even if the wiring material connecting portion 16A peels off from the protruding portion 12c of the transparent conductive layer 12. Furthermore, it is possible to normally operate the photoelectric conversion element 100 even if the wiring material connecting portion 16A peels off from the protruding portion 12c of the transparent conductive layer 12. Consequently, according to the photoelectric conversion element 100, it is possible to improve the connection reliability. In addition, the wiring material 60P connected with the metal substrate 21 of the counter substrate 20 of one cell 50 of two adjacent cells 50 is connected with the wiring material connecting portion 16A on the protruding portion 12c of the other cell 50, and the wiring material connecting portion 16A is provided on the protruding portion 12c and on the outer side of the sealing portion 30A. In other words, the connection of two adjacent cells 50 is performed on the outer side of the sealing portion 30A. For this reason, according to the photoelectric conversion element 100, it is possible to improve the aperture ratio.

In addition, in the photoelectric conversion element 100, in the cell 50 that is connected with the adjacent cell 50 among the cells 50A to 50D, the protruding portion 12c has the projecting portion 12d which laterally projects from the main body portion 12a and the facing portion 12e which extends from the projecting portion 12d and faces the main body portion 12a of the adjacent cell 50, and at least the wiring material connecting portion 16A of the connecting terminal 16 is provided on the facing portion 12e.

In this case, since at least the wiring material connecting portion 16A of the connecting terminal 16 is provided on the facing portion 12e facing the main body portion 12a of the adjacent cell 50, it is possible to sufficiently prevent the wiring material 60P connected with the wiring material connecting portion 16A from passing over the metal substrate 21 of the counter substrate 20 of the adjacent cell 50 unlike the case in which at least the wiring material connecting portion 16A of the connecting terminal 16 is not provided on the facing portion 12e facing the main body portion 12a of the adjacent cell 50. As a result, it is possible to sufficiently prevent the short circuit between the adjacent cells 50.

In addition, in the photoelectric conversion element 100, both of the wiring material connecting portion 16A and the wiring material non-connecting portion 16B are disposed along the sealing portion 30A. For this reason, it is possible to save the space required for the connecting terminal 16 compared to the case of disposing the wiring material connecting portion 16A and the wiring material non-connecting portion 16B in the direction away from the sealing portion 30A.

Furthermore, in the photoelectric conversion element 100, the adhesive portion 80B of the back sheet 80 is spaced apart from the sealing portion 30A of the cell 50. For this reason, it is sufficiently suppressed that the sealing portion 30A is stretched since the adhesive portion 80B is constricted at a low temperature and thus an excessive stress is applied to the interface between the sealing portion 30A and the conductive substrate 15 or the counter substrate 20. In addition, at a high temperature as well, it is sufficiently suppressed that the sealing portion 30A is pushed since the adhesive portion 80B expands and thus an excessive stress is applied to the interface between the sealing portion 30A and the conductive substrate 15 or the counter substrate 20. In other words, it is sufficiently suppressed that an excessive stress is applied to the interface between the sealing portion 30A and the conductive substrate 15 or the counter substrate 20 both at a high temperature and a low temperature. For this reason, it is possible for the photoelectric conversion element 100 to exhibit excellent durability.

Next, the conductive substrate 15, the connecting terminal 16, the oxide semiconductor layer 13, the insulating material 14, the dye, the counter substrate 20, the sealing portion 30A, the electrolyte 40, the wiring materials 60P and 60Q, the back sheet 80, and the desiccant 95 will be described in detail.

(Conductive Substrate)

The material constituting the transparent substrate 11 contained in the conductive substrate 15 may be any transparent material, for example, and examples of such a transparent material may include glass such as borosilicate glass, soda lime glass, glass which is made of soda lime and whose iron component is less than that of ordinary soda lime glass, and quartz glass, polyethylene terephthalate (PET), polyethylene naphthalate (PEN), polycarbonate (PC), and polyethersulfone (PES). The thickness of the transparent substrate 11 is appropriately determined depending on the size of the photoelectric conversion element 100 and is not particularly limited, but it may be set into the range of from 50 to 10000 µm, for example.

Examples of the material contained in the transparent conductive layer 12 contained in the conductive substrate 15 may include a conductive metal oxide such as indium-tin-oxide (ITO), tin oxide ($SnO_2$), and fluorine-doped-tin-oxide (FTO). The transparent conductive layer 12 may be constituted by a single layer or a laminate consisting of a plurality of layers containing different conductive metal oxides. It is preferable that the transparent conductive layer 12 contain FTO since FTO exhibits high heat resistance and chemical resistance in a case in which the transparent conductive layer 12 is constituted by a single layer. The transparent conductive layer 12 may further contain a glass frit. The thickness of the transparent conductive layer 12 may be set into the range of from 0.01 to 2 µm, for example.

In addition, the resistance value of the connecting portion 12g of the transparent conductive layer 12D of the transparent conductive layers 12 is not particularly limited but is preferably equal to or less than the resistance value represented by the following Equation (1).

$$\text{Resistance value} = \text{number of cell 50 connected in series} \times 120\ \Omega \quad (1)$$

In this case, it is possible to sufficiently suppress the deterioration of the performance of the photoelectric conversion element 100 compared to a case in which the resistance value of the connecting portion 12g exceeds the resistance value represented by Equation (1) above. In the present embodiment, the number of cells 50 is 4 and thus the resistance value represented by Equation (1) above becomes 480 Ω, and consequently, the resistance value of the connecting portion 12g is preferably 480 Ω or less.

In addition, although the groove 90 formed in the transparent conductive layer 12 includes the first groove 90A and the second groove 90B, the groove 90 may not necessarily include the second groove 90B.

(Connecting Terminal)

The connecting terminal 16 contains a metallic material. Examples of the metallic material may include silver, copper and indium. These may be used singly or in combination of two or more kinds thereof.

In addition, the connecting terminal 16 may be constituted by the same material as or a different material from the wiring material 60P but it is preferable to be constituted by the same material.

In this case, it is possible to more sufficiently improve the adhesive property of the connecting terminal 16 with the wiring material 60P since the connecting terminal 16 and the wiring material 60P are constituted by the same material. For this reason, it is possible to more improve the connection reliability of the photoelectric conversion element 100.

In the connecting terminal 16, the width of the wiring material non-connecting portion 16B is not particularly limited as long as it is narrower than the width of the wiring material connecting portion 16A, but it is preferable to be equal to or less than ½ of the width of the wiring material connecting portion 16A.

In this case, it is possible to more improve the connection reliability of the photoelectric conversion element 100 compared to a case in which the width of the wiring material non-connecting portion 16B exceeds ½ of the width of the wiring material connecting portion 16A.

The width of the wiring material connecting portion 16A is not particularly limited but is preferably from 0.5 to 5 mm and more preferably from 0.8 to 2 mm.

In addition, the widths of the wiring material connecting portion 16A and the wiring material non-connecting portion 16B of the connecting terminal 16 may not be constant. For example, each of the widths of the wiring material connecting portion 16A and the wiring material non-connecting portion 16B may change along the extending direction of the connecting terminal 16. For example, the width may monotonically increase from the end portion on the farthest side from the wiring material connecting portion 16A of the wiring material non-connecting portion 16B toward the end portion on the closest side thereof, and the width may monotonically increase from the end portion of the wiring material non-connecting portion 16B side of the wiring material connecting portion 16A toward the end portion on the farthest side from the conductive member non-connecting portion 16B.

In addition, the wiring material connecting portion 16A and the wiring material non-connecting portion 16B are provided along the sealing portion 30A, respectively, but these may be formed so as to extend in the direction away from the sealing portion 30A. However, in this case, it is preferable that the wiring material connecting portion 16A be disposed at the position closer to the sealing portion 30A than the wiring material non-connecting portion 16B. In this case, it is possible to more shorten the wiring material 602.

Alternatively, in the connecting terminal 16 formed on the transparent conductive layers 12A to 12C, the wiring material non-connecting portion 16B may be disposed so as to be orthogonal to the wiring material connecting portion 16A.

(Oxide Semiconductor Layer)

The oxide semiconductor layer 13 is constituted by oxide semiconductor particles. The oxide semiconductor particles are constituted by, for example, titanium oxide ($TiO_2$), silicon oxide ($SiO_2$), zinc oxide (ZnO), tungsten oxide ($WO_3$), niobium oxide ($Nb_2O_5$), strontium titanate ($SrTiO_3$), tin oxide ($SnO_2$), indium oxide ($In_3O_3$), zirconium oxide ($ZrO_2$), thallium oxide ($Ta_2O_5$), lanthanum oxide ($La_2O_3$), yttrium oxide ($Y_2O_3$), holmium oxide ($Ho_2O_3$), bismuth oxide ($Bi_2O_3$), cerium oxide ($CeO_2$), aluminum oxide ($Al_2O_3$), or two or more kinds of these.

The oxide semiconductor layer 13 is typically constituted by an absorbing layer for absorbing light, but may be constituted by an absorbing layer and a reflective layer to return the light that is transmitted through the absorbing layer to the absorbing layer by reflecting the light.

The thickness of the oxide semiconductor layer 13 is typically in a range of 0.5 to 50 µm, preferably in a range of 18 to 35 µm. In this case, in comparison with a case where the thickness is less than 18 µm, it is possible to sufficiently suppress the phenomenon that the periphery of the oxide semiconductor layer 13 is seen bright by reflected light or scattered light from the oxide semiconductor layer 13 in a case where the photoelectric conversion element 100 is seen from the conductive substrate 15 side. On the other hand, if the thickness is in a range of 18 to 35 µm, in comparison with a case where the thickness exceeds 35 µm, it is possible to sufficiently suppress peeling of the oxide semiconductor layer 13 from the transparent conductive layer 12 or occurrence of a crack in the oxide semiconductor layer 13.

(Insulating Material)

As the insulating material 33, an inorganic material such as a colored glass frit or a colored resin can be used. Among them, the insulating material 33 is preferably a colored glass frit. Since the colored glass frit has a higher sealing ability than a resin material, it is possible to effectively suppress infiltration of moisture or the like from the first groove 90A. The thickness of the insulating material 33 is typically in a range of 10 to 30 µm, preferably in a range of 15 to 25 µm. In addition, the width of the edge portion of the transparent conductive layer 12 covered by the insulating material 33 is preferably 0.2 mm or more, more preferably 0.5 mm or more. By setting the covered width of the edge portion of the transparent conductive layer 12 to 0.2 mm or more, it is possible to sufficiently secure insulation between the transparent conductive layers 12 of the cells 50 adjacent to each other. However, the width of the edge portion of the transparent conductive layer 12 covered by the insulating material 33 is preferably 5 mm or less.

The color of the insulating material 33 is not particularly limited, and various colors may be used according to the purposes. For example, if characters or designs are not displayed on the conductive substrate 15, the color of the insulating material 33 may be a color of the same class as that of the oxide semiconductor layer 13. Herein, the color of the same class as that of the oxide semiconductor layer 13 denotes a color in which the difference in each of $L^*$, $a^*$ and $b^*$ of the $L^*a^*b^*$ of the $L^*a^*b^*$ color space between the insulating material 33 and the oxide semiconductor layer 13 is 5 or less.

If the material constituting the insulating material 14 can adhere the back sheet 80 and the transparent conductive layer 12, is colored, and has an insulating property, the material is not particularly limited. As the material constituting the insulating material 14, for example, a colored glass frit, a mixture of a resin material same as a resin material used for the sealing portion 31A and a colorant, or the like can be used. Among them, the insulating material 14 is preferably a colored glass frit. Since the colored glass frit has higher sealing performance than the resin material, the color glass frit can effectively suppress infiltration of moisture or the like from the outside of the back sheet 80.

Since the insulating material 14 is colored, the color or surface shape of the back sheet 80 can be concealed by the insulating material 14. In addition, by coloring the insulating material 14, it is possible to freely display desired characters or designs on the conductive substrate 15 of the photoelectric conversion element 100. Therefore, even in a case where the photoelectric conversion element 100 includes the back sheet 80, it is possible to realize a good outer appearance.

(Dye)

As the dye, for example, a photosensitizing dye such as a ruthenium complex having a ligand including a bipyridine structure, a terpyridine structure, or the like, an organic dye such as porphyrin, eosin, rhodamine, or merocyanine; and an organic-inorganic composite dye such as a halogenated lead-based perovskite may be exemplified. As the halogenated lead-based perovskite, for example, $CH_3NH_3PbX_3$ (X=Cl, Br, I) is used. Herein, in a case where a photosensitizing dye is used as the dye, the photoelectric conversion element 100 becomes a dye-sensitized photoelectric conversion element.

Among the above-mentioned dyes, a photosensitizing dye configured by the ruthenium complex having a ligand including a bipyridine structure or a terpyridine structure is preferred. In this case, it is possible to more improve the photoelectric conversion characteristic of the photoelectric conversion element 100.

(Counter Substrate)

As described above, the counter substrate 20 comprises a metal substrate 21 which serves as a substrate and electrode and a conductive catalyst layer 22 which is provided on the conductive substrate 15 side of the metal substrate 21 and promotes the reduction reaction on the surface of the counter substrate 20.

The metal substrate 21 is constituted by, for example, a corrosion-resistant metallic material such as titanium, nickel, platinum, molybdenum, tungsten, aluminum, or stainless steel. The thickness of the metal substrate 21 is appropriately determined depending on the size of the photoelectric conversion element 100 and is not particularly limited, but it may be set to from 0.005 to 0.1 mm, for example.

The catalyst layer 22 is configured by platinum, a carbon-based material, a conductive polymer, or the like. Among them, a carbon-based material is preferred in terms that, in a case where the photoelectric conversion element 100 is seen from the light incident side of the conductive substrate 15, the color, shape, and the like of the counter substrate 20 seen from a gap between the oxide semiconductor layer 13 and the sealing portion 30 are visually made less noticeable. Herein, examples of the carbon-based material include carbon black, carbon nanotube, Ketjen black, and the like. These materials may be used singly or in combination of two or more kinds thereof.

(Sealing Portion)

The sealing portion 30A is constituted by the first sealing portion 31A and the second sealing portion 32A.

Examples of the material constituting the first sealing portion 31A may include a resin such as a modified polyolefin resin including an monomer, an ethylene-vinyl acetic anhydride copolymer, an ethylene-methacrylic acid copolymer, an ethylene-vinyl alcohol copolymer and the like, an ultraviolet-cured resin, and vinyl alcohol polymer.

The thickness of the first sealing portion 31A is typically from 40 to 90 µm and preferably from 60 to 80 µm.

Examples of the material constituting the second sealing portion 32A may include a resin such as a modified polyolefin resin including an ionomer, an ethylene-vinyl acetic anhydride copolymer, an ethylene-methacrylic acid copolymer, an ethylene-vinyl alcohol copolymer and the like, an ultraviolet-cured resin, and vinyl alcohol polymer in the same manner as the first sealing portion 31A.

The thickness of the second sealing portion 32A is typically from 20 to 45 µm and preferably from 30 to 40 µm.

Meanwhile, in the sealing portion 30A, the second sealing portion 32A may be omitted.

The width P of the adhesive portion of the counter substrate 20 with the partitioning portion 31b is 25% or more and less than 100% of the width Q of the adhesive portion of the counter substrate 20 with the annular portion 31a of the first integrated sealing portion 31. In this case, it is possible to exhibit more excellent durability compared to a case in which the width P of the adhesive portion is less than 25% of the width Q of the adhesive portion. The width P of the adhesive portion is more preferably 30% or more and even more preferably 40% or more of the width Q of the adhesive portion.

In the photoelectric conversion element 100, the width R of the partitioning portion 31b of the first integrated sealing portion 31 is preferably 100% or more and less than 200% and more preferably from 120 to 180% of the width T of the annular portion 31a of the first integrated sealing portion 31.

In this case, it is possible to balance a great aperture ratio and excellent durability.

Furthermore, the width P of the adhesive portion of the surface on the conductive substrate 15 side of the counter substrate 20 with the partitioning portion 31b of the first integrated sealing portion 31 is narrower than the width Q of the adhesive portion of the surface on the conductive substrate 15 side of the counter substrate 20 with the annular portion 31a of the first integrated sealing portion 31.

In this case, it is possible to more sufficiently improve the aperture ratio of the photoelectric conversion element 100. However, the width P of the adhesive portion is the same as or more than the width Q of the adhesive portion.

In addition, in the photoelectric conversion element 100, it is preferable that the adjacent first sealing portions 31A be integrated between the adjacent counter substrates 20 and the adjacent second sealing portions 32A be integrated between the adjacent counter substrates 20.

Here, the sealing portion exposed to the atmosphere is in two places in between the adjacent cells 50 if the adjacent first sealing portions 31A are not integrated. In contrast to this, in the photoelectric conversion element 100, the sealing portion exposed to the atmosphere is in one place in between the adjacent cells 50 since the adjacent first sealing portions 31A are integrated. In other words, the sealing portion exposed to the atmosphere is in only one place of the partitioning portion 31b in between the adjacent cells 50 since the first integrated sealing portion 31 is constituted by the annular portion 31a and the partitioning portion 31b. In addition, the penetration distance of moisture or the like from the atmosphere to the electrolyte 40 increases since the first sealing portions 31A are integrated. For this reason, it is possible to sufficiently reduce the amount of moisture or air penetrating from the outside of the cell 50 in between the adjacent cells 50. In other words, it is possible to sufficiently improve the sealing ability of the photoelectric conversion element 100. In addition, according to the photoelectric conversion element 100, the adjacent first sealing portions 31A are integrated. For this reason, it is possible to secure a sufficient sealing width at the partitioning portion 31b even if the width P of the adhesive portion of the surface on the conductive substrate 15 side of the counter substrate 20 with the partitioning portion 31b of the first integrated sealing portion 31 is narrower than the width Q of the adhesive portion of the surface on the conductive substrate 15 side of the counter substrate 20 with the annular portion 31a of the first integrated sealing portion 31. In other words, according to the photoelectric conversion element 100, it is possible to sufficiently increase the bonding strength of the first sealing portion 31A with the conductive substrate 15 and the bonding strength of the first sealing portion 31A with the counter substrate 20 while improving the aperture ratio. As a result, it is possible to improve the aperture ratio as well as it is possible to sufficiently suppress the peeling of the first sealing portion 31A from the conductive substrate 15 and the counter substrate 20 even if the electrolyte 40 expands and thus an excessive stress directed from the inner side to the outer side of the first sealing portion 31A is applied in the case of using the photoelectric conversion element 100 under a high temperature and thus it is possible to exhibit excellent durability.

Furthermore, it is preferable that the width R of the partitioning portion 31b of the first integrated sealing portion 31 is 100% or more and less than 200% of the width T of the annular portion 31a of the first integrated sealing portion 31.

In this case, since the width of the partitioning portion 31b is 100% or more of the width T of the annular portion 31a in the partitioning portion 31b of the first integrated sealing portion 31, the penetration distance of moisture or the like from the atmosphere to the electrolyte 40 increases compared to a case in which the width R of the partitioning portion 31b is less than 100% of the width T of the annular portion 31a in the partitioning portion 31b of the first integrated sealing portion 31. For this reason, it is possible to more sufficiently suppress that the moisture penetrates from the outside through the partitioning portion 31b present between the adjacent cells 50. On the other hand, it is possible to more improve the aperture ratio compared to a case in which the width R of the partitioning portion 31b exceeds 200% of the width T of the annular portion 31a. However, the width R of the partitioning portion 31b may be less than 100% or more than 200% of the width T of the annular portion 31a of the first integrated sealing portion 31.

In addition, the second integrated sealing portion 32 has a main body portion 32d provided in the side of the counter substrate 20 opposite to the working electrode 10 and an adhesion portion 32e provided between the counter substrates 20 adjacent to each other. The second integrated sealing portion 32 is preferably adhered to the first integrated sealing portion 31 by the adhesion portion 32e.

Therefore, even if a stress is exerted on the counter substrate 20 in a direction away from the working electrode 10, the peeling thereof is sufficiently suppressed by the second sealing portion 32A. In addition, since the partitioning portion 32b of the second integrated sealing portion 32 is adhered to the first sealing portion 31A through a gap S between the counter substrates 20 adjacent to each other, the contact between the counter substrates 20 of the cells 50 adjacent to each other is securely prevented.

Herein, the edge portion 20a of the counter substrate 20 is preferably interposed by the first sealing portion 31A and the second sealing portion 32A.

However, the second sealing portion 32A may not be adhered to the first sealing portion 31A. In addition, the annular first sealing portions 31A of the cells 50 adjacent to each other may not be necessarily integrated. Namely, the annular first sealing portions 31A may be separated from each other.

(Electrolyte)

The electrolyte 40 contains, for example, a redox couple such as $I^-/I_3^-$ and an organic solvent. It is possible to use acetonitrile, methoxy acetonitrile, methoxy propionitrile, propionitrile, ethylene carbonate, propylene carbonate, diethyl carbonate, γ-butyrolactone, valeronitrile, pivalonitrile, glutaronitrile, methacrylonitrile, isobutyronitrile, phenyl acetonitrile, acrylonitrile, succinonitrile, oxalonitrile, pentanenitrile, and adiponitrile as the organic solvent. Examples of the redox couple may include a redox couple such as bromine/bromide ion, a zinc complex, an iron complex, and a cobalt complex in addition to $I^-/I_3^-$. In addition, the electrolyte 40 may use an ionic liquid instead of the organic solvent. As the ionic liquid, it is possible to use, for example, an ordinary temperature molten salt which is a known iodine salt, such as a pyridinium salt, an imidazolium salt, and a triazolium salt, and which is in a molten state at around room temperature. As such an ordinary temperature molten salt, it is possible to suitably use, for example, 1-hexyl-3-methylimidazolium iodide, 1-ethyl-3-propylimidazolium iodide, dimethylimidazolium iodide, ethylmethylimidazolium iodide, dimethyipropylimidazolium iodide, butylmethylimidazolium iodide, or methylpropylimidazolium iodide.

In addition, the electrolyte 40 may use a mixture of the ionic liquid above and the organic solvent above instead of the organic solvent above.

In addition, it is possible to add an additive to the electrolyte 40. Examples of the additive may include LiI, $I_2$, 4-t-butylpyridine, guanidinium thiocyanate, 1-methylbenzimidazole, and 1-butylbenzimidazole.

Moreover, as the electrolyte 40, a nanocomposite gel electrolyte which is a quasi-solid electrolyte obtained by kneading nanoparticles such as $SiO_2$, $TiO_2$, and carbon nanotubes with the electrolyte above into a gel-like form may be used, or an electrolyte gelled using an organic gelling agent such as polyvinylidene fluoride, a polyethylene oxide derivative, and an amino acid derivative may also be used.

In addition, the electrolyte 40 contains redox couples composed of $I^-/I_3^-$, and the concentration of $I_3^-$ is preferably 0.006 mol/liter or less. In this case, since the concentration of $I_3^-$ carrying electrons is low, it is possible to further reduce a leakage current. Therefore, since the open-circuit voltage can be further increased, it is possible to further improve the photoelectric conversion characteristic. Particularly, the concentration of $I_3^-$ is preferably 0.005 mol/liter or less, more preferably in a range of 0 to $6\times10^{-6}$ mol/liter, even more preferably in a range of 0 to $6\times10^{-8}$ mol/liter. In this case, in a case where the photoelectric conversion element 100 is seen from the light incident side of the conductive substrate 15, it is possible to make the color of the electrolyte 40 visually less noticeable.

(Wiring Material)

As the wiring materials 60P and 60Q, for example, a metal film is used. It is possible to use, for example, silver or copper as the metallic material constituting the metal film.

(Back Sheet)

As described above, the back sheet 80 includes the laminate 80A including a weather resistant layer and a metal layer and the adhesive portion 80B which is provided on the surface of the cell 50 side of the laminate 80A and adheres the laminate 80A and the insulating material 14.

The weather resistant layer may be constituted by, for example, polyethylene terephthalate or polybutylene terephthalate.

The thickness of the weather resistant layer may be from 50 to 300 μm, for example.

The metal layer may be constituted by, for example, a metallic material containing aluminum. The metallic material is typically constituted by aluminum simple substance but may be an alloy of aluminum and other metals. Examples of the other metals may include copper, manganese, zinc, magnesium, lead, and bismuth. Specifically, a 1000 series aluminum is desirable in which other metals are added to pure aluminum of 98% or higher purity in a trace quantity. This is because this 1000 series aluminum is inexpensive and excellent in workability compared to other aluminum alloys.

The thickness of the metal layer is not particularly limited but may be from 12 to 30 μm, for example.

The laminate 80A may further include a resin layer. Examples of the material constituting the resin layer may include a butyl rubber, a nitrile rubber, and a thermoplastic resin. These can be used singly or in combination of two or more kinds thereof. The resin layer may be formed on the entire surface on the side opposite to the weather resistant layer of the metal layer or may be formed only on the peripheral portion thereof.

Examples of the material constituting the adhesive portion 80B may include a butyl rubber, a nitrile rubber, and a thermoplastic resin. These can be used singly or in combination of two or more kinds thereof. The thickness of the adhesive portion 80B is not particularly limited but may be from 300 to 1000 μm, for example.

In addition, the back sheet 80 and the transparent conductive layer 12 may not necessarily be adhered to each other via the insulating material 14. In addition, the photoelectric conversion element 100 may not necessarily include the back sheet 80.

(Desiccant)

The desiccant 95 may be in a sheet shape or granular. The desiccant 95 may be one which absorbs moisture, for example, and examples of the desiccant 95 may include silica gel, alumina, and zeolite.

Figure 8:
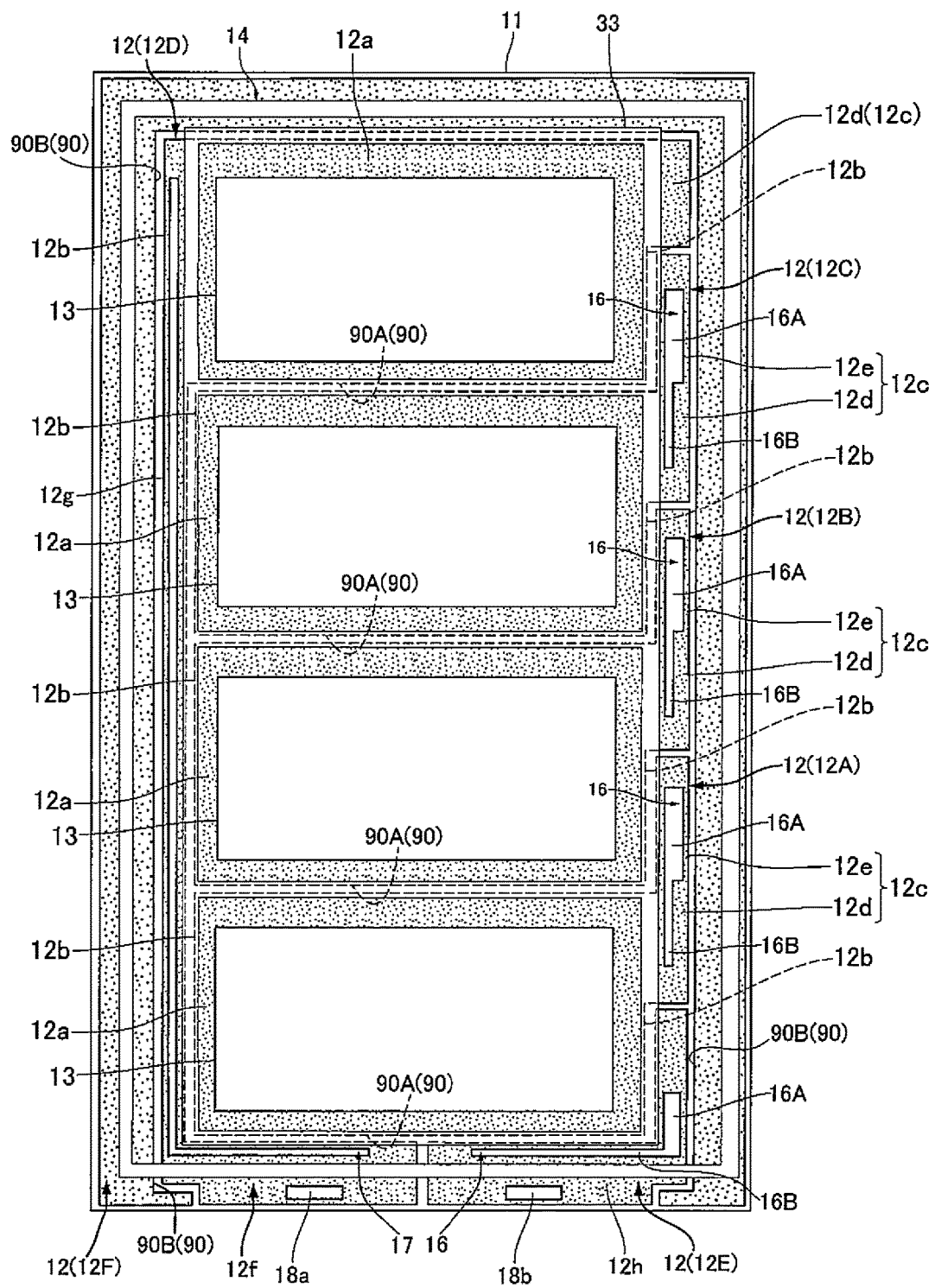
FIG. 8 is a plan view illustrating a working electrode on which an insulating material and a connection portion for fixing a back sheet are formed.
Figure 9:
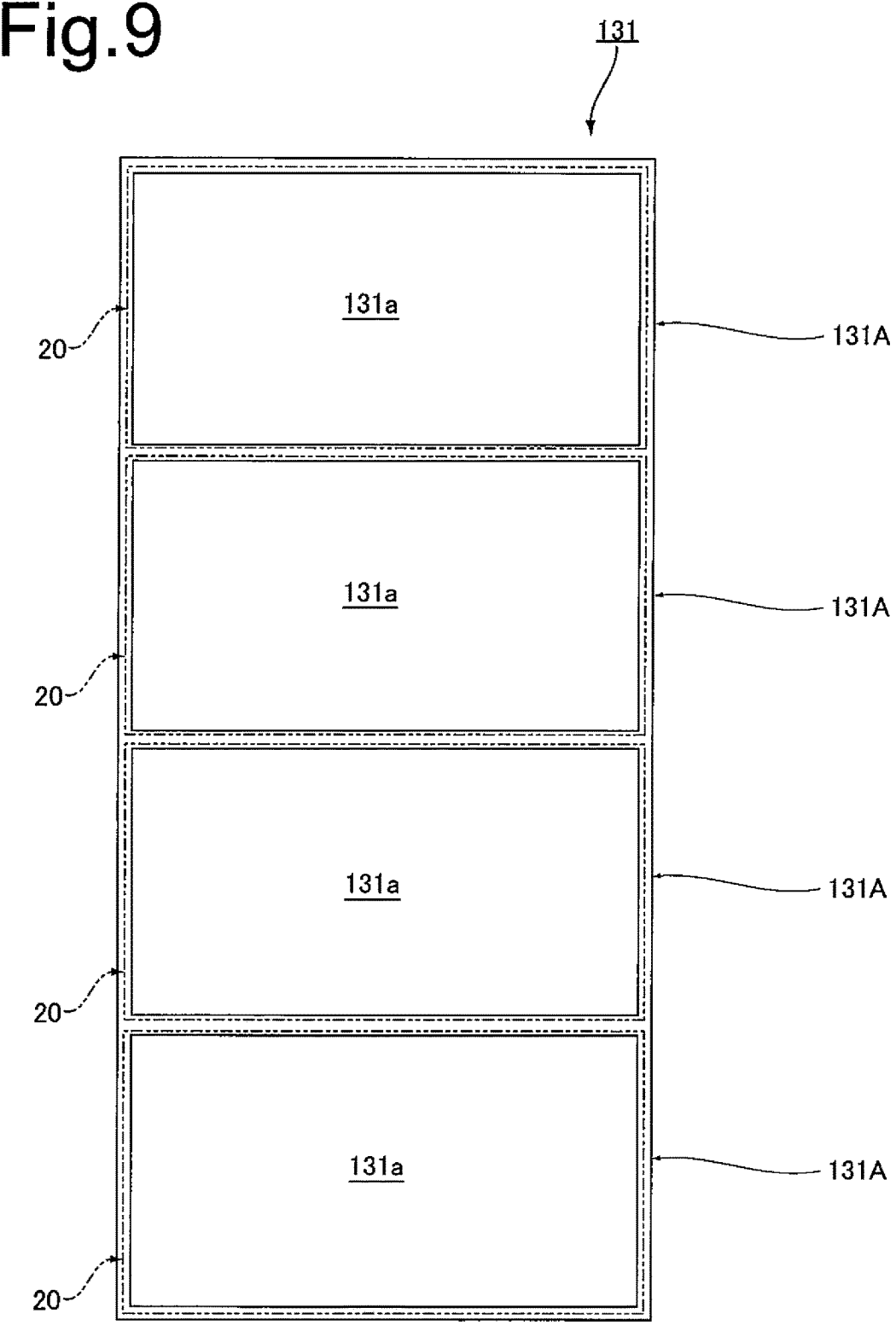
FIG. 9 is a plan view illustrating a first integrated sealing portion forming body for forming the first integrated sealing portion of FIG. 4.

Next, the method of manufacturing the photoelectric conversion element 100 will be described with reference to FIG. 3, FIG. 8 and FIG. 9. FIG. 8 is a plan view illustrating a working electrode on which an insulating material covering a groove and a coupling portion for firing a backsheet are formed. FIG. 9 is a plan view illustrating a first integrated sealing portion forming body for forming a first integrated sealing portion of FIG. 4.

First, a laminate obtained by forming a transparent conductive layer on one transparent substrate 11 is prepared.

As the method of forming the transparent conductive layer, a sputtering method, a vapor deposition method, a spray pyrolysis deposition method, or a CVD method is used.

Next, as illustrated in FIG. 3, the groove 90 is formed with respect to the transparent conductive layer, and the transparent conductive layers 12A to 12F which are disposed in an insulated state to interpose the groove 90 between one another are formed. Specifically, the four transparent conductive layers 12A to 12D corresponding to the cells 50A to 50D are formed so as to have the quadrangular-shaped main body portion 12a and the protruding portion 12c. At this time, the transparent conductive layers 12A to 12C corresponding to the cells 50A to 50C are formed such that the protruding portion 12c has not only the projecting portion 12d but also the facing portion 12e which extends from the projecting portion 12d and faces the main body portion 12a of the adjacent cell 50. In addition, the transparent conductive layer 12D is formed so as to have not only the quadrangular-shaped main body portion 12a and the projecting portion 12d but also the first current extracting portion 12f and the connecting portion 12g connecting the first current extracting portion 12f and the main body portion 12a. At this time, the first current extracting portion 12f is formed so as to be disposed on the side opposite to the transparent conductive layer 12B with respect to the transparent conductive layer 12A. Moreover, the transparent conductive layer 12E is formed so as to form the second current extracting portion 12h. At this time, the second current extracting portion 12h is formed so as to be disposed on the side opposite to the transparent conductive layer 12B with respect to the transparent conductive layer 12A and to be disposed next to the first current extracting portion 12f via the groove 90.

It is possible to form the groove 90 by, for example, a laser scribing method using a YAG laser, a $CO_2$ laser or the like as the light source.

In this manner, the conductive substrate 15 obtained by forming a transparent conductive layer 12 on the transparent substrate 11 is obtained.

Next, a precursor of the connecting terminal 16 constituted by the wiring material connecting portion 16A and the wiring material non-connecting portion 16B is formed on the protruding portion 12c of the transparent conductive layers 12A to 12C. Specifically, the precursor of the connecting terminal 16 is formed such that the wiring material connecting portion 16A is provided on the facing portion 12e. In addition, the precursor of the connecting terminal 16 is also formed on the transparent conductive layer 12E. In addition, the precursor of wiring material non-connecting portion 163 is formed so as to be narrower than the width of the wiring material connecting portion 16A. The precursor of the connecting terminal 16 can be formed, for example, by applying a silver paste and drying it.

Moreover, a precursor of the wiring material 17 is formed on the connecting portion 12*g* of the transparent conductive layer 12D. The precursor of the wiring material 17 can be formed, for example, by applying a silver paste and drying it.

In addition, precursors of the external connecting terminals 18*a* and 18*b* for extracting the current to the outside are respectively formed on the first current extracting portion 12*f* and the second current extracting portion 12*h* of the transparent conductive layer 12A. The precursor of the external connecting terminal can be formed, for example, by applying a silver paste and drying it.

Furthermore, a precursor of the insulating material 33 is formed so as to enter into the first groove 90A formed along the edge portion of the main body portion 12*a* and to cover the edge portion of the main body portion 12*a* as well. The insulating material 33 can be formed, for example, by applying a paste containing a colored glass frit and drying it.

In addition, in order to fix the back sheet 80, in the same manner as the insulating material 33, a precursor of the annular insulating material 14 is formed so as to surround the insulating material 33 and to pass through the transparent conductive layer 12D, the transparent conductive layer 12E, and the transparent conductive layer 12F.

Furthermore, a precursor of the oxide semiconductor layer 13 is formed on the main body portion 12*a* of each of the transparent conductive layers 12A to 12D. The precursor of the oxide semiconductor layer 13 can be formed by printing and then drying a paste for porous oxide semiconductor layer formation containing oxide semiconductor particles.

The paste for oxide semiconductor layer formation contains a resin such as polyethylene glycol and a solvent such as terpineol in addition to the oxide semiconductor particles.

It is possible to use, for example, a screen printing method, a doctor blading method, or a bar coating method as the printing method of the paste for oxide semiconductor layer formation.

Thereafter, the precursor of the connecting terminal 16, the precursor of the insulating material 33, the precursor of the insulating material 14, and the precursor of the oxide semiconductor layer 13 are collectively fired to form the connecting terminal 16, the insulating material 33, the insulating material 14, and the oxide semiconductor layer 13.

At this time, the firing temperature varies depending on the kind of the oxide semiconductor particles or the glass frit but is typically from 350 to 600° C., and the firing time also varies depending on the kind of the oxide semiconductor particles or the glass frit but is typically from 1 to 5 hours.

In this manner, as illustrated in FIG. 8, the working electrode 10 on which the insulating material 33 and the insulating material 14 for fixing the back sheet 80 are formed is obtained.

Next, the dye is supported on the oxide semiconductor layer 13 of the working electrode 10. For this, the dye may be adsorbed on the oxide semiconductor layer 13 by immersing the working electrode 10 in a solution containing the dye, the extra dye is then washed out with the solvent component of the above solution, and drying is performed, thereby the dye may be adsorbed on the oxide semiconductor layer 13. However, it is also possible to support the dye on the oxide semiconductor layer 13 by applying a solution containing the dye on the oxide semiconductor layer 13 and then drying to adsorb the dye on the oxide semiconductor layer 13.

Next, the electrolyte 40 is disposed on the oxide semiconductor layer 13.

Next, as illustrated in FIG. 9, a first integrated sealing portion forming body 131 for forming the first integrated sealing portion 31 is prepared. The first integrated sealing portion forming body 131 can be obtained by preparing one sheet of resin film for sealing composed of the material constituting the first integrated sealing portion 31 and forming a quadrangular-shaped opening 131*a* in the resin film for sealing as many as the number of the cells 50. The first integrated sealing portion forming body 131 has a structure formed by integrating a plurality of first sealing portion forming bodies 131A.

Thereafter, this first integrated sealing portion forming body 131 is adhered on the working electrode 10. At this time, the first integrated sealing portion forming body 131 is adhered to the working electrode 10 so as to be superimposed on the insulating material 33. The adhesion of the first integrated sealing portion forming body 131 to the working electrode 10 can be performed by heating the first integrated sealing portion forming body 131 to melt. In addition, the first integrated sealing portion forming body 131 is adhered to the working electrode 10 such that the main body portion 12*a* of the transparent conductive layer 12 is disposed on the inner side of the first integrated sealing portion forming body 131.

Meanwhile, the counter substrates 20 are prepared to have the same number as the number of the cells 50.

The counter substrate 20 can be obtained by forming the conductive catalyst layer 22 which promotes the reduction reaction on the surface of the counter substrate 20 on the metal substrate 21.

Next, one more piece of the first integrated sealing portion forming body 131 described above is prepared. Thereafter, each of the plural counter substrates 20 is bonded so as to close each of the openings 131*a* of the first integrated sealing portion forming body 131.

Next, the first integrated sealing portion forming body 131 adhered to the counter substrate 20 and the first integrated sealing portion forming body 131 adhered to the working electrode 10 are superimposed and melted by heating while applying a pressure to the first integrated sealing portion forming body 131. In this manner, the first integrated sealing portion 31 is formed between the working electrode 10 and the counter substrate 20. At this time, the first integrated sealing portion 31 is formed such that the width P of the adhesive portion of the surface on the conductive substrate 15 side of the counter substrate 20 with the partitioning portion 31*b* of the first integrated sealing portion 31 is narrower than the width Q of the adhesive portion of the surface on the conductive substrate 15 side of the counter substrate 20 with the annular portion 31*a* of the first integrated sealing portion 31. In addition, the first integrated sealing portion 31 is formed such that the width R of the partitioning portion 31*b* of the first integrated sealing portion 31 is 100% or more and less than 200% of the width T of the annular portion 31*a* of the first integrated sealing portion 31. The formation of the first integrated sealing portion 31 may be performed under the atmospheric pressure or reduced pressure, but it is preferable to be performed under reduced pressure.

Next, the second integrated sealing portion 32 is prepared (see FIG. 5). The second integrated sealing portion 32 has a structure formed by integrating a plurality of the first sealing portions 32A. The second integrated sealing portion 32 can be obtained by preparing one sheet of resin film for sealing and forming a quadrangular-shaped opening 32c in the resin film for sealing as many as the number of the cells 50. The second integrated sealing portion 32 is bonded to the counter substrate 20 so as to sandwich the edge portion 20a of the counter substrate 20 together with the first integrated sealing portion 31. The adhesion of the second integrated sealing portion 32 to the counter substrate 20 can be performed by heating the second integrated sealing portion 32 to melt.

Examples of the resin film for sealing may include a resin such as a modified polyolefin resin including an ionomer, an ethylene-vinyl acetic anhydride copolymer, an ethylene-methacrylic acid copolymer, an ethylene-vinyl alcohol copolymer and the like, an ultraviolet-cured resin, and vinyl alcohol polymer. It is preferable that the constituent material of the resin film for sealing to form the second integrated sealing portion 32 have a higher melting point than the constituent material of the resin film for sealing to form the first integrated sealing portion 31. In this case, since the second sealing portion 32A is harder than the first sealing portion 31A, it is possible to effectively prevent the contact between the counter substrates 20 of the adjacent cells 50. In addition, since the first sealing portion 31A is softer than the second sealing portion 32A, it is possible to effectively alleviate the stress applied to the sealing portion 30A.

Next, the bypass diodes 70A, 70B, and 70C are fixed to the partitioning portion 32b of the second sealing portion 32. In addition, the bypass diode 70D is fixed on the sealing portion 30A of the cell 50D as well.

Thereafter, the wiring material 60Q is fixed to the metal substrate 21 of the counter substrate 20 of the cells 50B and 50C so as to pass through the bypass diodes 70A to 70D. Moreover, the wiring material 602 is formed such that each of the wiring materials 60Q between the bypass diodes 70A and 70B, between the bypass diodes 70B and 70C, and between the bypass diodes 70C and 70D is connected with the wiring material connecting portion 16A on the transparent conductive layer 12A, the wiring material connecting portion 16A on the transparent conductive layer 12B, and the wiring material connecting portion 16A on the transparent conductive layer 12C, respectively. In addition, the wiring material 602 is fixed to the metal substrate 21 of the counter substrate 20 of the cell 50A so as to connect the wiring material connecting portion 16A on the transparent conductive layer 12E and the bypass diode 70A. Moreover, the transparent conductive layer 12D is connected with the bypass diode 70D by the wiring material 60P.

At this time, with regard to the wiring material 60P, a paste containing a metallic material constituting the wiring material 60P is prepared, and this paste is coated from the counter substrate 20 over the wiring material connecting portion 16A of the connecting terminal 16 of the adjacent cell 50 and cured. With regard to the wiring material 600, a paste containing a metallic material constituting the wiring material 60Q is prepared, and this paste is coated on each of the counter substrates 20 so as to link the adjacent bypass diodes and cured. At this time, as the paste above, it is preferable to use a low-temperature curing type paste which is capable of being cured at a temperature of 90° C. or less from the viewpoint of avoiding an adverse effect on the dye.

Finally, the back sheet 80 is prepared, and the peripheral portion 80a of the back sheet 80 is adhered to the insulating material 14. At this time, the back sheet 80 is disposed such that the adhesive portion 80B of the back sheet 80 is spaced apart from the sealing portion 30A of the cell 50.

The photoelectric conversion element 100 is obtained in the manner described above.

Meanwhile, in the description above, a method to collectively fire the precursor of the connecting terminal 16, the precursor of the wiring material 17, the precursor of the insulating material 33, the precursor of the insulating material 14, and the precursor of the oxide semiconductor layer 13 is used in order to form the connecting terminal 16, the wiring material 17, the insulating material 33, the insulating material 14, and the oxide semiconductor layer 13, but the connecting terminal 16, the wiring material 17, the insulating material 33, the insulating material 14, and the oxide semiconductor layer 13 may be formed by separately firing each of the precursors.

<Second Embodiment>

Figure 10:
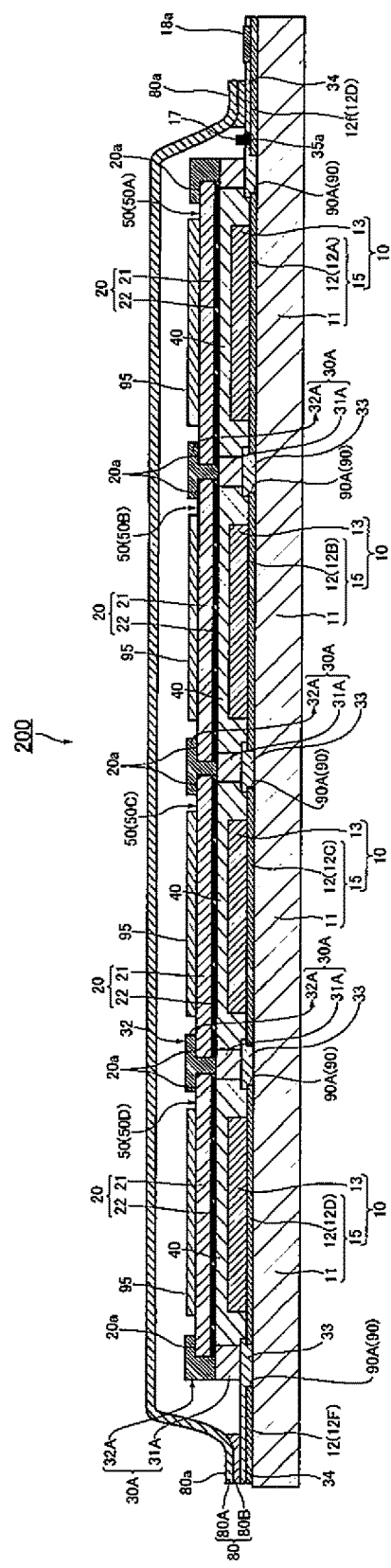
FIG. 10 is an end view of the cut section illustrating a second embodiment of the photoelectric conversion element according to the invention.
Figure 11:
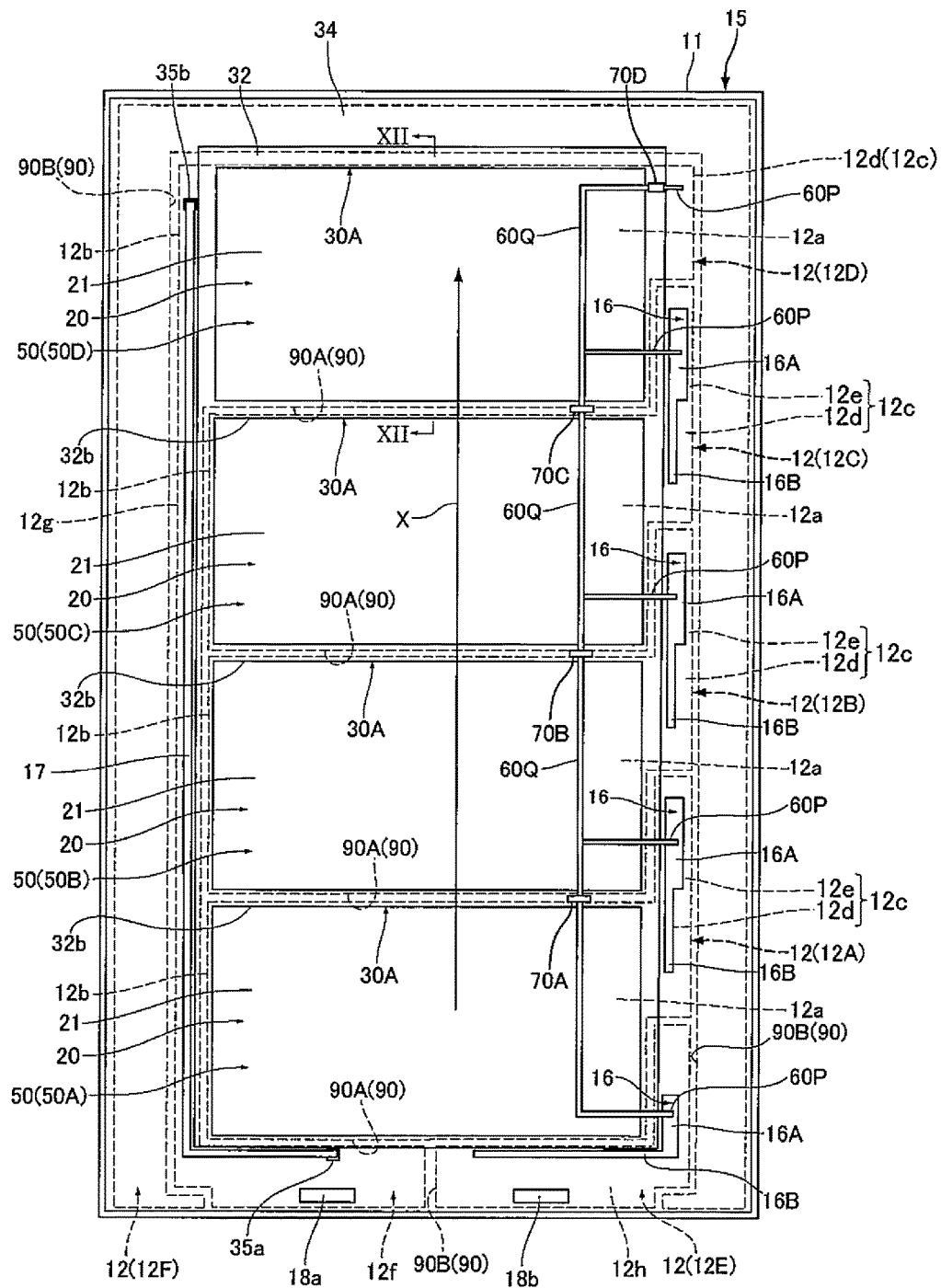
FIG. 11 is a plan view illustrating a portion of the second embodiment of the photoelectric conversion element according to the invention.
Figure 12:
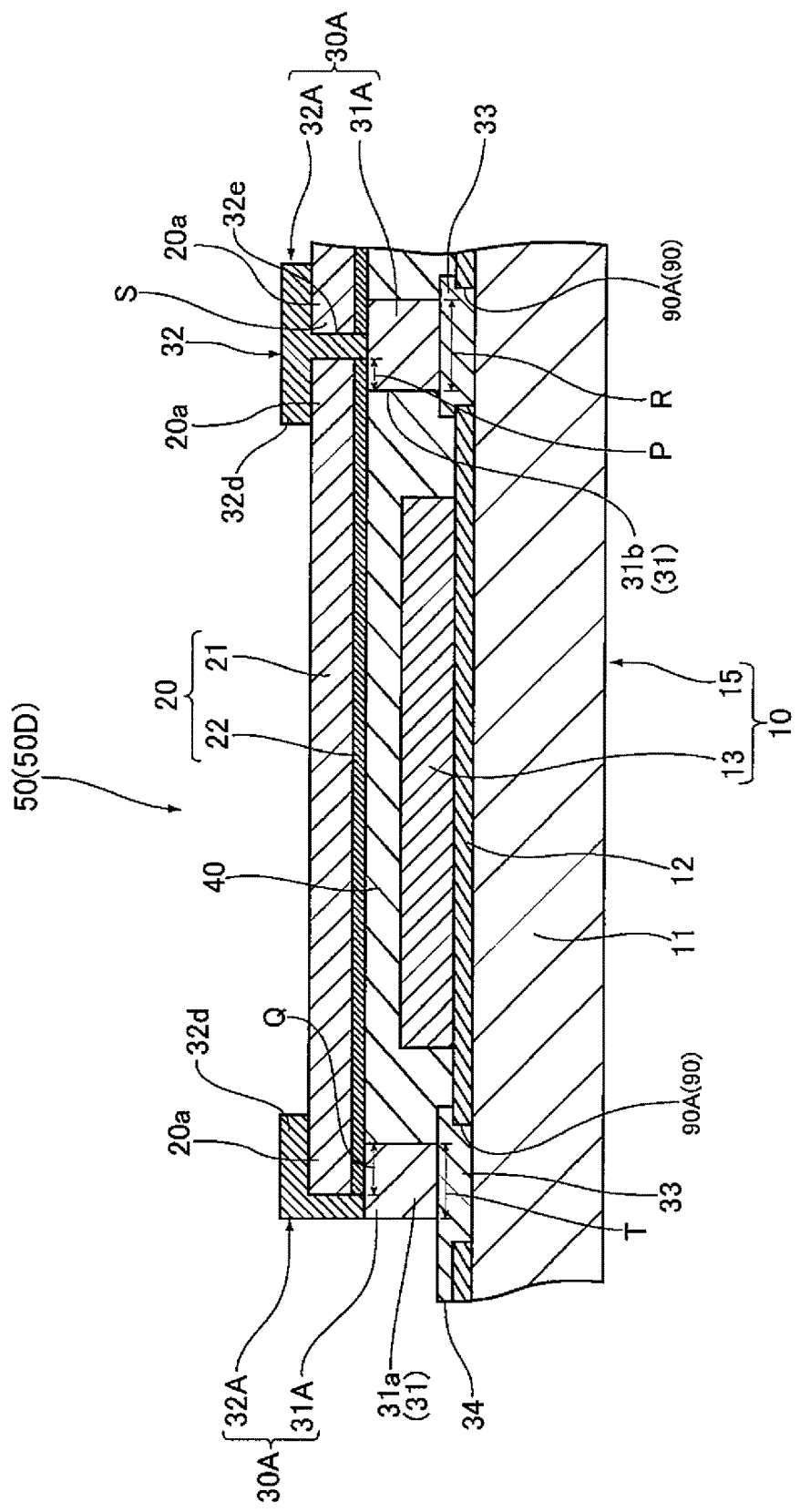
FIG. 12 is a cross-sectional view taken along line XII-XII of FIG. 11.
Figure 13:
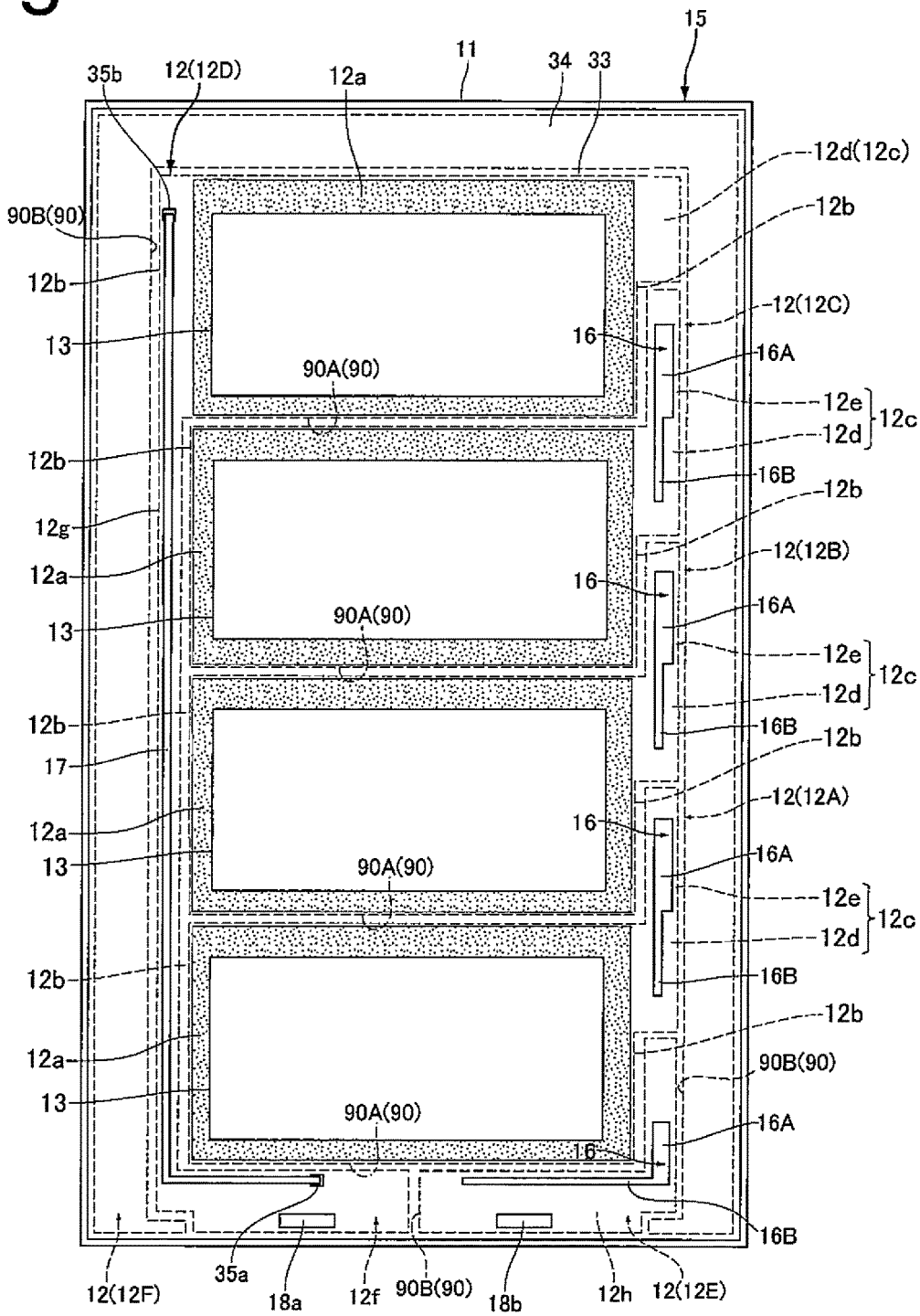
FIG. 13 is a plan view illustrating a working electrode where a light transmission preventing layer for fixing an insulating material and a back sheet is formed.
Figure 14:
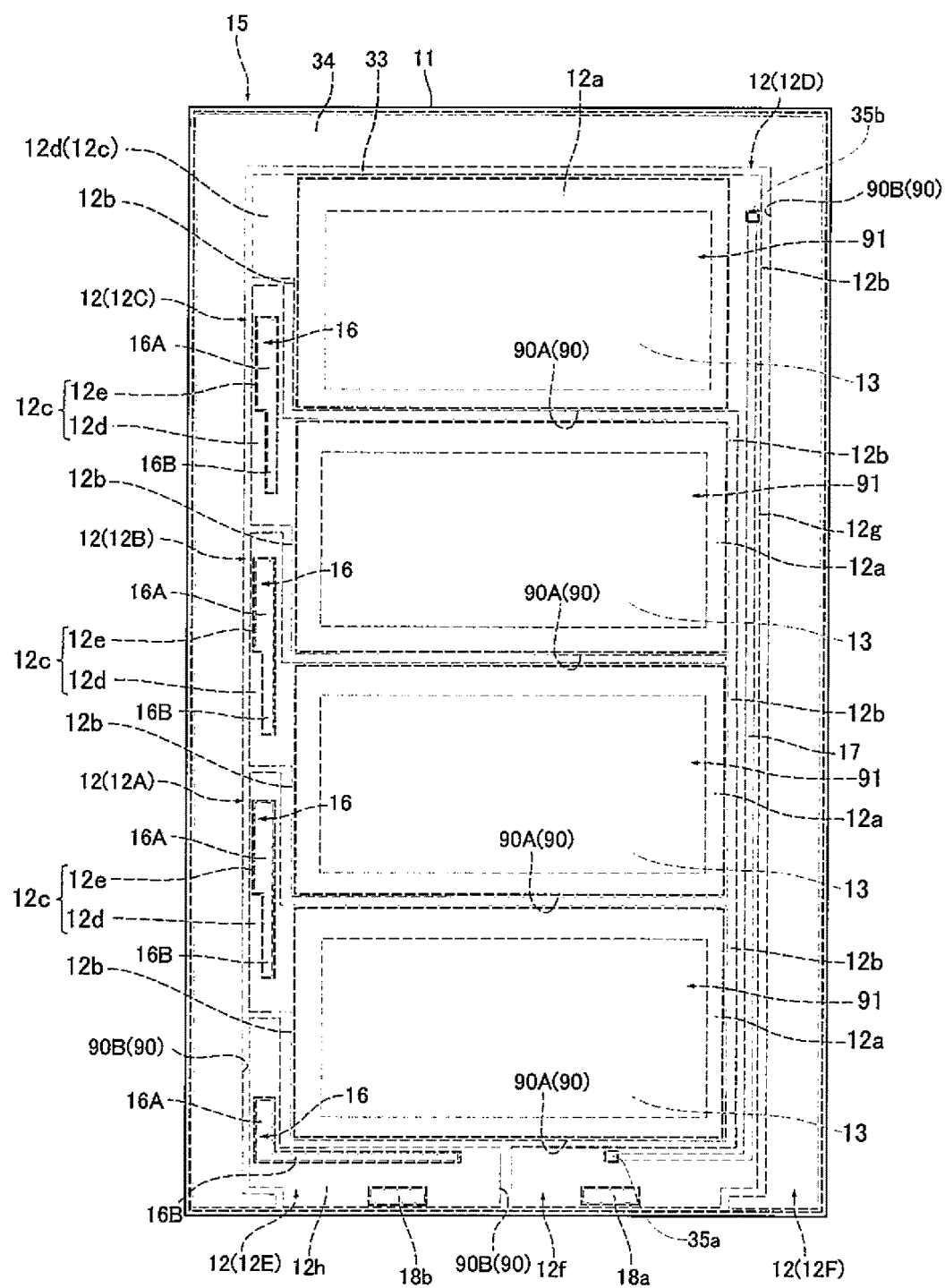
FIG. 14 is a plan view illustrating the photoelectric conversion element of FIG. 10 as seen from a conductive substrate side.

Next, a second embodiment of the photoelectric conversion element according to the invention will be described in detail with reference to FIGS. 10 to 14. FIG. 10 is an end view of the cut section illustrating the second embodiment of the photoelectric conversion element according to the invention, FIG. 11 is a plan view illustrating a portion of the second embodiment of the photoelectric conversion element according to the invention, FIG. 12 is an end view of the cut section taken along line XII-XII of FIG. 11, FIG. 13 is a plan view illustrating a working electrode on which an insulating material and a light transmission preventing layer for fixing a back sheet are formed, and FIG. 14 is a plan view illustrating the photoelectric conversion element of FIG. 10 as seen from a conductive substrate side. In addition, components same as or equivalent to those of the first embodiment are denoted by the same reference numerals, and redundant description thereof is omitted.

As illustrated in FIGS. 10 to 14, a photoelectric conversion element 200 according to this embodiment is different from the photoelectric conversion element 100 according to the first embodiment in terms that one end of a wiring material 17 is connected to a terminal portion 35a directly connected to a transparent conductive layer 12D and the other end of the wiring material 17 is connected to a terminal portion 35b directly connected to the transparent conductive layer 12D.

In addition, the photoelectric conversion element 200 according to this embodiment is also different from the photoelectric conversion element 100 according to the first embodiment in terms that, in a region where an insulating material 14 and an insulating material 33 are not provided among regions on a conductive substrate 15 between first sealing portions 31A of cells 50A to 50D and the edge portion of the conductive substrate 15, an insulating light transmission preventing layer 34 which is provided so as to be adjacent to at least connecting terminals 16, external connecting terminals 18a and 18b, and the terminal portions 35a and 35b and which prevents light transmission is further included.

Herein, the light transmission preventing layer 34 is colored. In addition, the connecting terminals 16, the external connecting terminals 18a and 18b, and the terminal portions 35a and 35b are provided so as to be in contact with the transparent conductive layer 15 in the region where the insulating material 14 and the insulating material 33 are not provided among the regions on the conductive substrate 15 between the first sealing portions 31A of the cells 50A to 50D and the edge portion of the conductive substrate 15. The connecting terminals 16, the external connecting terminals 18a and 18b, and the terminal portions 35a and 35b are colored, and constitute the terminal portions and the conductive portions in the invention. In addition, in the embodiment, the wiring material 17 and the wiring material 60P also constitute a conductive portion. Furthermore, in the embodiment, the terminal portion 35a constitutes a first connecting portion, and the terminal portion 35b constitutes a second connecting portion.

Herein, the light transmission preventing layer 34 is provided so as to cover all the regions excluding at least the insulating material 14, the insulating material 33, and the conductive portion in a case where the photoelectric conversion element 200 is seen in a thickness direction of the conductive substrate 15 among the regions between the first sealing portions 31A of the cells 50A to 50D and the edge portion of the conductive substrate 15 on the surface of the sealing portion 30A side of the conductive substrate 15. Herein, in a case where the insulating material 14 is colored and is configured by the same material as that of the light transmission preventing layer 34, the insulating material 14 also functions as the light transmission preventing layer 34. In this case, the light transmission preventing layer 34 is provided to surround the insulating material 33. Herein, the light transmission preventing layer 34 is integrated with the insulating material 33. Therefore, the light transmission preventing layer 34 also covers the second groove 90B between the transparent conductive layers 12 provided outside the sealing portion 30A.

In addition, in the embodiment, the light transmission preventing layer 34 is provided between the wiring material 602 and the conductive substrate 15 so as to overlap with the wiring material 602 as a conductive portion in the thickness direction of the conductive substrate 15. In addition, the light transmission preventing layer 34 is provided between the wiring material 17 and the conductive substrate 15 so as to overlap with the wiring material 17 as a conductive portion in the thickness direction of the conductive substrate 15. Herein, in the photoelectric conversion element 200, between the terminal portions 35a and 35b, at least a portion of the wiring material 17 may be provided directly on the light transmission preventing layer 34 or may not be provided directly on the light transmission preventing layer 34.

In addition, "to cover all the regions" denotes that, in a case where the insulating material 14 also functions as the light transmission preventing layer 34, the light transmission preventing layer 34 covers 90% or more of the regions between the first sealing portions 31A of the cells 50A to 50D and the edge portion of the conductive substrate 15 in a case where the surface of the sealing portion 30A side of the conductive substrate 15 is seen in the thickness direction of the conductive substrate 15. Herein, if an opening is formed in the conductive substrate 15, the edge portion of the opening also constitutes the edge portion of the conductive substrate 15, the area of the opening is excluded from the area of the regions between the first sealing portions 31A of the cells 50A to 50D and the edge portion of the conductive substrate 15.

In the photoelectric conversion element 200, the connecting terminals 16, the external connecting terminals 18a and 18b, and the terminal portions 35a and 35b constituting the terminal portions in the invention are colored, and the light transmission preventing layer 34 is also colored. In addition, the light transmission preventing layer 34 is adjacent to the connecting terminals 16, the external connecting terminals 18a and 18b, and the terminal portions 35a and 35b. Therefore, in a case where the photoelectric conversion element 200 is seen in the thickness direction of the conductive substrate 15, it is possible to sufficiently suppress the phenomenon that the connecting terminals 16, the external connecting terminals 18a and 18b, and the terminal portions 35a and 35b are conspicuous. Therefore, it is possible to realize a good outer appearance. In addition, according to the photoelectric conversion element 200, since the transparent conductive layer 12 is not colored, it is possible to sufficiently suppress a deterioration in photoelectric conversion characteristic of the photoelectric conversion element 200.

In addition, in the photoelectric conversion element 200, between the conductive substrate 15 and the wiring material 60P, in a case where the photoelectric conversion element 200 is seen in the thickness direction of the conductive substrate 15, the light transmission preventing layer 34 is provided so that the wiring material 60P and the light transmission preventing layer 34 overlap with each other. In addition, between the conductive substrate 15 and the wiring material 17, the light transmission preventing layer 34 is provided so that the wiring material 17 and the light transmission preventing layer 34 overlap with each other. Therefore, it is possible to conceal the wiring material 60P and the wiring material 17 existing in the back side of the light transmission preventing layer 34. Therefore, it is possible to realize better outer appearance.

In addition, in the photoelectric conversion element 200, since the light transmission preventing layer 34 has an insulating property, it is possible to prevent the connecting terminals 16 as the first connecting portions of the transparent conductive layers 12A to 12C and 12E from being short-circuited.

In addition, in the photoelectric conversion element 200, the insulating material 33 is integrated with the light transmission preventing layer 34 so as to function as a layer of preventing light transmission. Therefore, as illustrated in FIG. 14, in a case where the photoelectric conversion element 200 is seen from the conductive substrate 15 in the thickness direction thereof, it is possible to conceal the color or shape of the first sealing portion 31A or the counter substrate 20 existing in the back side of the insulating material 33. Therefore, it is possible to realize a good outer appearance. In addition, although the color of the counter substrate 20 can be concealed by coloring the sealing portion 30A through the introduction of a colorant to the sealing portion 30A, in comparison with this case, it is possible to improve a durability of the photoelectric conversion element 200. In addition, in the photoelectric conversion element 200, the insulating material 33 and the light transmission preventing layer 34 are integrated. Therefore, even if moisture is infiltrated into the back sheet 80, since no interface occurs between the insulating material 33 and the light transmission preventing layer 34, the insulating material and the light transmission preventing layer are integrated, and thus, infiltration of moisture can be prevented. Therefore, it is possible to obtain more excellent durability.

In addition, in the photoelectric conversion element 200, in a case where the insulating material 14 also functions as the light transmission preventing layer 34, the insulating light transmission preventing layer 34 which prevents light transmission is provided in an annular shape so as to cover all the regions excluding at least the insulating material 14, the insulating material 33, and the conductive portion in a case where the photoelectric conversion element 200 is seen in the thickness direction of the conductive substrate 15 among the regions between the first sealing portions 31A of the cells 50A to 50D and the outer peripheral edge portion of the conductive substrate 15 on the surface of the sealing portion 30A side of the conductive substrate 15. Therefore, in a case where the photoelectric conversion element 200 is seen from the transparent substrate 11 side in the thickness direction of the conductive substrate 15, the regions excluding the insulating material 14, the insulating material 33 and the conductive portion among the regions between the sealing portions 30A and the edge portion of the conductive substrate 15 are concealed by the light transmission preventing layer 34, so that it is possible to realize a better outer appearance.

In addition, in the photoelectric conversion element 200, since the insulating light transmission preventing layer 34 is provided in the entire circumference of the peripheral edge portion 80a of the back sheet 80, it is possible to sufficiently suppress infiltration of moisture from the outside of the back sheet 80 into the inside of the back sheet 80. Particularly, in the photoelectric conversion element 200, the second groove 90B which intersects the peripheral edge portion 80a of the back sheet 80 is covered with the light transmission preventing layer 34. Therefore, it is possible to obtain the following effects. Namely, in the photoelectric conversion element 200, since the light transmission preventing layer 34 enters into the second groove 90B and, thus, the light transmission preventing layer 34 also covers the edge portion of the portion of the transparent conductive layer 12 excluding the main body portion 12a, even in a case where moisture is infiltrated through the second groove 90B into the inside of the peripheral edge portion 80a of the back sheet 80, infiltration of moisture from the outside of the back sheet 80 into the space between the back sheet 80 and the conductive substrate 15 is sufficiently suppressed. Therefore, entrance of the moisture infiltrated into the space between the back sheet 80 and the conductive substrate 15 through the sealing portion 30A into the inside of the sealing portion 30A is sufficiently suppressed. Therefore, it is possible to sufficiently suppress a deterioration in durability of the photoelectric conversion element 200.

Next, the light transmission preventing layer 34 and the conductive portion will be described.

(Light Transmission Preventing Layer)

The material constituting the light transmission preventing layer 34 is preferably configured by an insulating material which can prevent light transmission and is colored. As the insulating material, a colored resin or a colored inorganic insulating material may be exemplified. Among them, the colored inorganic insulating material is preferred. In this case, it is possible to obtain the following effects. Namely, the light transmission preventing layer 34 also covers the second groove 90B. Herein, if the light transmission preventing layer 34 is configured by not a resin but an inorganic insulating material, it is possible to more sufficiently suppress infiltration of moisture from the second groove 90B.

As a colored inorganic insulating material, for example, an inorganic insulating material such as a colored glass frit is used.

Herein, although the difference in L* of the L*a*b* color space between the colored terminal portion and the light transmission preventing layer 34 is not particularly limited, the difference is preferably 3 or less, more preferably 1 or less. In this case, since the color of the light transmission preventing layer 34 becomes close to the colors of the connecting terminals 16, the external connecting terminals 18a and 18b, and the terminal portions 35a and 35b, it is possible to more sufficiently suppress the phenomenon that the connecting terminals 16, the external connecting terminals 18a and 18b, and the terminal portions 35a and 35b are conspicuous.

In addition, although the difference in L* of the L*a*b* color space between the oxide semiconductor layer 13 and the light transmission preventing layer 34 is also not particularly limited, the difference is preferably 5 or less, more preferably 3 or less.

As long as the light transmission preventing layer 34 is colored, the color of the light transmission preventing layer is not particularly limited, various colors may be used according to the purposes. The thickness of the light transmission preventing layer 34 is typically in a range of 10 to 30 μm, preferably in a range of 15 to 25 μm.

(Conductive Portion)

The connecting terminal 16 as the terminal portion and the conductive portion includes a conductive material such as a metal material or a carbon. As the metal material, for example, silver, copper, indium, or the like may be exemplified. These materials may be used singly or in combination of two or more kinds thereof. Among them, the conductive material is preferably configured by carbon. Since the carbon is black in addition to having an excellent conductive property, in comparison with a case where the conductive material includes a metal material such as silver, it is possible to sufficiently suppress the phenomenon that the connecting terminals 16 are conspicuous.

The connecting terminal 16 also include a resin in addition to the conductive material described above. As the resin, although an epoxy resin, a polyester resin, an acrylic resin, or the like may be exemplified, among them, the epoxy resin or the polyester resin is preferred because the epoxy resin or the polyester resin is hard to thermally expand at a high temperature and a temporal change in resistance can be further reduced.

Although the difference in L* of the L*a*b* color space between the oxide semiconductor layer 13 and connecting terminals 16, the external connecting terminals 18a and 18b, and the terminal portions 35a and 35b which are the colored terminal portions is not particularly limited, in a case where the difference in L* of the L*a*b* color space between the oxide semiconductor layer 13 and the light transmission preventing layer 34 is 5 or less, the difference in L* of the L*a*b* color space between the oxide semiconductor layer and the colored terminal portions is preferably 5 or less. In this case, it is possible to allow the respective colors of the connecting terminals 16, the external connecting terminals 18a and 18b, the terminal portions 35a and 35b, and the light transmission preventing layers 34 to be close to the color of the oxide semiconductor layers 13. In other words, it is possible to allow the colors of the connecting terminals 16, the external connecting terminals 18a and 18b, the terminal portions 35a and 35b, the light transmission preventing layer 34, and the oxide semiconductor layers 13 to be close to a single color. Therefore, the phenomenon that the connecting terminals 16, the external connecting terminals 18a and 18b, the terminal portions 35a and 35b, the light transmission preventing layers 34 are conspicuous in comparison with the oxide semiconductor layers 13 is sufficiently suppressed. Herein, the difference in L* of the L*a*b* color space between the oxide semiconductor layer 13 and the connecting terminals 16, the external connecting terminals 18a and 18b, and the terminal portions 35a and 35b is preferably 3 or less.

As long as the external connecting terminals 18a and 18b as terminal portions and conductive portions are colored, the external connecting terminals may be configured by the same material as that of the connecting terminal 16 or may be configured by a material different from that of the connecting terminal. However, it is preferable that the external connecting terminals be configured by the same material as that of the connecting terminal.

As long as the terminal portions 35a and 35b as terminal portions and conductive portions are colored, the terminal portions may be configured by the same material as that of the connecting terminal 16 or may be configured by a material different from that of the connecting terminal. However, it is preferable that the terminal portions be configured by the same material as that of the connecting terminal.

In a case where the wiring material 17 and the wiring material 60P are provided in the side of the light transmission preventing layer 34 opposite to the conductive substrate 15 so as to overlap with the light transmission preventing layer 34, the wiring materials may be colored or may not be colored. In a case where the wiring material 17 and the wiring material 60P are colored, the wiring material 17 and the wiring material 60P may be configured by the same material as that of the connecting terminal 16 or may be configured by a material different from that of the connecting terminal. However, it is preferable that the wiring materials be configured by the same material as that of the connecting terminal. Herein, both of the wiring material 17 and the wiring material 602 may be configured by a stacked structure of a colored conductive layer which is colored and a non-colored conductive layer which is not colored.

In addition, the wiring material 17 may be provided directly on the transparent conductive layer 12 of the conductive substrate 15. Namely, the wiring material 17 may be provided on the side of the light transmission preventing layer 34 opposite to the conductive substrate 15 so as not to overlap with the light transmission preventing layer 34. In this case, the wiring material 17 may be colored or may not be colored. However, it is preferable that the wiring material be colored.

Next, a method of manufacturing the photoelectric conversion element 200 according to this embodiment will be described.

The method of manufacturing the photoelectric conversion element 200 according to this embodiment is different from the method of manufacturing the photoelectric conversion element 100 according to the first embodiment in terms of only a method of manufacturing the working electrode 10. Hereinafter, the method of manufacturing the working electrode 10 will be described.

First, similarly to the first embodiment, the conductive substrate 15 is obtained.

Next, precursors of the connecting terminals 16 configured by the wiring material connecting portion 16A and the wiring material non-connecting portion 16B are formed on the protrusion portions 12c in the transparent conductive layers 12A to 12C of the conductive substrate 15. Specifically, the precursors of the connecting terminals 16 are formed so that the wiring material connecting portion 16A is provided on the counter portion 12e. In addition, the precursors of the connecting terminals 16 are also formed on the transparent conductive layer 12E. In addition, the precursor of the wiring material non-connecting portion 16B is formed so as to be narrower than the width of the wiring material connecting portion 16A. The precursors of the connecting terminals 16 can be formed, for example, by applying a paste containing a conductive material and drying it. Herein, in a case where the conductive material is configured by a carbon, a colored master batch containing the carbon and a resin is preferably included in the paste. As described above, the resin is preferably an epoxy resin or a polyester resin as the resin.

In addition, similarly to the first embodiment, precursors of the external connecting terminals 18a and the 18b for extracting current to the outside are formed on the first current extracting portion 12f of the transparent conductive layer 12D and the second current extracting portion 12h of the transparent conductive layer 12F, respectively.

In addition, precursors of the terminal portions 35a and 35b are formed on the main body portion 12a and the first current extracting portion 12f of the transparent conductive layer 12D. As the precursors of the terminal portions 35a and 35b, the same material as those of the precursors of the connecting terminals 16 can be used. The precursors of the terminal portions 35a and 35b can be formed, for example, by applying a silver paste and drying it.

Furthermore, the precursors of the insulating material 33 and the light transmission preventing layer 34 are formed so as to enter into the first groove 90A formed along the edge portion of the main body portion 12a and to cover the edge portion of the main body portion 12a and so as to cover the regions excluding the precursors of the connecting terminals 16, the external connecting terminals 18a and 18b, and the terminal portions 35a and 35b on the surface of the transparent conductive layer 12 side of the conductive substrate 15. The precursors of the insulating material 33 and the light transmission preventing layer 34 can be formed, for example, by applying a paste containing a colored glass frit and drying it.

Furthermore, the precursor of the wiring material 17 is formed so as to be connected to the terminal portions 35a and 35b on the light transmission preventing layer 34. As the precursor of the wiring material 17, the same precursor as the precursors of the connecting terminals 16 can be used.

Furthermore, the precursors of the oxide semiconductor layers 13 are formed in the same manner as that of the first embodiment on the main body portions 12a of the transparent conductive layers 12A to 12D, respectively.

Next, the connecting terminals 16, the external connecting terminals 18a and 18b, the terminal portions 35a and 35b, the wiring materials 17, the insulating materials 33, the light transmission preventing layers 34, and the oxide semiconductor layers 13 are formed by collectively firing the precursors of the connecting terminals 16, the precursors of the external connecting terminals 18a and 18b, precursors of the terminal portions 35a and 35b, the precursors of the wiring materials 17, precursors of the insulating materials 33, the precursors of the light transmission preventing layers 34, and precursors of the oxide semiconductor layers 13.

At this time, although a firing temperature is different according to a type of oxide semiconductor particles or glass frit, the firing temperature is typically in a range of 350 to 600° C.; and although a firing time is also different according to a type of oxide semiconductor particles or glass frit, the firing time is typically in a range of 1 to 5 hours.

By doing so, as illustrated in FIG. 13, the working electrode 10 on which the insulating material 33 and the light transmission preventing layer 34 for fixing the back sheet 80 are formed is obtained.

In order to allow a dye to be supported on the oxide semiconductor layer 13 of the working electrode 10, the same process as that of the first embodiment may be performed. At this time, in a case where the precursors of the connecting terminals 16, the precursors of the external connecting terminals, and the precursors of the terminal portions 35a and 35b are configured by a paste including a colored master batch containing a carbon and a resin, before the working electrode 10 is immersed into a dye solution, the precursors of the connecting terminals 16, the precursors of the external connecting terminals, and the precursors of the terminal portions 35a and 35b are preferably covered with a protective film in advance. In this case, even if the working electrode 10 is immersed into the dye solution, the colored master batch or the carbon is sufficiently prevented from being dissolved into the dye solution, so that it is possible to sufficiently suppress a deterioration of the dye. At this time, as the protective film, for example, a linear polyethylene film or the like can be used.

In addition, in the embodiment, although the light transmission preventing layer 34 is provided in an annular shape so as to cover all the regions excluding at least the insulating material 14, the insulating material 33, and the conductive portion in a case where the photoelectric conversion element is seen in the thickness direction of the conductive substrate 15 among the regions between the first sealing portions 31A of the cells 50A to 50D and the outer peripheral edge portion of the conductive substrate 15 on the surface of the sealing portion 30A side of the conductive substrate 15, the light transmission preventing layer 34 may not necessary cover all the regions excluding at least the insulating material 14, the insulating material 33, and the conductive portion in a case where the photoelectric conversion element is seen in the thickness direction of the conductive substrate 15 among the regions between the first sealing portions 31A of the cells 50A to 50D and the outer peripheral edge portion of the conductive substrate 15 on the surface of the sealing portion 30A side of the conductive substrate 15. In short, the light transmission preventing layer 34 may be only adjacent to the terminal portions configured to include at least the connecting terminals 16, the external connecting terminals 18a and 18b, and the terminal portions 35a and 35b.

In addition, in the embodiment, although all the connecting terminals 16, the external connecting terminals 18a and 18b, and the terminal portions 35a and 35b which are the terminal portions are colored, any one of the connecting terminals 16, the external connecting terminals 18a and 18b, and the terminal portions 35a and 35b may be colored. For example, in a case where the photoelectric conversion element is accommodated in a casing, among the connecting terminals 16, the external connecting terminals 18a and 18b, and the terminal portions 35a and 35b, the portions which are concealed by the casing in a case where the photoelectric conversion element is seen from the outside may not be colored. However, among the connecting terminals 16, the external connecting terminals 18a and 18b, and the terminal portions 35a and 35b, the portions which are not concealed by the casing are preferably colored. For example, since there is a case where the terminal portion 35a or the terminal portion 35b is concealed by the casing, in this case, the terminal portions 35a and 35b may not be colored.

In addition, even if the terminal portions 35a and 35b are not concealed by the casing, since the terminal portions are the portions which require a conductive property most necessarily, and in a case where the connecting terminals 16 and the external connecting terminals 18a and 18b are colored, the aforementioned terminal portions may not be necessarily colored.

In addition, in the embodiment, although the one end of the wiring material 602 is connected to the transparent conductive layer 12 via the connecting terminal 16, the one end of the wiring material 602 may be connected directly to the transparent conductive layer 12. In this case, the transparent conductive layer 12 becomes the first connecting portion.

In addition, in the embodiment, although the one end of the wiring material 17 is connected to the transparent conductive layer 12 via the terminal portion 35a, the one end of the wiring material 17 may be connected directly to the transparent conductive layer 12. In this case, the terminal portion 35a becomes unnecessary, and the transparent conductive layer 12 becomes the first connecting portion. In addition, in the embodiment, although the other end of the wiring material 17 is connected to the transparent conductive layer 12 via the terminal portion 35b as the second connecting portion, the other end of the wiring material 17 may be connected directly to the transparent conductive layer 12. In this case, the terminal portion 35b becomes unnecessary, and the transparent conductive layer 12 becomes the second connecting portion.

In addition, in the embodiment, although the photoelectric conversion element 100 includes the wiring material 17, the photoelectric conversion element according to the invention may not necessarily include the wiring material 17. In this case, the terminal portions 35a and 35b also become unnecessary. In this case, the conductive portion is configured by only the connecting terminals 16 and the external connecting terminals 18a and 18b.

Furthermore, in the embodiment, although the light transmission preventing layer 34 and the insulating material 33 are configured by the same material to be integrated, the insulating material 33 and the light transmission preventing layer 34 may be configured by different materials. For example, the light transmission preventing layer 34 may not be colored, and the insulating material 33 may be colored. In this case, the insulating material 33 is configured to have a color of the same class as the color of, for example, the oxide semiconductor layer 13. In addition, the insulating material 33 may be colored, and the insulating material may not necessarily have a light transmission preventing function.

Furthermore, in the embodiment, although the wiring material 60P and the metal substrate 21 of the counter substrate 20 are connected to each other, the wiring material 60P may be configured by a portion of the metal substrate 21 of the counter substrate 20.

Figure 15:
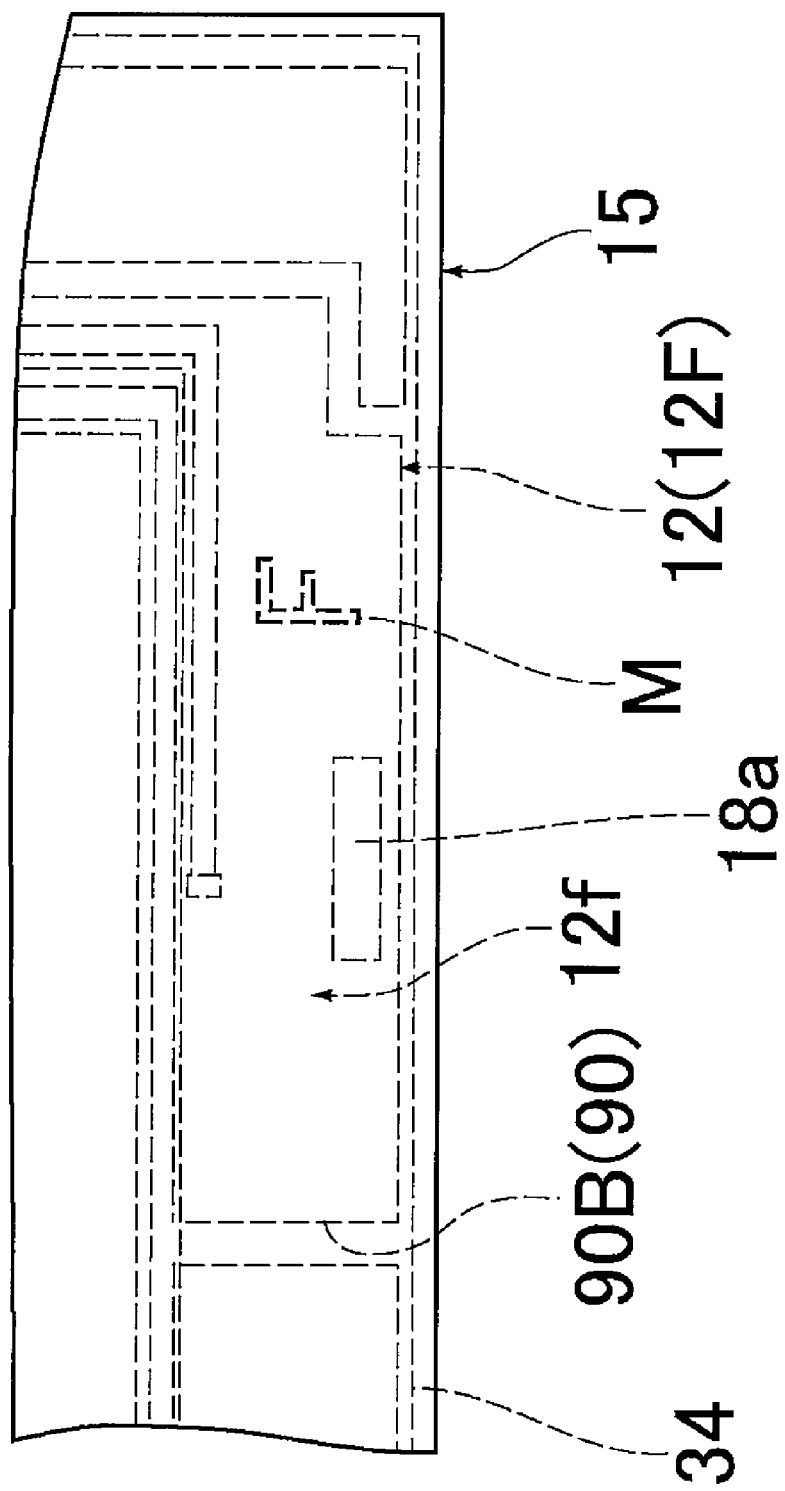
FIG. 15 is a plan view illustrating a state of a portion of an eleventh embodiment of the photoelectric conversion element according to the invention as seen from a conductive substrate side.

In addition, in the embodiment, as illustrated in FIG. 15, in the conductive substrate 15, in a case where the photoelectric conversion element is seen from the transparent substrate 11 side in the thickness direction of the conductive substrate 15, a different color portion M having a color different from that of the light transmission preventing layer 34 is preferably provided on the conductive substrate 15. In this case, since the different color portion M displays a color different from that of the light transmission preventing layer 34, in a case where the photoelectric conversion element is seen in the thickness direction of the conductive substrate 15, it is possible to allow the different color portion M to display desired characters or designs. Herein, in a case where the different color portion M is provided on the conductive substrate 15, the light transmission preventing layer 34 is preferably provided so as to cover all the regions excluding the regions of at least the insulating material 14, the insulating material 33, the conductive portion, and the different color portion M in a case where the photoelectric conversion element 200 is seen in the thickness direction of the conductive substrate 15 among the regions between the first sealing portions 31A of the cells 50A to 50D and the edge portion of the conductive substrate 15 on the surface of the sealing portion 30A side of the conductive substrate 15.

The different color portion M illustrated in FIG. 15 is provided directly on the transparent conductive layer 12 of the conductive substrate 15, and the light transmission preventing layer 34 is provided on the different color portion so as to overlap with the different color portion. The different color portion M can be formed by performing direct printing or the like on the transparent conductive layer 12. Herein, the "color different from that of the light transmission preventing layer 34" denotes a color in which the difference value between L* of the L*a*b* color space between of the different color portion M and L* of the L*a*b* color space of the light transmission preventing layer 34 is 5 or more.

In addition, the light transmission preventing layer 34 may not be provided on the different color portion M. Furthermore, the different color portion M may be formed by allowing the light transmission preventing layer 34 to surround the space.

Furthermore, in the embodiment, although the light transmission preventing layer 34 is configured by an insulating material, as long as the light transmission preventing layer 34 is provided so as not to cross the groove 90, the light transmission preventing layer may be configured by a conductive material.

Figure 16:
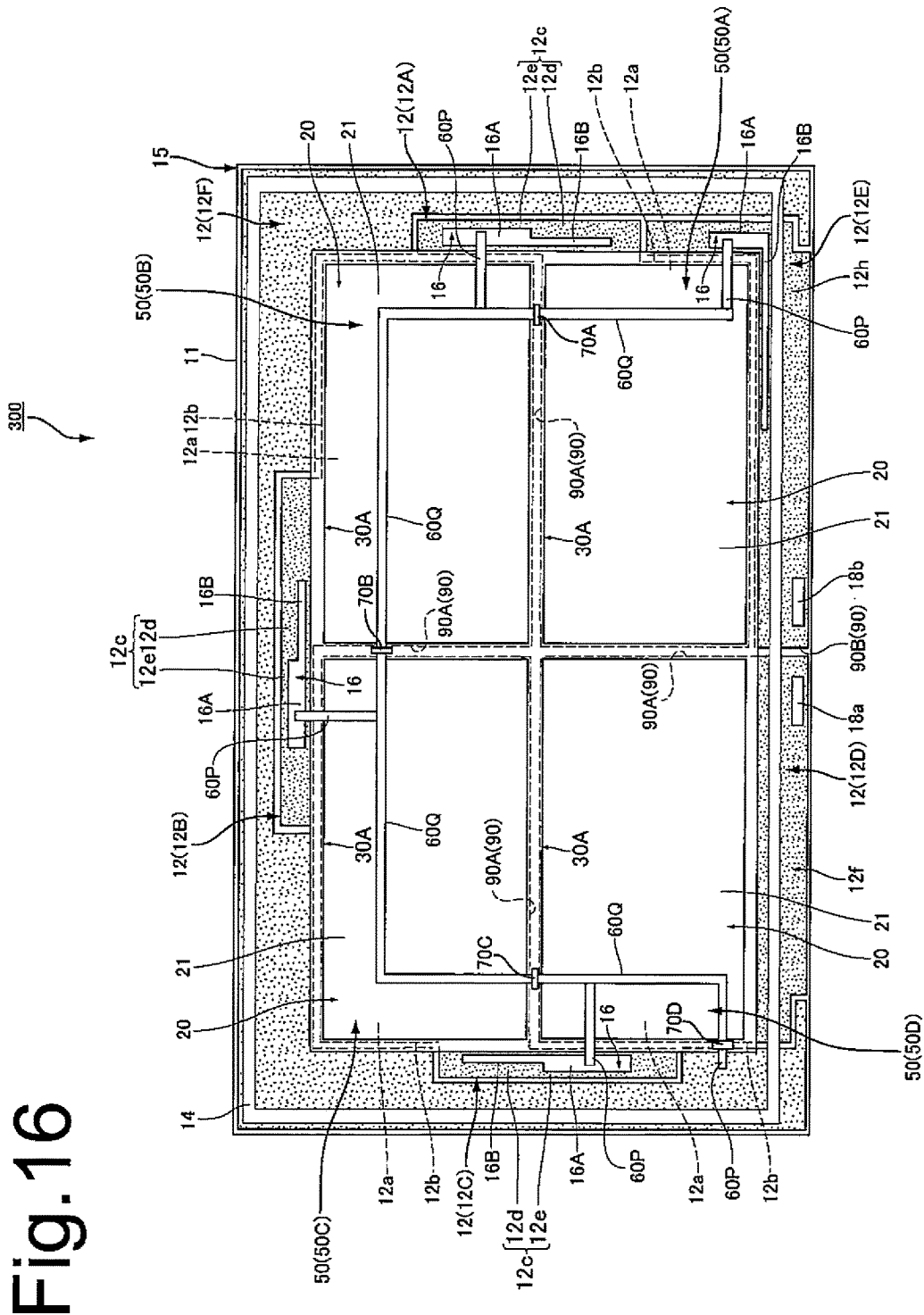
FIG. 16 is a plan view illustrating a portion of a third embodiment of the photoelectric conversion element according to the invention.

The invention is not limited to above-described embodiments. For example, in the first embodiment, the cells 50A to 50D are arranged in a row along the X direction of FIG. 2, like a photoelectric conversion element 300 illustrated in FIG. 16, cells 50C and 50D as portions of the cells 50A to 50D may be folded in the middle, and the cell 50A and the cell 50D may be arranged to be adjacent to each other. In addition, in FIG. 16, the back sheet 80 is omitted. In this case, unlike the photoelectric conversion element 100, in the transparent conductive layer 12D, there is no need to provide the connecting portion 12g between the main body portion 12a and the first current extracting portion 12f. Therefore, there is also no need to provide the wiring material 17. In the photoelectric conversion element 200 according to the second embodiment as well, like the photoelectric conversion element 300, the cells 50 C and 50D as portions of the cells 50A to 50D may be folded in the middle, and the cell 50A and the cell 50D may be arranged to be adjacent to each other.

Figure 17:
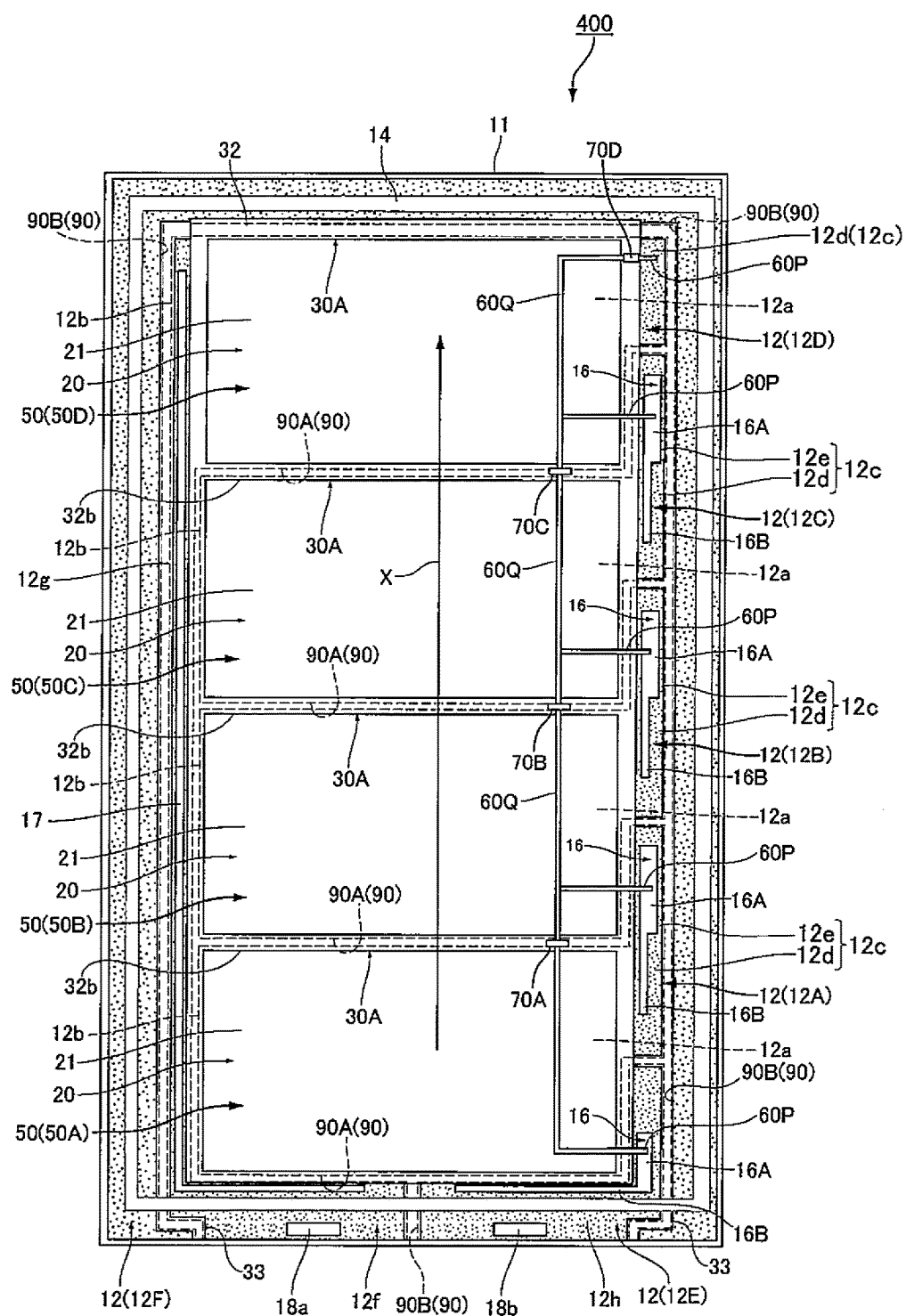
FIG. 17 is a plan view illustrating a portion of a fourth embodiment of the photoelectric conversion element according to the invention.

In addition, in the above first embodiment, the second groove 90B which intersects the insulating material 14 between the back sheet 80 and the conductive substrate 15 is not covered with the insulating material 33. However, like the photoelectric conversion element 400 illustrated in FIG. 17, the second groove 90B is preferably covered with the insulating material 33. In addition, in FIG. 17, the back sheet 80 is omitted. As illustrated in FIG. 17, when the second groove 90B intersects the insulating material 14, moisture can be infiltrated through the second groove 90B into the space between the back sheet 80 and the conductive substrate 15. In this case, since the insulating material 33 enters into the second groove 90B, and the insulating material 33 covers an edge portion of the portion of the transparent conductive layer 12 excluding the main body portion 12a, the infiltration of the moisture from the outer side of the back sheet 80 into the inner side is sufficiently suppressed. For this reason, the entrance of the moisture being infiltrated into the space between the back sheet 80 and the conductive substrate 15 into the inner side of the sealing portion 30A through the sealing portion 30A is sufficiently suppressed. For this reason, a deterioration in durability of the photoelectric conversion element 400 can be sufficiently suppressed.

Furthermore, in the above first embodiment, a part of the groove 90 is not covered with the insulating material 33, but it is preferable that the insulating material 33 cover the edge portion of the transparent conductive layer 12 on both sides of the entire groove 90 as well as enter into the entire groove 90 as the photoelectric conversion element 400 illustrated in FIG. 17. In this case, the moisture cannot penetrate into the groove 90 in the first place, and moisture cannot penetrate into the crack formed on the groove 90 as well, and thus it is possible to even more suppress that the moisture penetrates via the groove 90 since the insulating material 33 covers the edge portion of the transparent conductive layer 12 on both sides of the entire groove 90 as well as enters into the entire groove 90. In addition, the insulating material 33 covers also the edge portion of the transparent conductive layer 12 on both sides of the entire groove 90 and thus it is possible to sufficiently secure the insulation properties between the transparent conductive layers 12 on both sides of the groove 90. In addition, since in the photoelectric conversion element 100, the insulating material 33 also enters into the entire first groove 90A between the transparent conductive layers 12 of the adjacent cells 50, it is possible to more suppress the flowing of current between the transparent conductive layers 12, and as a result, it is possible to sufficiently secure the insulation properties. For this reason, it is possible to improve the photoelectric conversion characteristics.

Furthermore, in the above first embodiment, the first current extracting portion 12f and the second current extracting portion 12h are disposed in the vicinity on the cell 50A side, but the first current extracting portion 12f and the second current extracting portion 12h may be disposed in the vicinity on the cell 50D side as illustrated in a photoelectric conversion element 500 illustrated in FIG. 8. In this case, the first current extracting portion 12f is provided so as to protrude on the side opposite to the cell 50C with respect to the main body portion 12a of the transparent conductive layer 12D to the outer side of the sealing portion 30A. On the other hand, the second current extracting portion 12h is provided on the side opposite to the cell 50C with respect to the main body portion 12a of the transparent conductive layer 12D. In addition, the connecting portion 12i as a second connecting portion extends along the transparent conductive layers 12A to 12D, and this connecting portion 12i connects the second current extracting portion 12h and the metal substrate 21 of the counter substrate 20 of the cell 50A. Specifically, a wiring material 417 having a lower resistance than that of the transparent conductive layer 12 and having a current collecting function is provided on the connecting portion 12i along the connecting portion 12i, and this wiring material 417 is connected with the wiring material 60P extending from the bypass diode 70A. According to this photoelectric conversion element 500, it is possible to achieve space saving while exhibiting excellent photoelectric conversion characteristics. Meanwhile, in this case, it is the same as the above first embodiment that it is preferable that the resistance value of the connecting portion 12i be equal to or less than the resistance value represented by the following Equation (1).

$$\text{Resistance value} = \text{number of cell 50 connected in series} \times 120 \ \Omega \tag{1}$$

Figure 18:
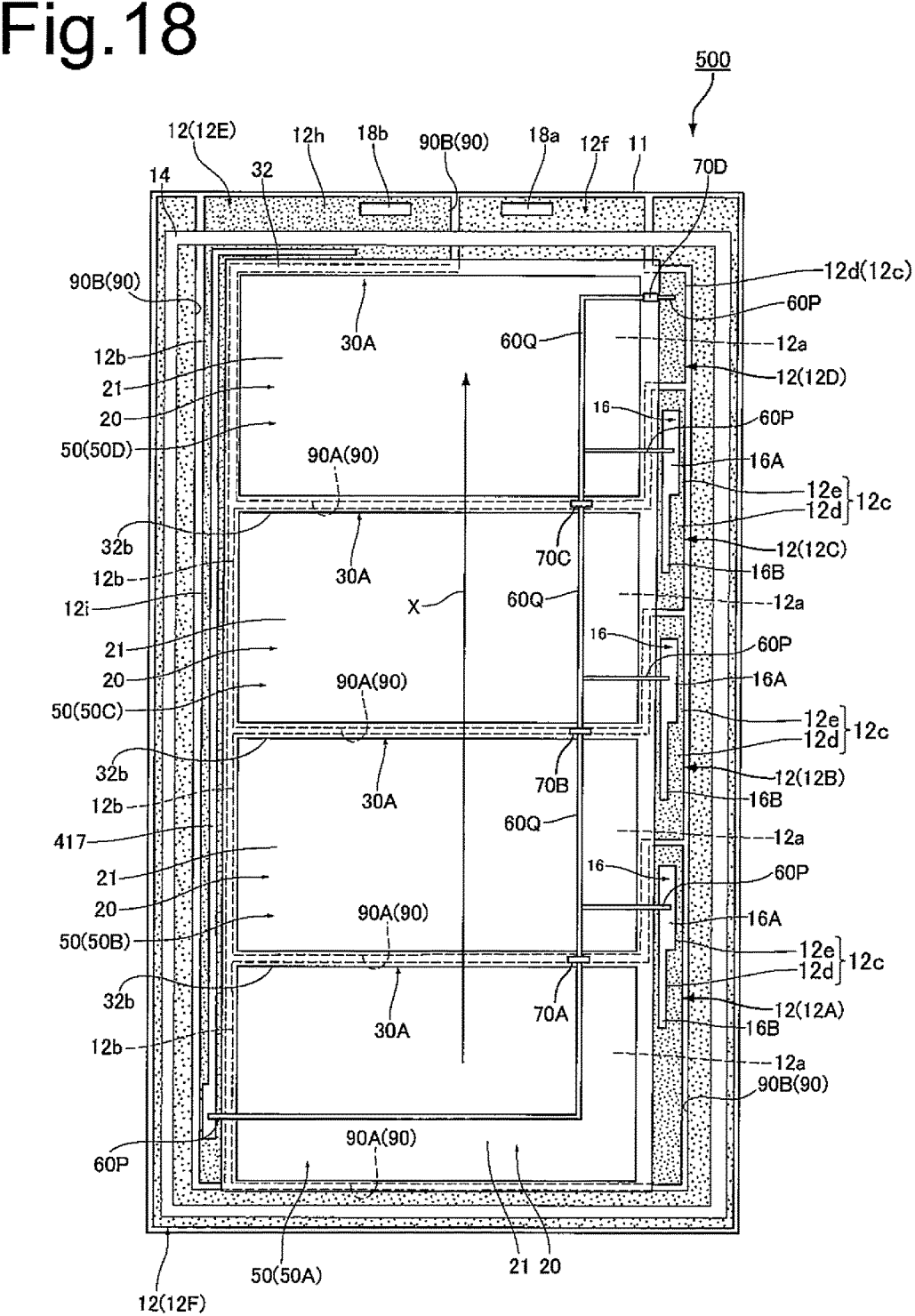
FIG. 18 is a plan view illustrating a portion of a fifth embodiment of the photoelectric conversion element according to the invention.
Figure 19:
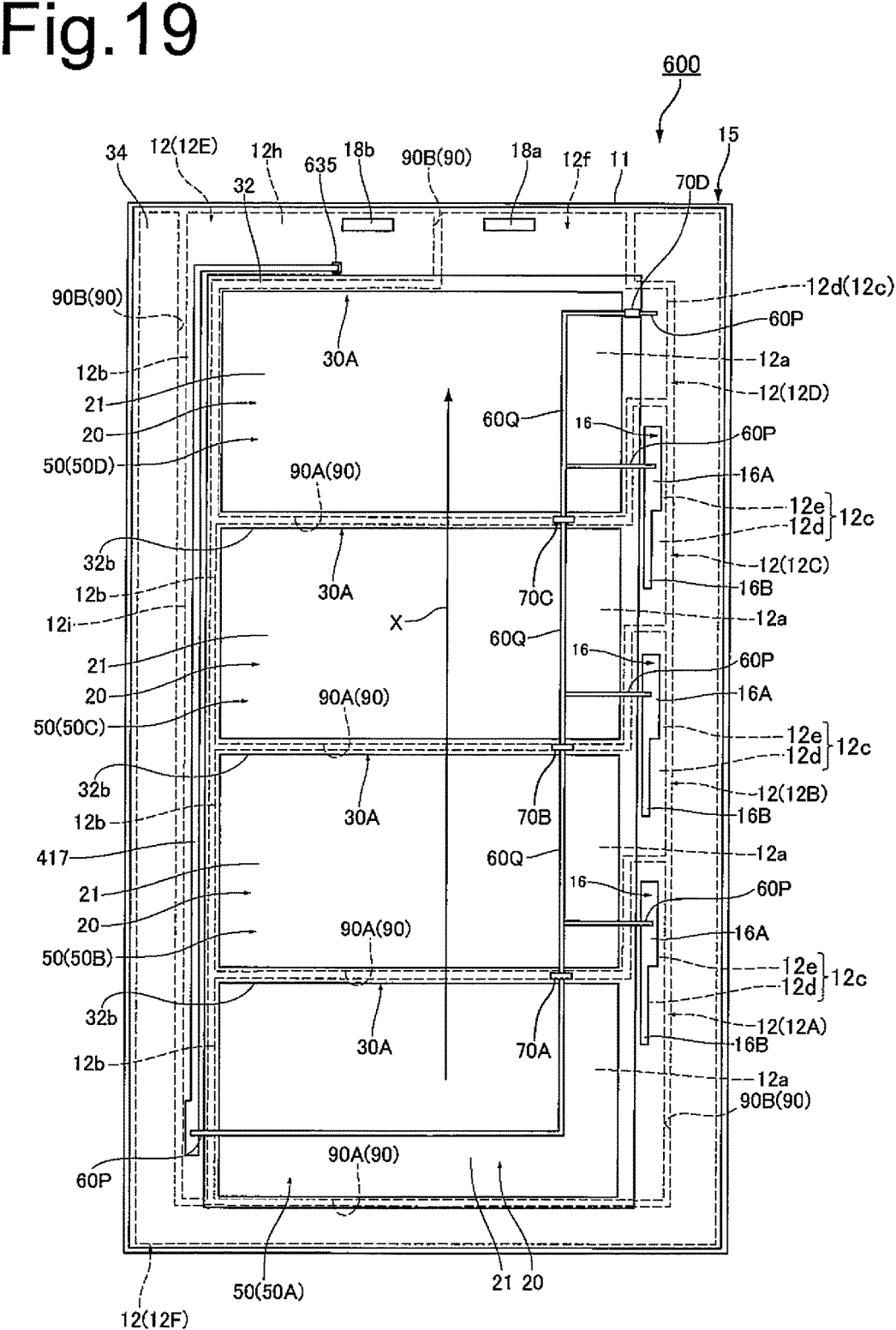
FIG. 19 is a plan view illustrating a portion of a sixth embodiment of the photoelectric conversion element according to the invention.

In addition, in the second embodiment, although the first current extracting portion 12f and the second current extracting portion 12h are arranged in the vicinity of the cell 50A side, as illustrated in a photoelectric conversion element 600 illustrated in FIG. 19, a first current extracting portion 12f and a second current extracting portion 12h may be arranged in the vicinity of the cell 50D side. In this case, the first current extracting portion 12f is provided so as to protrude up to the outside of the sealing portion 30A at the side opposite to the cell 50C with respect to the main body portion 12a of the transparent conductive layer 12D. On the other hand, the second current extracting portion 12h is provided at the side opposite to the cell 50C with respect to the main body portion 12a of the transparent conductive layer 12D. In addition, a connecting portion 12i for connecting the second current extracting portion 12h and the metal substrate 21 of the counter substrate 20 of the cell 50A is extended along the transparent conductive layers 12A to 12D. Specifically, a wiring material 417 having a lower resistance than the transparent conductive layer 12 and having a current collecting function is provided along the connecting portion 12i on the light transmission preventing layer 34. The one end of the wiring material 417 is connected to a wiring material 602 extending from a bypass diode 70A, and the other end of the wiring material 417 is connected to a terminal portion 635 which is provided in a through hole penetrating the light transmission preventing layer 34 and which is connected directly to the first current extracting portion 12h. In the photoelectric conversion element 600, the wiring material 417 constitutes the conductive portion, the metal substrate 21 of the cell 50A constitutes the second connecting portion, and the terminal portion 635 constitutes the first connecting portion, the terminal portion, and the conductive portion. In the photoelectric conversion element 600, in a case where the terminal portion 635 is colored, the colored light transmission preventing layer 34 is provided adjacent to the terminal portion 635. In this case, it is possible to make the color of the terminal portion 635 visually less noticeable. In addition, according to the photoelectric conversion element 600, it is possible to obtain an excellent photoelectric conversion characteristic and to save a space. In addition, in this case, like the photoelectric conversion element 500 illustrated in FIG. 18, the resistance value of the connecting portion 12i is preferably equal to or less than the resistance value expressed by the following Equation (1).

$$\text{Resistance value} = \text{number of cell 50 connected in series} \times 120\ \Omega \tag{1}$$

In addition, in the photoelectric conversion element 600, although the other end of the wiring material 417 is connected indirectly to the second current extracting portion 12h of the transparent conductive layer 12E via the terminal portion 635, in the photoelectric conversion element 600, the terminal portion 635 may be omitted, and the other end of the wiring material 417 may be connected directly to the second current extracting portion 12h of the transparent conductive layer 12E. In this case, the transparent conductive layer 12E constitutes the first connecting portion. In addition, in the photoelectric conversion element 600, between the metal substrate 21 of the cell 50A and the terminal portion 635, at least a portion of the wiring material 417 may be provided directly on the light transmission preventing layer 34 or may not be provided directly on the light transmission preventing layer 34.

Figure 20:
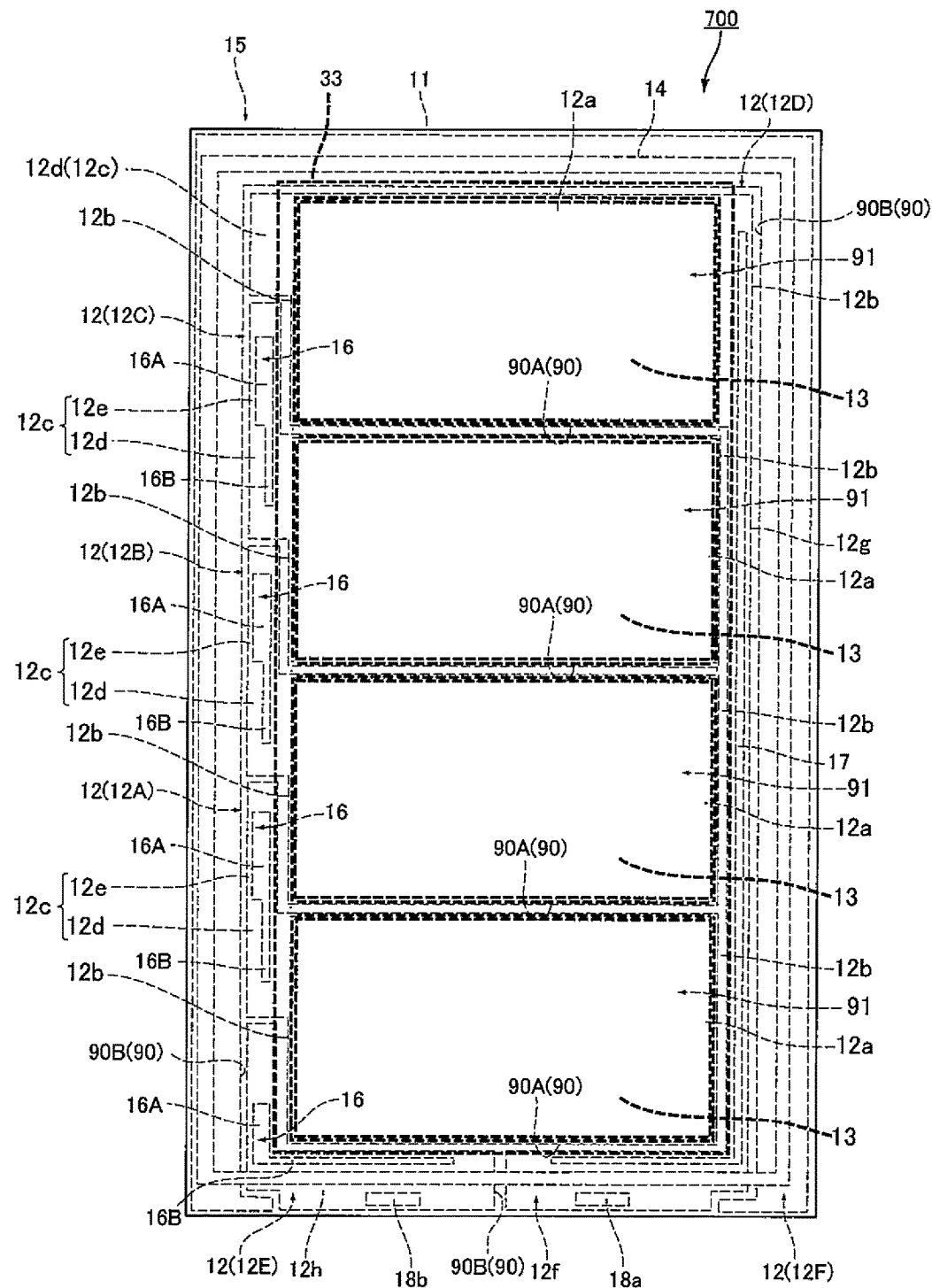
FIG. 20 is a plan view illustrating a state of a seventh embodiment of the photoelectric conversion element according to the invention as seen from a conductive substrate side.

In addition, in the first embodiment, although a gap is provided between the inner wall surface of the first sealing portion 31A and the oxide semiconductor layer 13, like the photoelectric conversion element 700 illustrated in FIG. 20, any gap may not be provided between the inner wall surface of the first sealing portion 31A and the oxide semiconductor layer 13. Namely, the inner wall surface of the first sealing portion 31A and the oxide semiconductor layer 13 may be in contact with each other. In this case, it is possible to conceal the color of the electrolyte 40 or the color or shape of the counter substrate 20 seen through the gap between the inner wall surface of the first sealing portion 31A and the oxide semiconductor layer 13. In the photoelectric conversion element 200 according to the second embodiment, no gap may be provided between the inner wall surface of the first sealing portion 31A and the oxide semiconductor layer 13.

Figure 21:
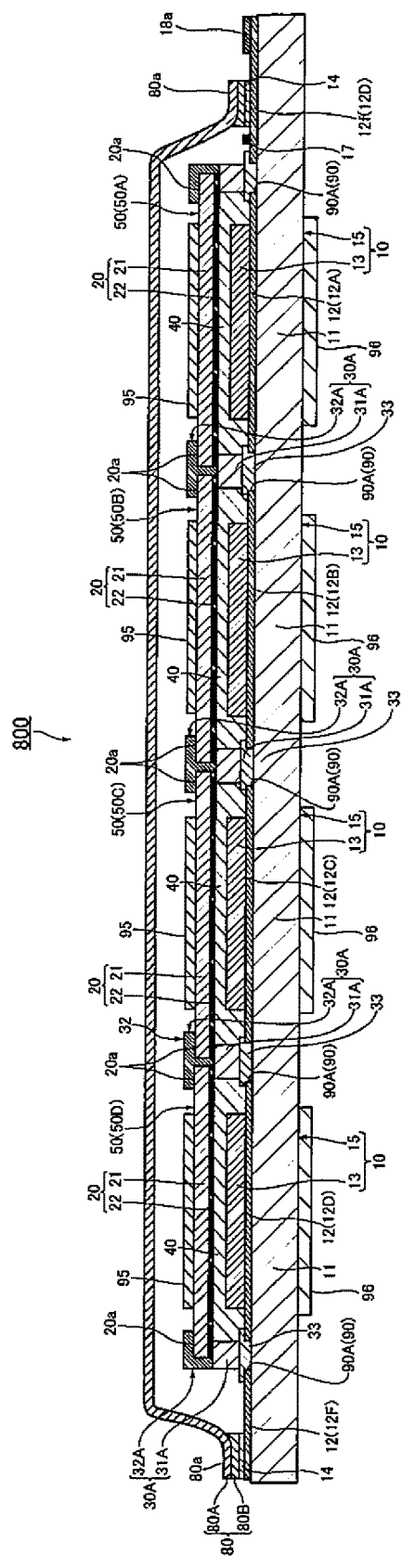
FIG. 21 is an end view of the cut section illustrating a portion of an eight embodiment of the photoelectric conversion element according to the invention.

In addition, in the above-described first embodiment, although any film is not formed on the surface of the side of the transparent substrate 11 opposite to the transparent conductive layer 12, similarly to the photoelectric conversion element 800 illustrated in FIG. 21, a coating layer 96 may be further provided on the surface of the side of the transparent substrate 11 opposite to the transparent conductive layer 12. Herein, preferably, the coating layer 96 covers the oxide semiconductor layer 13 in a case where the coating layer is seen in the thickness direction of the transparent substrate 11, and a maximum absorption peak wavelength of the coating layer 96 in the wavelength range of visible light and a maximum absorption peak wavelength of the oxide semiconductor layer 13 in the wavelength range of visible light is different from each other. In this case, the maximum absorption peak wavelength (λ1) of the coating layer 96 in the wavelength range of visible light is different from the maximum absorption peak wavelength (λ2) of the oxide semiconductor layer 13 in the wavelength range of visible light. Therefore, it is possible to suppress the phenomenon that light which is to be sufficiently absorbed by the oxide semiconductor layer 13 is sufficiently absorbed by the coating layer 96. Namely, it is possible to suppress a deterioration in photoelectric conversion characteristic of the photoelectric conversion element 800. In addition, it is also possible to adjust the color of the oxide semiconductor layer 13 of the photoelectric conversion element 800 to be a desired color. λ1-λ2 may not be 0. Although not particularly limited, λ1-λ2 is preferably in a range of 50 to 300 nm, more preferably in a range of 100 to 300 nm. Herein, the color of the coating layer 96 is preferably a complementary color of the oxide semiconductor layer 13. Namely, the color seen in a case where the oxide semiconductor layer 13 and the coating layer 96 are seen to overlap with each other is preferably black. In this case, it is possible to more sufficiently suppress the phenomenon that light which is to to be sufficiently absorbed by the oxide semiconductor layer 13 is sufficiently absorbed by the coating layer 96. Herein, black denotes a color in which the L* value is 26 or less. In addition, the refractive index of the coating layer 96 is preferably set to be equal to that of the conductive substrate 15. Specifically, a difference in refractive index between the conductive substrate 15 and the coating layer 96 is preferably set to be in a range of 0 to 0.5. In this case, reflection on the interface between the conductive substrate 15 and the coating layer 96 is sufficiently suppressed, so that it is possible to adjust the color more cleanly.

An overcoat layer may be provided on the coating layer 96 in terms of protection of the coating layer 96.

In addition, in the photoelectric conversion element 200 according to the second embodiment as well, like the photoelectric conversion element 800 illustrated in FIG. 21, the coating layer 96 may be further provided on the surface of the side of the transparent substrate 11 opposite to the transparent conductive layer 12.

Figure 22:
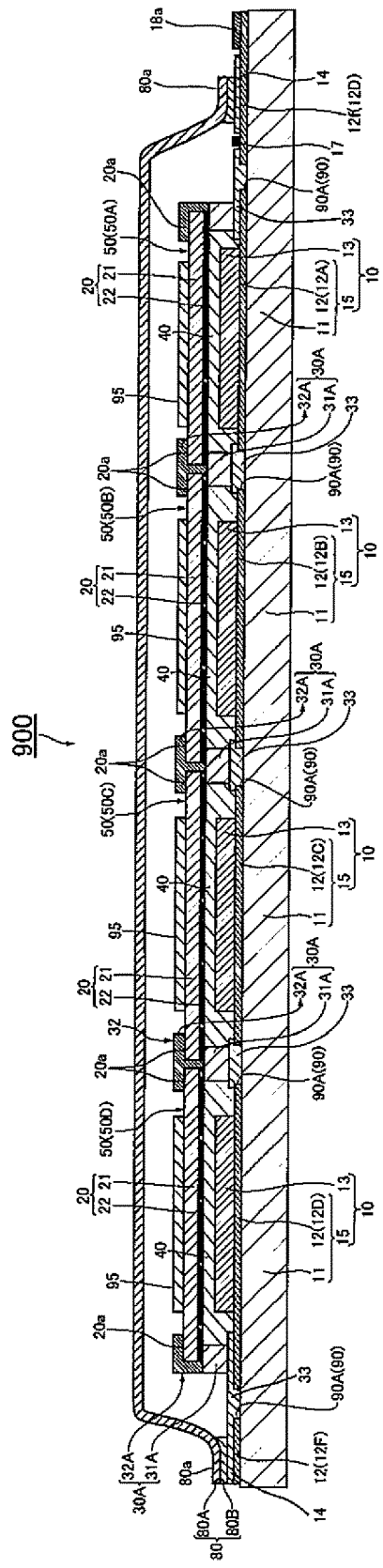
FIG. 22 is an end view of the cut section illustrating a portion of a ninth embodiment of the photoelectric conversion element according to the invention.

Furthermore, in the above embodiment, the first groove 90A is formed along the edge portion of the main body portion 12a of the transparent conductive layer 12, but like a photoelectric conversion element 900 illustrated in FIG. 22,l the first groove 90A may not be formed along the edge portion of the main body portion 12a of the transparent conductive layer 12 as long as it is present along the external shape of the annular sealing portion 30A. Specifically, the first groove 90A is formed at the position distant on the outer side than the annular sealing portion 30A on the transparent conductive layer 12. Even in this case, the insulating material 33 continuously covers the edge portion of the main body portion 12a as well as enters into the first groove 90A formed along the external shape of the annular sealing portion 30A. In the photoelectric conversion element 200 of the second embodiment as well, the first groove 90A may not be formed along the edge portion of the main body portion 12a of the transparent conductive layer 12 like the photoelectric conversion element 900 illustrated in FIG. 22 as long as the first groove 90A is present along the outer shape of the annular sealing portion 30A.

In addition, in the above first embodiment, the insulating material 33 and the insulating material 14 are spaced apart from each other, but it is preferable that they be composed of the same material and integrated like the photoelectric conversion element illustrated in FIG. 22. In this case, the insulating material 33 and the insulating material 14 are composed of the same material and integrated. For this reason, it is possible to prevent the penetration of moisture by being integrated even if the moisture penetrates into the back sheet 80 since the interface is not formed between the insulating material 14 and the insulating material 33. Consequently, it is possible to exhibit even more excellent durability.

Figure 23:
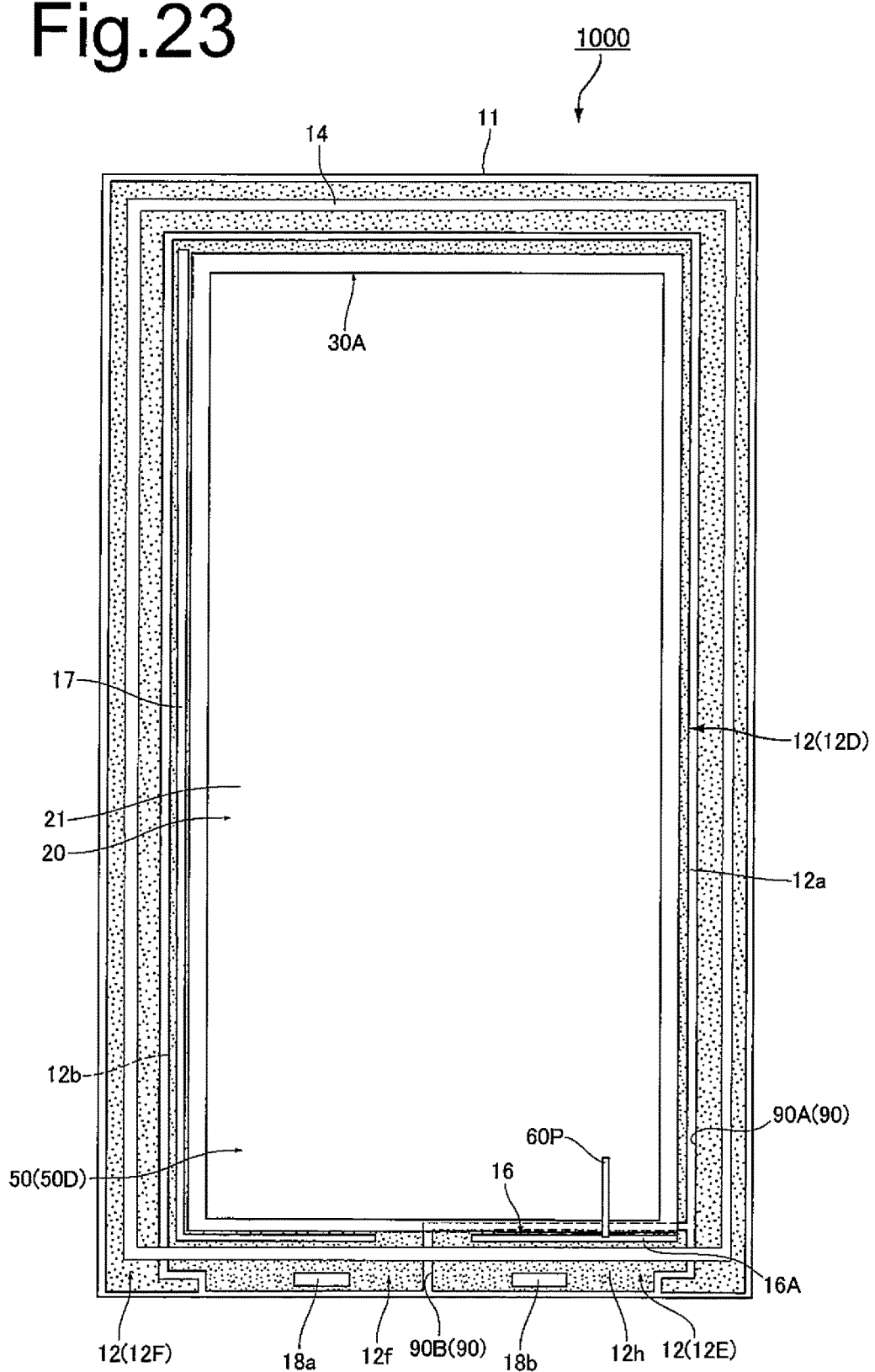
FIG. 23 is a plan view illustrating a portion of a tenth embodiment of the photoelectric conversion element according to the invention.

Furthermore, in the above first embodiment, the plurality of cells 50 are used but only one cell 50 may be used as a photoelectric conversion element 1000 illustrated in FIG. 23. Meanwhile, in the photoelectric conversion element 1000 illustrated in FIG. 23, the cell 50A to cell 50C are omitted, and the connecting terminal 16 provided on the second connecting portion 12i is electrically connected with the metal substrate 21 of the counter substrate 20 of the cell 50D via the wiring material 60P. In addition, in the dye-sensitized solar cell element 600, the connecting terminal 16 is constituted by only the wiring material connecting portion 16A, and this wiring material connecting portion 16A is disposed between the sealing portion 30A and the insulating material 14. In other words, the wiring material connecting portion 16A is not disposed at the position facing the side edge portion 12b of the main body portion 12a of the transparent conductive layer 12D of the cell 50D. For this reason, it is possible to increase the oxide semiconductor layer 13 in size to the space at the part at which the wiring material connecting portion 16A is disposed in the photoelectric conversion element 100 of the first embodiment. In this case, it is possible to increase the area for power generation in size as well as to effectively utilize the wasted space.

Moreover, in the above embodiment, the plurality of cells 50 are connected in series but may be connected in parallel.

Figure 24:
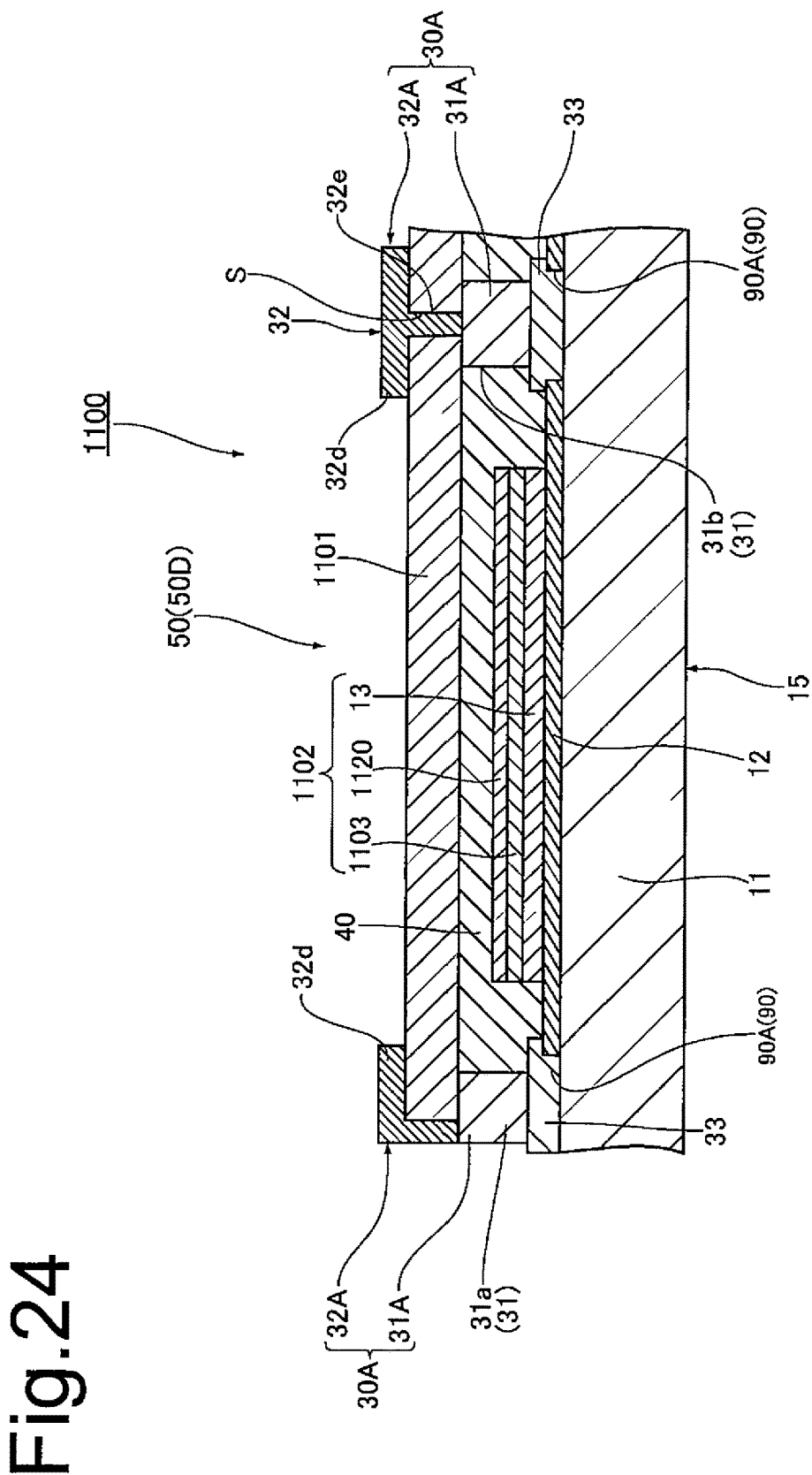
FIG. 24 is a cross-sectional view illustrating a portion of the eleventh embodiment of the photoelectric conversion element according to the invention.

In addition, in the above embodiment, the counter substrate 20 is constituted by the counter electrode, but like the photoelectric conversion element 1100 illustrated in FIG. 24, an insulating substrate 1101 may be used instead of the counter electrode as a counter substrate. In this case, the structure 1102 constituted by the oxide semiconductor layer 13, the porous insulating layer 1103, and the counter electrode 1102 is disposed in the space between the insulating substrate 1101, the sealing portion 30A, and the conductive substrate 15. The structure 1102 can be provided on the surface on the insulating substrate 1101 side of the conductive substrate 15. The structure 1102 is constituted by the oxide semiconductor layer 13, the porous insulating layer 1103, and the counter electrode 1120 in order from the conductive substrate 15 side. In addition, the electrolyte 40 is disposed in the space above. The electrolyte 40 is impregnated even into the inside of the oxide semiconductor layer and the porous insulating layer. Herein, it is possible to use, for example, a glass substrate or a resin film as the insulating substrate 1101. In addition, it is possible to use the same one as the counter substrate 20 of the above embodiment as the counter electrode 1120. Alternatively, the counter electrode 1120 may be constituted by, for example, a porous single layer containing carbon or the like. The porous insulating layer 1103 is mainly provided in order to prevent the physical contact of the oxide semiconductor layer 13 and the counter electrode 1120 and to impregnate the electrolyte 40 thereinto. It is possible to use, for example, a fired body of an oxide as such a porous insulating layer 1103. Meanwhile, although in the photoelectric conversion element 1100 illustrated in FIG. 24, only one of the structure 1102 is provided in the space between the sealing portion 30A, the conductive substrate 15 and the insulating substrate 1001, the plurality of the structures 1102 may be provided. In addition, the porous insulating layer 1103 is provided between the oxide semiconductor layer 13 and the counter electrode 1120. However, the porous insulating layer 1103

The photoelectric conversion element according to the invention is particularly useful for a case where the photoelectric conversion element is provided in the vicinity of an electronic device such as a display.

EXAMPLES

Hereinafter, the content of the invention will be described more specifically with reference to Examples, but the invention is not limited to the following Examples.

Example 1

First, a laminate obtained by forming a transparent conductive layer composed of FTO having a thickness of 1 μm on a transparent substrate which is composed of glass and has a thickness of 1 mm was prepared. Next, as illustrated in FIG. 3, the groove 90 was formed on the transparent conductive layer 12 by a $CO_2$ laser (V-460 manufactured by Universal Laser Systems Inc.), and the transparent conductive layers 12A to 12F were formed. At this time, the width of the groove 90 was set to 1 mm. In addition, each of the transparent conductive layers 12A to 12C was formed so as to have the main body portion having a quadrangular shape of 4.6 cm×2.0 cm and the protruding portion protruding from the side edge portion of one side of the main body portion. In addition, the transparent conductive layer 12D was formed so as to have the main body portion having a quadrangular shape of 4.6 cm×2.1 cm and the protruding portion protruding from the side edge portion of one side of the main body portion. In addition, the protruding portion 12c of the three transparent conductive layers 12A to 12C among the transparent conductive layers 12A to 12D was constituted by the projecting portion 12d projecting from the one side edge portion 12b of the main body portion 12a and the facing portion 12e which is extended from the projecting portion 12d and faced the main body portion 12a of the adjacent transparent conductive layer 12. In addition, the protruding portion 12c of the transparent conductive layer 12D was constituted only by the projecting portion 12d projecting from the one side edge portion 12b of the main body portion 12a. At this time, the length of the projecting direction (the direction orthogonal to the X direction in FIG. 2) of the projecting portion 12d was set to 2.1 mm and the width of the projecting portion 12d was set to 9.8 mm. In addition, the width of the facing portion 12e was set to 2.1 mm and the length of the facing portion 12e in the extending direction was set to 9.8 mm.

In addition, the transparent conductive layer 12D was formed so as to have not only the main body portion 12a and the protruding portion 12c but also the first current extracting portion 12f and the connecting portion 12g connecting the first current extracting portion 12f and the main body portion 12a. The transparent conductive layer 12E was formed so as to have the second current extracting portion 12h. At this time, the width of the connecting portion 12g was set to 1.3 mm and the length thereof was set to 59 mm. In addition, when the resistance value of the connecting portion 12g was measured by the four probe method, it was 100 Ω.

Next, a precursor of the connecting terminal 16 constituted by the wiring material connecting portion 16A and the wiring material non-connecting portion 16B was formed on the protruding portion 12c of the transparent conductive layers 12A to 12C. Specifically, the precursor of the connecting terminal 16 was formed such that a precursor of the wiring material connecting portion 16A was provided on the facing portion 12e and a precursor of the wiring material non-connecting portion 16B was provided on the projecting portion 12d. At this time, the precursor of the wiring material non-connecting portion 16B was formed so as to be narrower than the width of the wiring material connecting portion 16A. The precursor of the connecting terminal 16 was formed by applying the silver paste ("GL-6000X16" manufactured by FUKUDA METAL FOIL & POWDER Co., LTD.) by screen printing and drying it.

Furthermore, a precursor of the wiring material 17 was formed on the connecting portion 12g of the transparent conductive layer 12D. The precursor of the wiring material 17 was formed by applying the silver paste by screen printing and drying it.

In addition, precursors of the external connecting terminals 18a and 18b for extracting the current to the outside were formed on the first current extracting portion 12f of the transparent conductive layer 12A and the second current extracting portion 12h, respectively. The precursors of the external connecting terminals were formed by applying the silver paste by screen printing and drying it.

Furthermore, the precursor of the insulating material 33 was formed to enter into the first groove 90A and to cover the edge portions of the transparent conductive layers of the two sides of the first groove 90A. The precursor of the insulating material 33 was formed by applying a paste containing a glass frit by screen printing and drying it. At this time, as the glass frit, a mixture of red glass enamel (lead glass series, manufactured by Johnson Matthey Japan G.K) and black glass enamel (lead glass series, manufactured by Johnson Matthey Japan G.K) with a mass ratio of 95:5 was used. In addition, at this time, the width of the edge portion of the transparent conductive layer covered by the insulating material 33 was 0.2 mm from the groove 90.

In addition, in order to fix the back sheet 80, in the same manner as the insulating material 33, a precursor of the annular insulating material 14 composed of a glass frit was formed so as to surround the insulating material 33 and to pass through the transparent conductive layer 12D, the transparent conductive layer 12E, and the transparent conductive layer 12F. In addition, at this time, the precursor of the insulating material 14 was formed such that the precursor of the wiring material 17 was disposed on the inner side thereof. In addition, the insulating material 14 was formed such that the first current extracting portion and the second current extracting portion were disposed on the outer side thereof. The insulating material 14 was formed by applying a paste containing a glass frit by screen printing and drying it.

Furthermore, a precursor of the oxide semiconductor layer 13 was formed on the main body portion 12a of each of the transparent conductive layers 12A to 12D. The precursor of the oxide semiconductor layer 13 was formed by applying the paste for porous oxide semiconductor layer formation containing titania particles (having an average diameter of 21 nm "PST-21NR" manufactured by JGC C & C) three times by screen printing and drying it, and then by drying it.

Next, the precursor of the connecting terminal 16, the precursor of the wiring material 17, the precursors of the external connecting terminals 18a and 18b, the precursor of the insulating material 33, the precursor of the insulating material 14, the precursor of the insulating material 33, and the precursor of the oxide semiconductor layer 13 were fired at 500° C. for 15 minutes to form the connecting terminal 16, the wiring material 17, the external connecting terminals 18a and 18b, the insulating material 14, and the insulating material 33. Then, the precursor of the oxide semiconductor layer 13 was repeatedly applied four times to cover a part of the insulating material 33 and fired at 500° C. for 15 minutes. Thus, the oxide semiconductor layer 13 was formed. At this time, the width of the wiring material connecting portion of the connecting terminal 16 was 1.0 mm and the width of the wiring material non-connecting portion thereof was 0.3 mm. In addition, the length along the extending direction of the wiring material connecting portion was 7.0 mm and the length along the extending direction of the wiring material non-connecting portion was 7.0 mm. In addition, the dimensions of the wiring material 17, the external connecting terminals 18a and 18b, the insulating material 14, and the oxide semiconductor layer 13 were as follows, respectively.

Wiring material 17: 4 μm in thickness, 200 μm in width, 79 mm in length along the X direction in FIGS. 2, and 21 mm in length along the direction orthogonal to the X direction in FIG. 2, External connecting terminals 18a and 18b: 20 μm in thickness, 2 mm in width, and 7 mm in length, Insulating material 14: 50 μm, 3 mm in width, and Oxide semiconductor layer 13: 18 μm in thickness, 56 mm in length in the X direction in FIGS. 2, and 91 mm in length in the direction orthogonal to the X direction in FIG. 2

Next, the working electrode was immersed for a whole day and night in a dye solution containing 0.2 mM of a photosensitizing dye consisting of N719 and a mixed solvent prepared by mixing acetonitrile and tert-butanol at a volume ratio of 1:1 as the solvent, and then taken out therefrom and dried, and thus the photosensitizing dye was supported on the oxide semiconductor layer.

Next, the electrolyte composed of 2 M of hexylmethylimidazolium iodide, 0.3 M of n-methylbenzimidazole, 0.1 M of guanidinium thiocyanate in a solvent composed of 3-methoxypropionitrile was coated on the oxide semiconductor layer and dried, and the electrolyte was disposed.

Next, the first integrated sealing portion forming body for forming the first sealing portion was prepared. The first integrated sealing portion forming body was obtained by preparing one sheet of resin film for sealing which had 8.0 cm x 4.6 cm×50 μm and was composed of a maleic anhydride modified polyethylene (trade name: Bynel, manufactured by Du Pont) and forming four quadrangular-shaped openings in the resin film for sealing. At this time, the first integrated sealing portion forming body was fabricated such that each opening had a size of 1.7 cm×4.4 cm×50 µm, the width of the annular portion was 2 mm, and the width of the partitioning portion to partition the inner side opening of the annular portion was 2.6 mm.

Thereafter, the first integrated sealing portion forming body was superimposed on the insulating material 33 on the working electrode and then the first integrated sealing portion forming body was adhered to the insulating material 33 on the working electrode by heating to melt.

Next, four sheets of the counter electrodes were prepared. Two counter electrodes of the four sheets of the counter electrodes were prepared by forming the catalyst layer which had a thickness of 5 nm and was composed of platinum on the titanium foil of 4.6 cm×1.9 cm×40 µm by the sputtering method. The rest two counter electrodes of the four sheets of the counter electrodes were prepared by forming the catalyst layer which had a thickness of 5 nm and was composed of platinum on the titanium foil of 4.6 cm×2.0 cm×40 µm by the sputtering method. In addition, another first integrated sealing portion forming body was prepared and this first integrated sealing portion forming body was adhered to the surface facing the working electrode of the counter electrode in the same manner as above.

Thereafter, the first integrated sealing portion forming body adhered to the working electrode was allowed to face the first integrated sealing portion forming body adhered to the counter electrode, and thus the first integrated sealing portion forming bodies were superimposed on each other. The first integrated sealing portion forming bodies were then melted by heating while applying a pressure to the first integrated sealing portion forming bodies in this state. The first sealing portion was formed between the working electrode and the counter electrode in this manner. At this time, the width P of the adhesive portion of the partitioning portion of the first integrated sealing portion with the surface on the transparent conductive substrate side of the counter electrode, the width Q of the adhesive portion of the annular portion of the first integrated sealing portion with the surface on the transparent conductive substrate side of the counter electrode, the width R of the partitioning portion of the first integrated sealing portion, and the width T of the annular portion thereof were as follows, respectively.

P=1.0 mm

Q=2.0 mm

R=2.6 mm

T=2.2 mm

Next, the second integrated sealing portion was prepared. The second integrated sealing portion was obtained by preparing one sheet of resin film for sealing which had 8.0 cm×4.6 cm×50 µm and was composed of maleic anhydride modified polyethylene (trade name: Bynel, manufactured by Du Pont) and forming four quadrangular-shaped openings in the resin film for sealing. At this time, the second integrated sealing portion was fabricated such that each opening had a size of 1.7 cm×4.4 cm×50 µm, the width of the annular portion was 2 mm, and the width of the partitioning portion to partition the inner opening of the annular portion was 2.6 mm. The second integrated sealing portion was bonded to the counter electrode so as to sandwich the edge portion of the counter electrode together with the first integrated sealing portion. At this time, the second integrated sealing portion was bonded to the counter electrode and the first integrated sealing portion by heating the first integrated sealing portion and the second integrated sealing portion to melt while pressing the second integrated sealing portion to the counter electrode.

Next, the desiccant sheet was bonded on the metal substrate of each counter electrode with a double-sided tape. The dimensions of the desiccant sheet were 1 mm in thickness×3 cm in length×1 cm in width, and Zeosheet (trade name, manufactured by Shinagawa Chemicals Co., Ltd.) was used as the desiccant sheet.

Next, as illustrated in FIG. 2, the bypass diodes 70A to 70C were respectively fixed to the three partitioning portions of the second integrated sealing portion by applying the low-temperature curing type silver paste (Dotite D500 manufactured by FUJIKURAKASEI CO., LTD.) so as to continue from the terminals at both ends of the bypass diode to the metal substrate 21 of the counter substrate 20. In addition, the bypass diode 70D was fixed on the annular portion of the second integrated sealing portion of the cell 50D among the four cells 50A to 50D by applying the above low-temperature curing type silver paste so as to continue from one terminal of the terminals at both ends of the diode to the counter electrode. In this manner, the wiring material 60Q was formed so as to link the two adjacent bypass diodes with respect to the four bypass diodes 70A to 700. At this time, the wiring material 60Q was formed by curing the above low-temperature curing type silver paste at 30° C. for 12 hours. RB751V-40 manufactured by ROHM was used as the bypass diode.

In addition, the wiring material 60P was formed by applying the low-temperature curing type silver paste (Dotite D-500 manufactured by FUJIKURAKASEI CO., LTD.) and curing it so as to connect each of the wiring materials 60Q between the bypass diodes and the wiring material connecting portion on the three transparent conductive layers 12A to 12C, respectively. Moreover, for the bypass diode 70A, the wiring material 60P was formed by applying the above low-temperature curing type silver paste and curing it so as to be connected with the wiring material connecting portion on the transparent conductive layer 12E. At this time, the wiring material 60P was formed by curing the above low-temperature curing type silver paste at 30° C. for 12 hours.

Next, the butyl rubber ("Aikameruto" manufactured by Aica Kogyo Co., Ltd.) was coated on the insulating material 14 with a dispenser while being heated at 200° C. to form a precursor of the adhesive portion. On the other hand, a laminate, which is obtained by laminating a polybutylene terephthalate (PBT) resin film (50 µm in thickness), aluminum foil (25 µm in thickness), and a film (50 µm in thickness) composed of Bynel (trade name, manufactured by Du Pont) in this order, was prepared. Thereafter, the peripheral portion of this laminate 80A was superimposed on the precursor of the adhesive portion 80B, and a pressure was applied thereto for 10 seconds. In this manner, the back sheet 80 constituted by the adhesive portion 80B and the laminate 80A was obtained on the insulating material 14. The photoelectric conversion element was obtained in the manner described above.

Example 2

The photoelectric conversion element was fabricated in the same manner as in Example 1 except that the insulating material 33 composed of a glass frit covered also the edge portion of the transparent conductive layer 12 forming the second groove 90B as well as entered into the second groove 90B. Meanwhile, the width away from the groove of the edge portion of the transparent conductive layer covered with the insulating material 33 was 0.2 mm.

Example 3

A photoelectric conversion element was fabricated in the same manner as in Example 1 except that, at the time of forming the precursor of the annular connection portion, a non-colored glass frit (bismuth-oxide-based low-melting-point glass frit) was used as the glass frit.

Example 4

A photoelectric conversion element was fabricated in the same manner as in Example 1 except that the thickness of the oxide semiconductor layer 13 was changed to 25 μm.

Example 5

A photoelectric conversion element was fabricated in the same manner as in Example 1 except that the thickness of the oxide semiconductor layer 13 was changed to 32 μm.

Example 6

A photoelectric conversion element was fabricated in the same manner as in Example 1 except that, after obtaining the back sheet 80, the coating layer was formed by coating the surface of the side of the transparent substrate opposite to the transparent conductive layer with light blue paint (epi light pink indigo, manufactured by JUJO CHEMICAL CO., LTD.) and drying it, and after that, an anti-reflection film (product name: BSIP6NO1FH, manufactured by BUFFALO INC.) was adhered. At this time, the maximum absorption peak wavelength of the oxide semiconductor layer in the wavelength range of visible light was 700 nm, and the maximum absorption peak wavelength of the coating layer in the wavelength range of visible light was 550 nm.

Example 7

A photoelectric conversion element was fabricated in the same manner as in Example 1 except that the counter electrode was prepared by forming a catalyst layer configured by a carbon having a thickness of 1000 nm (product name: Ketjen black, manufactured by LION SPECIALTY CHEMICALS CO., LTD.) formed on a titanium foil.

Comparative Example 1

A photoelectric conversion element was fabricated in the same manner as in Example 1 except that, at the time of forming the precursor of the insulating material 33, a non-colored glass frit (bismuth-oxide-based low-melting-point glass frit) was used as the glass frit.

Comparative Example 2

A photoelectric conversion element was fabricated in the same manner as in Example 1 except that a resin film containing 5% by mass of a colorant (product name: die Piroki side, manufactured by Dainichiseika Color & Chemicals Mfg. Co., Ltd.) was used as the resin film for sealing used at the time of preparing the first integrated sealing portion forming body.

(Characteristic Evaluation)
(Durability 1)

The initial output ($\eta_0$) was measured for the photoelectric conversion elements obtained in Examples 1 to 7 and Comparative Examples 1 to 2. Subsequently, the output ($\eta$) after performing the heat cycle test in conformity to JIS C 8938 was also measured for the photoelectric conversion elements obtained in Examples 1 to 7 and Comparative Examples 1 to 2. Thereafter, the retention rate of output (output retention rate) was calculated based on the following Equation. The results are presented in Table 1.

Retention rate of output (%)=$\eta/\eta_0 \times 100$ (Outer Appearance)

In addition, with respect to the photoelectric conversion elements obtained in Examples 1 to 7 and Comparative Examples 1 to 2, outer appearance thereof as seen from the light incident side was evaluated. The result is shown in Table 1. In addition, in Table 1, "A", "B", and "C" represent evaluations of the outer appearance as follows.

A: The color of the electrolyte or the color or shape of the counter electrode is not seen.

B: The color of the electrolyte or the color or shape of the counter electrode is slightly seen.

C: The color of the electrolyte or the color or shape of the counter electrode is seen well.

TABLE 1

| | Initial Output (μW) | Durability Output Retention Ratio (%) | Outer Appearance |
|---|---|---|---|
| Example 1 | 220 | 98 | B |
| Example 2 | 220 | 96 | A |
| Example 3 | 219 | 98 | B |
| Example 4 | 221 | 100 | B |
| Example 5 | 218 | 98 | B |
| Example 6 | 198 | 97 | A |
| Example 7 | 209 | 95 | A |
| Comparative Example 1 | 221 | 98 | C |
| Comparative Example 2 | 194 | 53 | B |

As shown in Table 1, it can be understood that, in comparison with the photoelectric conversion element of Comparative Example 2, the photoelectric conversion elements of Examples 1 to 7 exhibit a high output retention ratio. In addition, it can be also understood that, in comparison with the photoelectric conversion element of Comparative Example 1, the photoelectric conversion elements of Examples 1 to 7 can realize a good outer appearance.

From the above, it was confirmed that it is possible to realize a good outer appearance and to have excellent durability according to the photoelectric conversion element of the invention.

EXPLANATION OF NUMERALS

11 Transparent substrate
12 Transparent conductive layer
12a Main body portion
13 Oxide semiconductor layer
14 Insulating material
15 Transparent conductive substrate (conductive substrate)
16 Connecting terminals (conductive portion, terminal portion, first connecting portion)
17, 417 Wiring material (conductive portion)
18a, 18b External connecting terminals (conductive portion, terminal portion)
20 Counter electrode (counter substrate)

21 Metal substrate (conductive portion, second connecting portion)
30A Sealing portion
33 Insulating material
34 Light transmission preventing layer
35a Terminal portion (conductive portion, first connecting portion)
35b Terminal portion (conductive portion, second connecting portion)
50, 50A to 50D Photoelectric conversion cell
60P Wiring material (conductive portion)
80 Back sheet
90 Groove
90A First groove
90B Second groove
100 to 1100 Photoelectric conversion element
635 Terminal portion

The invention claimed is:

1. A photoelectric conversion element comprising at least one photoelectric conversion cell,
wherein the photoelectric conversion cell includes:
a conductive substrate having a transparent substrate and a transparent conductive layer provided on the transparent substrate;
a counter substrate facing the conductive substrate;
an oxide semiconductor layer provided on the conductive substrate or the counter substrate;
an annular sealing portion adhering the conductive substrate and the counter substrate; and
an electrolyte filled in a cell space formed by the conductive substrate, the counter substrate, and the annular sealing portion,
wherein an insulating material is provided at least between the conductive substrate and the sealing portion, and the insulating material is colored,
wherein the transparent conductive layer includes a main body portion,
wherein the insulating material covers an edge portion of the main body portion,
wherein the insulating material is provided in the entire circumference along an outer shape of the sealing portion,
wherein the insulating material consists of a colored inorganic material, the colored inorganic material including a black insulating material,
wherein the sealing portion is provided directly on the insulating material,
wherein the insulating material is in contact with the transparent substrate, and
wherein the electrolyte is in contact with the transparent conductive layer of the conductive substrate.

2. The photoelectric conversion element according to claim 1, further comprising a coating layer on a surface of the side of the transparent substrate opposite to the transparent conductive layer, wherein the coating layer covers the oxide semiconductor layer in a case where the coating layer is seen in a thickness direction of the transparent substrate, and a maximum absorption peak wavelength of the coating layer in the wavelength range of visible light and a maximum absorption peak wavelength of the oxide semiconductor layer in the wavelength range of visible light are different from each other.

3. The photoelectric conversion element according to claim 1,
wherein the a main body portion is arranged inside the sealing portion, a groove is formed in the transparent conductive layer, at least a portion of the groove includes a first groove formed along an outer shape of the sealing portion, and
wherein the insulating material enters into the first groove and continuously covers the edge portion of the main body portion.

4. The photoelectric conversion element according to claim 3, further comprising a back sheet which covers the photoelectric conversion cell in a surface side of the transparent substrate where the transparent conductive layer is provided, the back sheet being provided on the conductive substrate,
wherein the groove includes:
the first groove; and
a second groove which is formed along the edge portion of the portion of the transparent conductive layer excluding the main body portion and intersects a peripheral edge portion of the back sheet, and
wherein the insulating material enters into the second groove and covers the edge portion of the portion of the transparent conductive layer excluding the main body portion.

5. The photoelectric conversion element according to claim 4, wherein the insulating material is provided on the conductive substrate and continuously along the entire circumference of the peripheral edge portion of the back sheet.

6. The photoelectric conversion element according to claim 3, further comprising a plurality of the photoelectric conversion cells,
wherein the conductive substrate is configured to be a common conductive substrate of the plurality of photoelectric conversion cells, and
wherein the plurality of photoelectric conversion cells are insulated from each other by the grooves including the first groove.

7. The photoelectric conversion element according to claim 1, further comprising:
a conductive portion including at least one terminal portion provided so as to be in contact with the transparent conductive layer in a first region where the insulating material is not provided among a second region between the sealing portion of the at least one photoelectric conversion cell and the edge portion of the conductive substrate, the second region being on the conductive substrate; and
a light transmission preventing layer which is provided so as to be adjacent to at least the terminal portion and prevents light transmission in the first region among the second region,
wherein at least a portion of the terminal portion and the light transmission preventing layer are colored, respectively.

8. The photoelectric conversion element according to claim 7,
wherein a difference in L* of an L*a*b* color space between the oxide semiconductor layer and the light transmission preventing layer is 5 or less, and
wherein the difference in L* of the L*a*b* color space between the oxide semiconductor layer and the colored terminal portion is 5 or less.

9. The photoelectric conversion element according to claim 7, wherein the light transmission preventing layer is provided so as to cover all regions excluding at least the insulating material and the conductive portion in a case where the photoelectric conversion element is seen in the thickness direction of the conductive substrate among regions between the sealing portions and the edge portion of the conductive substrate on a surface of the sealing portion side of the conductive substrate.

10. The photoelectric conversion element according to claim 7, wherein in a case where the photoelectric conversion element is seen from the transparent substrate side in the thickness direction of the conductive substrate, a different color portion having a color different from that of the light transmission preventing layer is provided on the conductive substrate.

11. A photoelectric conversion element comprising at least one photoelectric conversion cell,
wherein the photoelectric conversion cell includes:
a conductive substrate having a transparent substrate and a transparent conductive layer provided on the transparent substrate;
a counter substrate facing the conductive substrate;
an oxide semiconductor layer provided on the conductive substrate or the counter substrate; and
an annular sealing portion adhering the conductive substrate and the counter substrate, and
wherein an insulating material is provided at least between the conductive substrate and the sealing portion, and the insulating material is colored,
the photoelectric conversion element further comprising:
a conductive portion including at least one terminal portion provided so as to be in contact with the transparent conductive layer in a first region where the insulating material is not provided among a second region between the sealing portion of the at least one photoelectric conversion cell and the edge portion of the conductive substrate, the second region being on the conductive substrate; and
a light transmission preventing layer which is provided so as to be adjacent to at least the terminal portion and prevents light transmission in the first region among the second region,
wherein at least a portion of the terminal portion and the light transmission preventing layer are colored, respectively,
wherein the conductive portion includes:
at least one wiring material provided in the sealing portion side of the conductive substrate;
a first connecting portion which is connected to one end of the wiring material and is arranged outside the sealing portion in a case where the photoelectric conversion element is seen from the transparent substrate side in the thickness direction of the conductive substrate; and
a second connecting portion which is connected to the other end of the wiring material,
wherein the light transmission preventing layer is provided so as to overlap with the wiring material in the thickness direction of the conductive substrate between the wiring material and the conductive substrate.

12. The photoelectric conversion element according to claim 11, wherein the counter substrate is an electrode including a metal substrate, and the second connecting portions is the metal substrate.

13. The photoelectric conversion element according to claim 11, wherein the second connecting portion is arranged outside the sealing portion, and the first connecting portion and the second connecting portion are provided directly on the common transparent conductive layer.

14. A photoelectric conversion element comprising at least one photoelectric conversion cell,
wherein the photoelectric conversion cell includes:
a conductive substrate having a transparent substrate and a transparent conductive layer provided on the transparent substrate;
a counter substrate facing the conductive substrate;
an oxide semiconductor layer provided on the conductive substrate or the counter substrate; and
an annular sealing portion adhering the conductive substrate and the counter substrate, and
wherein an insulating material is provided at least between the conductive substrate and the sealing portion, and the insulating material is colored,
the photoelectric conversion element further comprising:
a conductive portion including at least one terminal portion provided so as to be in contact with the transparent conductive layer in a first region where the insulating material is not provided among a second region between the sealing portion of the at least one photoelectric conversion cell and the edge portion of the conductive substrate, the second region being on the conductive substrate; and
a light transmission preventing layer which is provided so as to be adjacent to at least the terminal portion and prevents light transmission in the first region among the second region,
wherein at least a portion of the terminal portion and the light transmission preventing layer are colored, respectively,
wherein in a case where the photoelectric conversion element is seen from the transparent substrate side in the thickness direction of the conductive substrate, a different color portion having a color different from that of the light transmission preventing layer is provided on the conductive substrate, and
wherein the light transmission preventing layer is provided so as to cover all the regions excluding at least the insulating material, the conductive portion, and the different color portion in a case where the photoelectric conversion element is seen in the thickness direction of the conductive substrate among the second region which is on the surface of the sealing portion side of the conductive substrate.

* * * * *